(12) United States Patent
Fujisaki

(10) Patent No.: US 8,417,288 B1
(45) Date of Patent: *Apr. 9, 2013

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,522

(22) Filed: Feb. 14, 2012

Related U.S. Application Data

(63) Continuation of application No. 13/225,569, filed on Sep. 6, 2011, now Pat. No. 8,301,194, which is a continuation of application No. 10/710,600, filed on Jul. 23, 2004, now Pat. No. 8,090, 402.

(60) Provisional application No. 60/481,426, filed on Sep. 26, 2003.

(51) Int. Cl.
*H04M 1/00* (2006.01)

(52) U.S. Cl. .................. 455/556.1; 455/414.1; 455/555; 455/566; 455/466

(58) Field of Classification Search .................. 455/517, 455/566, 413, 567, 412.2
See application file for complete search history.

(56) References Cited

U.S. PATENT DOCUMENTS

| | | | |
|---|---|---|---|
| 4,934,773 A | 6/1990 | Becker | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,687,331 A | 11/1997 | Volk et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |
| 5,825,408 A | 10/1998 | Yuyama et al. | |
| 5,844,824 A | 12/1998 | Newman et al. | |
| 5,902,349 A | 5/1999 | Endo et al. | |
| 5,903,706 A | 5/1999 | Wakabayashi et al. | |

(Continued)

FOREIGN PATENT DOCUMENTS

| GB | 2386027 A1 | 9/2003 |
|---|---|---|
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — David Q Nguyen

(57) ABSTRACT

The communication device which includes a voice communication implementer, a caller's information displaying implementer, an icon software implementer, and a multiple language mode implementer.

18 Claims, 1 Drawing Sheet

U.S. PATENT DOCUMENTS

| | | |
|---|---|---|
| 5,918,180 A | 6/1999 | Dimino |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,243,039 B1 | 6/2001 | Elliot |
| 6,253,075 B1 | 6/2001 | Beghtol et al. |
| 6,265,988 B1 | 7/2001 | LeMense et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,707,942 B1 | 3/2004 | Cortopassi et al. |
| 6,711,399 B1 | 3/2004 | Granier |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,992,699 B1 | 1/2006 | Vance et al. |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart et al. |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,117,152 B1 | 10/2006 | Mukherji et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Moton, Jr. et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 * | 12/2006 | Parulski et al. ............ 455/456.3 |
| 7,224,851 B2 | 5/2007 | Kinjo |
| 7,224,987 B1 | 5/2007 | Bhela et al. |
| 7,233,781 B2 | 6/2007 | Hunter et al. |
| 7,233,795 B1 | 6/2007 | Ryden |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,277,711 B2 | 10/2007 | Nyu |
| 7,321,783 B2 | 1/2008 | Kim |
| 7,346,373 B2 | 3/2008 | Kim |
| 7,372,447 B1 | 5/2008 | Jacobsen et al. |
| 7,383,067 B2 | 6/2008 | Phillips et al. |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,532,879 B1 | 5/2009 | Fujisaki |
| 7,551,899 B1 | 6/2009 | Nicolas et al. |
| 7,593,712 B2 | 9/2009 | Moton, Jr. et al. |
| 7,657,252 B2 | 2/2010 | Futami |
| 7,707,592 B2 | 4/2010 | Wesslen et al. |
| 7,707,602 B2 | 4/2010 | Cragun et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,873,349 B1 | 1/2011 | Smith et al. |
| 7,890,089 B1 | 2/2011 | Fujisaki |
| 7,899,410 B2 | 3/2011 | Rakshani et al. |
| 7,941,141 B2 | 5/2011 | Shoykhet et al. |

| | | |
|---|---|---|
| 7,953,439 B2 | 5/2011 | Rofougaran |
| 7,970,414 B1 | 6/2011 | Werden et al. |
| 8,208,954 B1 | 6/2012 | Fujisaki |
| 2001/0005826 A1 | 6/2001 | Shibuya |
| 2001/0029425 A1 | 10/2001 | Myr |
| 2001/0035829 A1 | 11/2001 | Yu et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0052754 A1 | 5/2002 | Joyce et al. |
| 2002/0054068 A1 | 5/2002 | Ellis et al. |
| 2002/0055872 A1 | 5/2002 | LaBrie et al. |
| 2002/0061767 A1 | 5/2002 | Sladen et al. |
| 2002/0065037 A1 | 5/2002 | Messina et al. |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1 * | 6/2002 | Liu et al. ............ 704/10 |
| 2002/0085700 A1 | 7/2002 | Metcalf |
| 2002/0094806 A1 | 7/2002 | Kamimura |
| 2002/0097984 A1 | 7/2002 | Abecassis |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0173344 A1 | 11/2002 | Cupps et al. |
| 2002/0177407 A1 | 11/2002 | Mitsumoto |
| 2002/0178225 A1 | 11/2002 | Madenberg et al. |
| 2002/0183045 A1 | 12/2002 | Emmerson et al. |
| 2002/0191951 A1 | 12/2002 | Sodeyama et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0032406 A1 | 2/2003 | Minear et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045311 A1 | 3/2003 | Larikka et al. |
| 2003/0045329 A1 | 3/2003 | Kinoshita |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0153310 A1 | 8/2003 | Ishii |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 * | 12/2003 | Hendra et al. ............ 705/26 |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |

| | | | |
|---|---|---|---|
| 2004/0203904 A1 | 10/2004 | Gwon et al. | |
| 2004/0203909 A1 | 10/2004 | Koster | |
| 2004/0204018 A1 | 10/2004 | Kuo | |
| 2004/0204035 A1 | 10/2004 | Raghuram et al. | |
| 2004/0204126 A1 | 10/2004 | Reyes et al. | |
| 2004/0216037 A1 | 10/2004 | Hishida et al. | |
| 2004/0218738 A1 | 11/2004 | Arai et al. | |
| 2004/0219951 A1 | 11/2004 | Holder | |
| 2004/0223049 A1 | 11/2004 | Taniguchi et al. | |
| 2004/0235520 A1 | 11/2004 | Cadiz et al. | |
| 2004/0242240 A1 | 12/2004 | Lin | |
| 2004/0248586 A1 | 12/2004 | Patel et al. | |
| 2004/0252197 A1 | 12/2004 | Fraley et al. | |
| 2004/0259537 A1 | 12/2004 | Ackley | |
| 2004/0266418 A1 | 12/2004 | Kotzin | |
| 2004/0267628 A1 | 12/2004 | Stillman | |
| 2005/0004749 A1 | 1/2005 | Park | |
| 2005/0032527 A1 | 2/2005 | Sheha et al. | |
| 2005/0036509 A1 | 2/2005 | Acharya et al. | |
| 2005/0046584 A1 | 3/2005 | Breed | |
| 2005/0048987 A1 | 3/2005 | Glass | |
| 2005/0070257 A1 | 3/2005 | Saarinen et al. | |
| 2005/0075097 A1 | 4/2005 | Lehikoinen et al. | |
| 2005/0090768 A1 | 4/2005 | Brattesani et al. | |
| 2005/0113080 A1 | 5/2005 | Nishimura | |
| 2005/0113113 A1 | 5/2005 | Reed | |
| 2005/0120225 A1 | 6/2005 | Kirsch et al. | |
| 2005/0136949 A1 | 6/2005 | Barnes, Jr. | |
| 2005/0144560 A1 | 6/2005 | Gruen et al. | |
| 2005/0151877 A1 | 7/2005 | Fisher | |
| 2005/0159189 A1 | 7/2005 | Iyer | |
| 2005/0164684 A1 | 7/2005 | Chen et al. | |
| 2005/0165871 A1 | 7/2005 | Barrs, II et al. | |
| 2005/0166242 A1 | 7/2005 | Matsumoto et al. | |
| 2005/0186954 A1 | 8/2005 | Kenney | |
| 2005/0192030 A1 | 9/2005 | Asthana et al. | |
| 2005/0207555 A1 | 9/2005 | Lee et al. | |
| 2005/0227731 A1 | 10/2005 | Kall | |
| 2005/0235312 A1 | 10/2005 | Karaoguz et al. | |
| 2005/0261945 A1 | 11/2005 | Mougin et al. | |
| 2005/0272504 A1 | 12/2005 | Eguchi et al. | |
| 2005/0282582 A1 | 12/2005 | Slotznick et al. | |
| 2006/0003813 A1 | 1/2006 | Seligmann et al. | |
| 2006/0031407 A1 | 2/2006 | Dispensa et al. | |
| 2006/0033809 A1 | 2/2006 | Farley | |
| 2006/0041923 A1 | 2/2006 | McQuaide | |
| 2006/0052100 A1 | 3/2006 | Almgren | |
| 2006/0059038 A1 | 3/2006 | Iuchi et al. | |
| 2006/0084413 A1 | 4/2006 | Myoung | |
| 2006/0114100 A1 | 6/2006 | Ghabra et al. | |
| 2006/0126284 A1 | 6/2006 | Moscovitch | |
| 2006/0133590 A1 | 6/2006 | Jiang | |
| 2006/0140173 A1 | 6/2006 | Hoover | |
| 2006/0140387 A1 | 6/2006 | Boldt | |
| 2006/0143655 A1 | 6/2006 | Ellis et al. | |
| 2006/0166650 A1 | 7/2006 | Berger et al. | |
| 2006/0167677 A1* | 7/2006 | Bitzer | 704/9 |
| 2006/0206913 A1 | 9/2006 | Jerding et al. | |
| 2006/0229114 A2 | 10/2006 | Kim | |
| 2006/0234693 A1 | 10/2006 | Isidore et al. | |
| 2006/0234758 A1 | 10/2006 | Parupudi et al. | |
| 2006/0276172 A1 | 12/2006 | Rydgren et al. | |
| 2006/0284732 A1 | 12/2006 | Brock-Fisher | |
| 2007/0005809 A1 | 1/2007 | Kobayashi et al. | |
| 2007/0015550 A1 | 1/2007 | Kayanuma | |
| 2007/0037605 A1* | 2/2007 | Logan | 455/567 |
| 2007/0050832 A1 | 3/2007 | Wright et al. | |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2008/0021728 A1 | 1/2008 | Khoo |
| 2008/0058005 A1 | 3/2008 | Zicker et al. |
| 2008/0146272 A1 | 6/2008 | Rao et al. |
| 2008/0151696 A1 | 6/2008 | Giroud et al. |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0299989 A1 | 12/2008 | King et al. |
| 2009/0047972 A1 | 2/2009 | Neeraj |
| 2009/0124243 A1 | 5/2009 | Routley et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0145700 A1 | 6/2010 | Kennewick et al. |
| 2011/0136508 A1 | 6/2011 | Fomukong et al. |

FOREIGN PATENT DOCUMENTS

| | | |
|---|---|---|
| JP | H11/195137 A1 | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.
HI Corporation's company history (http://www.hicorp.co.jp/english/corporate/history.html) Copyright notice on the web: (c) 2007-2011 HI Corporation. All Rights Reserved.
HI Corporation to Offer 3D Graphics to Motorola Mobile Phone Platform Customers (http://www.wirelessdevnet.com/news/2003/203/news7.html) Published on the web on: Jul. 21, 2003.
Development of NTT docomo Mova N504i—NEC Gi-Ho (Technology Magazine) vol. 56 No. 5/2003, p. 144 Published in: May 2003.
Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

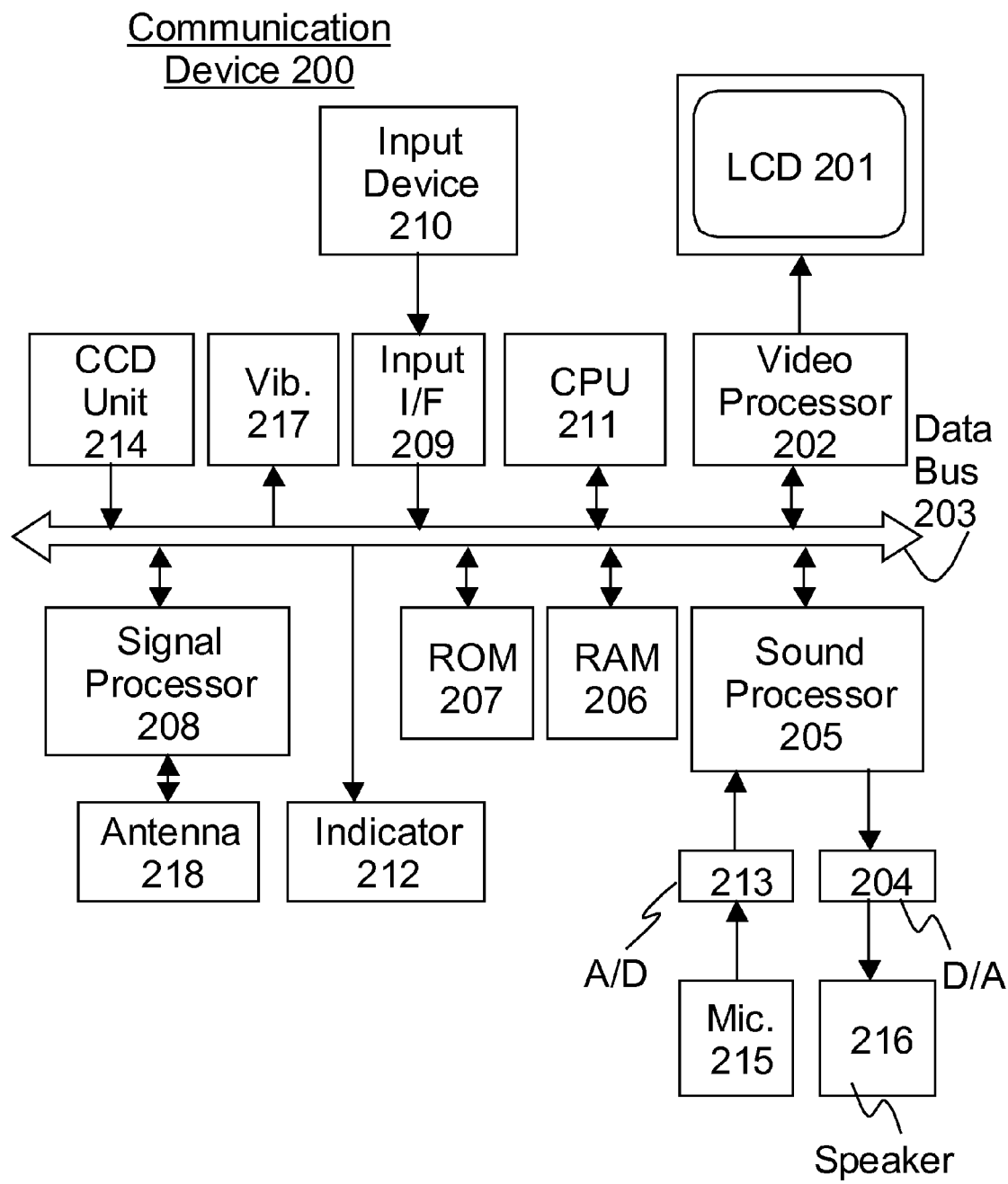

COMMUNICATION DEVICE

CROSS REFERENCE TO RELATED APPLICATIONS

This application is a continuation of U.S. Ser. No. 13/225,569 filed Sep. 6, 2011, which is a continuation of U.S. Ser. No. 10/710,600 filed Jul. 23, 2004, now U.S. Pat. No. 8,090,402, which claims the benefit of U.S. Provisional Application No. 60/481,426 filed Sep. 26, 2003, all of which are hereby incorporated herein by reference in their entirety.

BACKGROUND OF INVENTION

The invention relates to communication device and more particularly to the communication device which is capable to communicate with another communication device in a wireless fashion.

U.S. Patent Publication No. 20040054745 is introduced as prior art of the present invention of which the summary is the following: 'A communication system and method for supporting multiple languages for a mobile communication terminal. The system and method include a mobile communication network, a multiple language contents provider server (MLCPS) connected to the mobile communication network and having multiple language contents, and a mobile communication terminal wirelessly connected to the mobile communication network. The mobile communication terminal connects to the MLCPS through the mobile communication network, and transmits language package request data including at least one string set version and one font set version to the MLCPS according to request of a user. The mobile communication terminal also receives language package information provided by the MLCPS, divides the received language package information into a string set and a font set corresponding to languages and manages the string set and the font set, and displays menus and messages on a display window of the mobile communication terminal by a language selected by a user using the managed string set and font set. The MLCPS forms a corresponding language package in response to reception of the language package request data and transmits the language package to the mobile communication terminal through the mobile communication network.' However, this prior art does not disclose the communication device which includes a voice communication implementer, a caller's information displaying implementer, an icon software implementer, and a multiple language mode implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior art.

It is another object of the present invention to overcome the shortcomings associated with the foregoing prior art.

The present invention introduces the communication device which includes a voice communication implementer, a caller's information displaying implementer, an icon software implementer, and a multiple language mode implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215.

A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Voice Recognition System>>

Communication Device 200 (FIG. 1) has the function to operate the device by the user's voice or convert the user's voice into a text format (i.e., the voice recognition). The voice recognition function can be performed in terms of software by using Area 261, the voice recognition working area, of RAM 206 (FIG. 1) which is specifically allocated to perform such function, or can also be performed in terms of hardware circuit where such space is specifically allocated in Area 282 of Sound Processor 205 (FIG. 1) for the voice recognition system.

This paragraph illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

This paragraph illustrates the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

The following paragraphs describe the method of inputting the numeric information in a convenient manner.

In this embodiment, RAM 206 includes Table #1 and Table #2. Audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' Tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' Once the audio data is processed as described in S4 hereinbefore, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

This paragraph illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' Once the audio data is processed as described in S4 hereinbefore, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained hereinbefore. Namely, once the audio data is processed by CPU 211 (FIG. 1) as described in S4 hereinbefore and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

The following paragraphs describe the method of minimizing the undesired effect of the background noise when utilizing the voice recognition system.

In this embodiment, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

This paragraph describes the method to utilize the data stored in Area 255 and Area 256 described hereinbefore. When the voice recognition system is activated as described hereinbefore, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

This paragraph describes the method of updating Area 255. When the voice recognition system is activated as described hereinbefore, the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

This paragraph describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

The voice recognition system can be automatically turned off to avoid glitch. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

This paragraph illustrates the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-text Function>>

The next paragraph illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

This paragraph illustrates how the text and numeric information as well as the tag are displayed. On LCD 201 the text and numeric information 702 ('XXXXXXXXX') are displayed with the predetermined font and color as well as with the tag 701 ('John').

<<Audio/Video Data Capturing System>>

The following paragraphs illustrate the audio/video capturing system of Communication Device 200 (FIG. 1).

Assuming that Device A, a Communication Device 200, captures audio/video data and transfers such data to Device B, another Communication Device 200, via a host (not shown).

Primarily video data is input from CCD Unit 214 (FIG. 1) and audio data is input from Microphone 215 of (FIG. 1) of Device A.

In this embodiment, RAM 206 (FIG. 1) includes Area 267 which stores video data, Area 268 which stores audio data, and Area 265 which is a work area utilized for the process explained hereinafter.

In this embodiment, the video data input from CCD Unit 214 (FIG. 1) (S1a) is converted from analog data to digital data (S2a) and is processed by Video Processor 202 (FIG. 1) (S3a). Area 265 is used as work area for such process. The processed video data is stored in Area 267 of RAM 206 (S4a) and is displayed on LCD 201 (FIG. 1) (S5a). The audio data input from Microphone 215 (FIG. 1) (S1b) is converted from analog data to digital data by A/D 213 (FIG. 1) (S2b) and is processed by Sound Processor 205 (FIG. 1) (S3b). Area 265 is used as work area for such process. The processed audio data is stored in Area 268 of RAM 206 (S4b) and is transferred to Sound Processor 205 and is output from Speaker 216 (FIG. 1) via D/A 204 (FIG. 1) (S5b). The sequences of S1a through S5a and S1b through S5b are continued until a specific signal indicating to stop such sequence is input from Input Device 210 (FIG. 1) or by the voice recognition system (S6).

This paragraph illustrates the sequence to transfer the video data and the audio data via Antenna 218 (FIG. 1) in a wireless fashion. CPU 211 (FIG. 1) of Device A initiates a dialing process (S1) until the line is connected to a host (not shown) (S2). As soon as the line is connected, CPU 211 reads the video data and the audio data stored in Area 267 and Area 268 (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

This paragraph illustrates the basic structure of the transferred data which is transferred from Device A as described in S4 and S5 hereinbefore. Transferred data 610 is primarily composed of Header 611, video data 612, audio data 613, relevant data 614, and Footer 615. Video data 612 corresponds to the video data stored in Area 267 of RAM 206, and audio data 613 corresponds to the audio data stored in Area 268 of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

This paragraph illustrates the data contained in RAM 206 (FIG. 1) of Device B. RAM 206 includes Area 269 which stores video data, Area 270 which stores audio data, and Area 266 which is a work area utilized for the process explained hereinafter.

In this embodiment, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 and Area 270 of RAM 206 respectively (S5). The video data stored in Area 269 is processed by Video Processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in Area 270 is processed by Sound Processor 205 (FIG. 1) (S6b). The processed audio data is converted into analog data by D/A 204 (FIG. 1) (S7b) and output from Speaker 216 (FIG. 1) (S8b). The sequences of S6a through S8a and S6b through S8b are continued until a specific signal indicating to stop such sequence is input from Input Device 210 (FIG. 1) or via the voice recognition system (S9).

<<Caller ID System>>

The following paragraphs illustrate the caller ID system of Communication Device 200 (FIG. 1).

In this embodiment, RAM 206 includes Table C. Each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

In this embodiment, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

In this embodiment, CPU 211 (FIG. 1) periodically checks whether it has received a call from other communication devices (S1). If it receives a call (S2), CPU 211 scans Table C to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

<<Call Blocking Function>>

The following paragraphs illustrate the so-called 'call blocking' function of Communication Device 200 (FIG. 1).

In this embodiment, RAM 206 (FIG. 1) includes Area 273 and Area 274. Area 273 stores phone numbers that should be blocked. In this embodiment, Phone #1, Phone #2, and Phone #3 are blocked. Area 274 stores a message data, preferably a wave data, stating that the phone can not be connected.

This paragraph illustrates the operation of Communication Device 200. When Communication Device 200 receives a call (S1), CPU 211 (FIG. 1) scans Area 273 of RAM 206 (S2). If the phone number of the incoming call matches one of the phone numbers stored in Area 273 (S3), CPU 211 sends the message data stored in Area 274 of RAM 206 to the caller device (S4) and disconnects the line (S5).

This paragraph illustrates the method of updating Area 273 of RAM 206. Assuming that the phone number of the incoming call does not match any of the phone numbers stored in Area 273 of RAM 206 (see S3 hereinbefore). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 of RAM 206 to the caller device (S4). The line is disconnected thereafter (S5).

The following paragraphs illustrate another embodiment of the present invention.

In this embodiment, Host H (not shown) includes Area 403 and Area 404. Area 403 stores phone numbers that should be blocked to be connected to Communication Device 200. In this embodiment, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

This paragraph illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (S3) and checks whether the phone number of the incoming call matches one of the phone numbers stored therein for Device B (S4). If the phone number of the incoming call does not match any of the phone numbers stored in Area 403, the line is connected to Device B (S5b). On the other hand, if the phone number of the incoming call matches one of the phone numbers stored in Area 403, the line is 'blocked,' i.e., not connected to Device B (S5a) and Host H sends the massage data stored in Area 404 to the caller device (S6).

This paragraph illustrates the method of updating Area 403 of Host H. Assuming that the phone number of the incoming call does not match any of the phone numbers stored in Area 403 (see S4 described hereinbefore). In that case, Host H allows the connection between the caller device and Communication Device 200, however, the user of Communication Device 200 may decide to have such number 'blocked' after all. If that is the case, the user simply dials '999' while the line is connected. Technically Host H periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 to the caller device (S4). The line is disconnected thereafter (S5).

As another embodiment of the method illustrated in the previous paragraph, Host H may delegate some of its tasks to Communication Device 200. Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 and sends the message data stored in Area 404 to the caller device. The line is disconnected thereafter.

<<Navigation System>>

The following paragraphs illustrate the navigation system of Communication Device 200 (FIG. 1).

In this embodiment, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

In this embodiment, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

In this embodiment, the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system (S2). The current position can also be input from Input Device 210. As another embodiment of the present invention, the current position can automatically be detected by the method so-called 'global positioning system' or 'GPS' and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

This paragraph illustrates the sequence of the input current position mode described in S2 described hereinbefore. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

This paragraph illustrates the sequence of the input destination mode described in S3 described hereinbefore. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

This paragraph illustrates the sequence of displaying the shortest route from the current position to the destination. CPU 211 (FIG. 1) retrieves both the current position data and the Destination Data which are input by the method described hereinbefore from Area 277 of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 of RAM 206. The two-dimensional map and/or the three dimensional map is displayed on LCD 201 (FIG. 1) (S3).

As another embodiment of the present invention, the attribution data stored in Area 295 of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 of RAM 206. Then CPU 211 retrieves a plurality of object data which correspond to such location data from Area 276 of RAM 206 and displays a plurality of objects on LCD 201 based on such object data in a manner the user of Communication Device 200 may observe from the current location.

This paragraph illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 of RAM 206 (S3). Instead, by way of utilizing the location data stored in Area 277, CPU 211 may produce a three-dimensional map by composing the three dimensional objects by method so-called 'texture mapping' which are stored in Area 276 of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

This paragraph illustrates the method of finding the shortest location of the desired facility, such as restaurant, hotel, gas station, etc. The voice recognition system is activated in the manner described hereinbefore (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described hereinbefore (S3). From the data selected in S2, CPU 211 scans Area 277 of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (S5). Instead, by way of utilizing the location data stored in 277, CPU 211 may produce a three-dimensional map by composing the three dimensional objects by method so-called 'texture mapping' which are stored in Area 276 of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

This paragraph illustrates the method of displaying the time and distance to the destination. CPU 211 (FIG. 1) calculates the current position wherein the source data can be input from the method described hereinbefore (S1). The distance is calculated from the method described hereinbefore (S2). The speed is calculated from the distance which Communication Device 200 has proceeded within specific period of time (S3). The distance to the destination and the time left are displayed on LCD 201 (FIG. 1) (S4 and S5).

This paragraph illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method is repeated for a certain period of time. If the deviation still exists after such period of time has passed, CPU 211 (FIG. 1) initiates the sequence described hereinbefore and calculates the shortest route to the destination and display it on LCD 201. The details of such sequence is as same as the one explained hereinbefore.

This paragraph illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described hereinbefore is performed (S3). On the other hand, if the data received is a communication data (S4), the communication system, i.e., the system necessary for wireless communication which is mainly described in FIG. 1 is performed (S5).

<<Auto Time Adjust Function>>

The following paragraphs illustrate the automatic time adjust function, i.e., a function which automatically adjusts the clock of Communication Device 200.

This paragraph illustrates the data stored in RAM 206 (FIG. 1). In this embodiment, RAM 206 includes Auto Time Adjust Software Storage Area 2069a, Current Time Data Storage Area 2069b, and Auto Time Data Storage Area 2069c. Auto Time Adjust Software Storage Area 2069a stores software program to implement the present function which is explained in details hereinafter, Current Time Data Storage Area 2069b stores the data which represents the current time, and Auto Time Data Storage Area 2069c is a working area assigned for implementing the present function.

This paragraph illustrates a software program stored in Auto Time Adjust Software Storage Area 2069a. First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069b, and compares both data. If the difference between both data is not within the predetermined value X (S3), CPU 211 adjusts the current time data (S4). The method to adjust the current data can be either simply overwrite the data stored in Current Time Data Storage Area 2069b with the atomic clock data retrieved from Network NT or calculate the difference of the two data and add or subtract the difference to or from the current time data stored in Current Time Data Storage Area 2069b by utilizing Auto Time Data Storage Area 2069c as a working area.

This paragraph illustrates another software program stored in Auto Time Adjust Software Storage Area 2069a. When the power of Communication Device 200 is turned on (S1), CPU 211 (FIG. 1) stores a predetermined timer value in Auto Time Data Storage Area 2069c (S2). The timer value is decremented periodically (S3). When the timer value equals to zero (S4), the automatic timer adjust function is activated (S5) and CPU 211 performs the sequence described hereinbefore, and the sequence of S2 through S4 is repeated thereafter.

<<Calculator Function>>

The following paragraphs illustrate the calculator function of Communication Device 200. Communication Device 200 can be utilized as a calculator to perform mathematical calculation by implementing the present function.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step, and the calculator function is activated (S3c) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c, and the data to activate (as described in S3c of the previous paragraph) and to perform the calculator function is stored in Calculator Information Storage Area 20615a.

This paragraph illustrates the data stored in Calculator Information Storage Area 20615a. In this embodiment, Calculator Information Storage Area 20615a includes Calculator Software Storage Area 20615b and Calculator Data Storages Area 20615c. Calculator Software Storage Area 20615b stores the software programs to implement the present function, such as the one explained hereinafter, and Calculator Data Storage Area 20615c stores a plurality of data necessary to execute the software programs stored in Calculator Software Storage Area 20615b and to implement the present function.

This paragraph illustrates the software program stored in Calculator Storage Area 20615b. In this embodiment, one or more of numeric data are input by utilizing Input Device 210 (FIG. 1) or via voice recognition system as well as the arithmetic operators (e.g., '+', '−', and '×'), which are temporarily stored in Calculator Data Storage Area 20615c (S1). By utilizing the data stored in Calculator Data Storage Area 20615c, CPU 211 (FIG. 1) performs the calculation by executing the software program stored in Calculator Software Storage Area 20615b (S2). The result of the calculation is displayed on LCD 201 (FIG. 1) thereafter (S3).

<<Spreadsheet Function>>

The following paragraphs illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step, and the spreadsheet function is activated (S3c) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c, and the data to activate (as described in S3c of the previous paragraph) and to perform the spreadsheet function is stored in Spreadsheet Information Storage Area 20616a.

This paragraph illustrates the data stored in Spreadsheet Information Storage Area 20616a. In this embodiment, Spreadsheet Information Storage Area 20616a includes Spreadsheet Software Storage Area 20616b and Spreadsheet Data Storage Area 20616c. Spreadsheet Software Storage Area 20616b stores the software programs to implement the present function, such as the one explained hereinafter, and Spreadsheet Data Storage Area 20616c stores a plurality of data necessary to execute the software programs stored in Spreadsheet Software Storage Area 20616b and to implement the present function.

This paragraph illustrates the software program stored in Spreadsheet Software Storage Area 20616b. In this embodiment, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616c (S1). One or more of alphanumeric data are input by utilizing Input Device 210 or via voice recognition system into the cell selected in S1, and CPU 211 stores the alphanumeric data in Spreadsheet Data Storage Area 20616c (S2). CPU 211 displays the alphanumeric data on LCD 201 thereafter (S3). The sequence of S1 through S3 can be repeated for a numerous amount of times and saved and closed thereafter.

<<Word Processing Function>>

The following paragraphs illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described hereinafter, and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described hereinafter, and the data to activate (as described in S3c of the previous paragraph) and to perform the word processing function is stored in Word Processing Information Storage Area 20617a.

This paragraph illustrates the data stored in Word Processing Information Storage Area 20617a. Word Processing Information Storage Area 20617a includes Word Processing Software Storage Area 20617b and Word Processing Data Storage Area 20617c. Word processing Software Storage Area 20617b stores the software programs described hereinafter, and Word Processing Data Storage Area 20617c stores a plurality of data described hereinafter.

This paragraph illustrates the software programs stored in Word Processing Software Storage Area 20617b. Word Processing Software Storage Area 20617b stores Alphanumeric Data Input Software 20617b1, Bold Formatting Software 20617b2, Italic Formatting Software 20617b3, Image Pasting Software 20617b4, Font Formatting Software 20617b5, Spell Check Software 20617b6, Underlining Software 20617b7, Page Numbering Software 20617b8, and Bullets And Numbering Software 20617b9. Alphanumeric Data Input Software 20617b1 inputs to a document a series of alphanumeric data in accordance to the input signals produced by utilizing Input Device 210 (FIG. 1) or via voice recognition system. Bold Formatting Software 20617b2 implements the bold formatting function which makes the selected alphanumeric data bold of which the sequence is described hereinafter. Italic Formatting Software 20617b3 implements the italic formatting function which makes the selected alphanumeric data italic of which the sequence is described hereinafter. Image Pasting Software 20617b4 implements the image pasting function which pastes the selected image to a document to the selected location of which the sequence is described hereinafter. Font Formatting Software 20617b5 implements the font formatting function which changes the selected alphanumeric data to the selected font of which the sequence is described hereinafter. Spell Check Software 20617b6 implements the spell check function which fixes spelling and grammatical errors of the alphanumeric data in a document of which the sequence is described hereinafter. Underlining Software 20617b7 implements the underlining function which adds the selected underlines to the selected alphanumeric data of which the sequence is described hereinafter. Page Numbering Software 20617b8 implements the page numbering function which adds page numbers at the selected location to each page of a document of which the sequence is described hereinafter. Bullets And Numbering Software 20617b9 implements the bullets and numbering function which adds the selected type of bullets and numbers to the selected paragraphs of which the sequence is described hereinafter.

This paragraph illustrates the data stored in Word Processing Data Storage Area 20617c. Word Processing Data Storage Area 20617c includes Alphanumeric Data Storage Area 20617c1, Bold Formatting Data Storage Area 20617c2, Italic Formatting Data Storage Area 20617c3, Image Data Storage Area 20617c4, Font Formatting Data Storage Area 20617c5, Spell Check Data Storage Area 20617c6, Underlining Data Storage Area 20617c7, Page Numbering Data Storage Area 20617c8, and Bullets And Numbering Data Storage Area 20617c9. Alphanumeric Data Storage Area 20617c1 stores the basic text and numeric data which are not decorated by bold and/or italic (the default font may be courier new). Bold Formatting Data Storage Area 20617c2 stores the text and numeric data which are decorated by bold. Italic Formatting Data Storage Area 20617c3 stores the text and numeric data which are decorated by italic. Image Data Storage Area 20617c4 stores the data representing the location of the image data pasted in a document and the image data itself. Font Formatting Data Storage Area 20617c5 stores a plurality of types of fonts, such as arial, century, courier new, tahoma, and times new roman, of all text and numeric data stored in Alphanumeric Data Storage Area 20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9 stores a plurality of data representing different types of bullets and numbering and the location which they are added.

This paragraph illustrates the sequence of the software program stored in Alphanumeric Data Input Software 20617*b*1. A plurality of alphanumeric data is input by utilizing Input Device 210 (FIG. 1) or via voice recognition system (S1). The corresponding alphanumeric data is retrieved from Alphanumeric Data Storage Area 20617*c*1 (S2), and the document including the alphanumeric data retrieved in S2 is displayed on LCD 201 (FIG. 1) (S3).

This paragraph illustrates the sequence of the software program stored in Bold Formatting Software 20617*b*2. One or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (S3), and replaces the alphanumeric data selected in S1 with the bold formatting data retrieved in S3 (S4). The document with the replaced bold formatting data is displayed on LCD 201 thereafter (S5).

This paragraph illustrates the sequence of the software program stored in Italic Formatting Software 20617*b*3. One or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (S3), and replaces the alphanumeric data selected in S1 with the italic formatting data retrieved in S3 (S4). The document with the replaced italic formatting data is displayed on LCD 201 thereafter (S5).

This paragraph illustrates the sequence of the software program stored in Image Pasting Software 20617*b*4. The image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617*c*4. The image is pasted at the location selected in S2 and the image is stored in Image Pasting Data Storage Area 20617*c*4 (S3). The document with the pasted image is displayed on LCD 201 (FIG. 1) thereafter (S4).

This paragraph illustrates the sequence of the software program stored in Font Formatting Software 20617*b*5. One or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617*c*5 (S3), and replaces the alphanumeric data selected in S1 with the font formatting data retrieved in S3 (S4). The document with the replaced font formatting data is displayed on LCD 201 thereafter (S5).

This paragraph illustrates the sequence of the software program stored in Spell Check Software 20617*b*6. CPU 211 (FIG. 1) scans all alphanumeric data in a document (S1). CPU 211 then compares the alphanumeric data with the spell check data stored in Spell Check Data Storage Area 20617*c*6, i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

This paragraph illustrates the sequence of the software program stored in Underlining Software 20617*b*7. One or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617*c*7 (S3), and adds to the alphanumeric data selected in S1 (S4). The document with underlines added to the selected alphanumeric data is displayed on LCD 201 thereafter (S5).

This paragraph illustrates the sequence of the software program stored in Page Numbering Software 20617*b*8. A page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617*c*8, and adds the page number to each page of a document at the selected location (S3). The document with page numbers is displayed on LCD 201 thereafter (S4).

This paragraph illustrates the sequence of the software program stored in Bullets And Numbering Software 20617*b*9. A paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617*c*9, and adds the bullets and/or numbering to the selected paragraph of a document (S3). The document with the bullets and/or numbering is displayed on LCD 201 thereafter (S4).

<<TV Remote Controller Function>>

The following paragraphs illustrate the TV remote controller function which enables Communication Device 200 to be utilized as a TV remote controller.

This paragraph illustrates the connection between Communication Device 200 and TV 802. Communication Device 200 is connected in a wireless fashion to Network NT, such as the Internet, and Network NT is connected to TV 802 in a wireless fashion. Communication Device 200 may be connected to TV 802 via one or more of artificial satellites, for example, in the manner described hereinbefore. Communication Device 200 may also be connected to TV 802 via Sub-host as described hereinbefore.

This paragraph illustrates another embodiment of connecting Communication Device 200 with TV 802. Communication Device 200 may directly connect to TV 802 in a wireless fashion. Here, Communication Device 200 may utilize Antenna 218 (FIG. 1) and/or LED 219 as described hereinafter to be connected with TV 802 in a wireless fashion.

This paragraph illustrates the connection between Communication Device 200 and TV Server TVS. Communication Device 200 is connected in a wireless fashion to Network NT, such as the Internet, and Network NT is connected to TV Server TVS in a wireless fashion. Communication Device 200 may be connected to TV Server TVS via one or more of artificial satellites and/or TV Server TVS may be carried by an artificial satellite, for example, in the manner described hereinbefore.

This paragraph illustrates the data stored in TV Server TVS. TV Server TVS includes TV Program Information Storage Area H18b of which the details are explained hereinafter, and TV Program Listing Storage Area H18c of which the details are explained hereinafter.

This paragraph illustrates the data stored in TV Program Information Storage Area H18b. TV Program Information Storage Area H18b includes five types of data: 'CH', 'Title', 'Sum', 'Start', 'Stop', and 'Cat'. Here, 'CH' represents the channel number of the TV programs available on TV 802; 'Title' represents the title of each TV program; 'Sum' represents the summary of each TV program; 'Start' represents the starting time of each TV program; 'Stop' represents the ending time of each TV program, and 'Cat' represents the category to which each TV program pertains.

This paragraph illustrates the data stored in TV Program Listing Storage Area H18c. TV Program Listing Storage Area H18c includes four types of data: 'CH', 'Title', 'Start', and 'Stop'. Here, 'CH' represents the channel number of the TV programs available on TV 802; 'Title' represents the title of each TV program; 'Start' represents the starting time of each TV program; and 'Stop' represents the ending time of each TV program. The data stored in TV Program Listing Storage Area H18c are designed to be 'clipped' and to be displayed on LCD 201 (FIG. 1) of Communication Device 200 in the manner described hereinafter. As another embodiment, TV Program Listing Storage Area H18c may be combined with TV Program Information Storage Area H18b and extract the data of 'CH', 'Title', 'Start', and 'Stop' therefrom.

This paragraph illustrates the elements of Communication Device 200. The elements of Communication Device 200 is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described hereinbefore, and the TV remote controller function is activated (S3c) when the TV remote controller function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). The data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described hereinbefore, and the data to activate (as described in S3c of the previous paragraph) and to perform the TV remote controller function is stored in TV Remote Controller Information Storage Area 20618a.

This paragraph illustrates the data stored in TV Remote Controller Information Storage Area 20618a. TV Remote Controller Information Storage Area 20618a includes TV Remote Controller Software Storage Area 20618b and TV Remote Controller Data Storage Area 20618c. TV Remote Controller Software Storage Area 20618b stores a plurality of software programs to implement the present function, such as the ones described hereinafter, and TV Remote Controller Data Storage Area 20618c stores a plurality of data to implement the present function such as the ones described hereinafter.

This paragraph illustrates the data stored in TV Remote Controller Data Storage Area 20618c. TV Remote Controller Data Storage Area 20618c includes, Channel List Data Storage Area 20618c1, TV Program Information Storage Area 20618c2, and TV Program Listing Storage Area 20618c3. Channel list Data Storage Area 20618c1 stores a list of channel numbers available on TV 802. TV Program Information Storage Area 20618c2 stores the data transferred from TV Program Information Storage Area H18b of TV Server TVS. The data stored in TV Program Information Storage Area 20618c2 is identical to the ones stored in TV Program Information Storage Area H18b or may be the portion thereof. TV Program Listing Storage Area 20618c3 stores the data transferred from TV Program Listing Storage Area H18c of TV Server TVS. The data stored in TV Program Listing Storage Area 20618c3 is identical to the ones stored in TV Program Listing Storage Area H18c or may be the portion thereof.

This paragraph illustrates the Channel Numbers 20118a displayed on LCD 201. Ten channel numbers are displayed on LCD 201, i.e., channel numbers '1' through '10'. The highlighted Channel Number 20118a is the one which is currently displayed on TV 802. In the present example, channel number 20188*a* '4' is highlighted, therefore, Channel 4 is currently shown on TV 802.

This paragraph illustrates one of the software programs stored in TV Remote Controller Software Storage Area 20618*b* to display and select Channel Number 20118*a*. CPU 211 displays a channel list comprising a plurality of Channel Numbers 20118*a* on LCD 201 (S1). In the example described hereinbefore, ten channel numbers are displayed on LCD 201, i.e., channel numbers '1' through '10'. The user of Communication Device 200 inputs a channel selecting signal by utilizing Input Device 210 or via voice recognition system (S2). CPU 211 highlights the selected channel in the manner described hereinbefore (S3), and sends to TV 802 via LED 209 in a wireless fashion the TV channel signal (S4). The TV program of Channel 4 is displayed on TV 802 thereafter.

This paragraph illustrates TV Program Information 20118*c* displayed on LCD 201. When the user of Communication Device 200 inputs a specific signal utilizing Input Device 210 or via voice recognition system, TV Program Information 20118*c* currently shown on Channel Number 20118*b* selected in S2 described hereinbefore is displayed on LCD 201. TV Program Information 20118*c* includes Channel Number 20118*b*, 'Title', 'Summary', 'Start Time', 'Stop Time', and 'Category'. Here, Channel Number 20118*b* represents the channel number of the TV program currently shown on Channel Number 20118*b* (i.e., the channel number selected in S2 described hereinbefore), 'Title' represents the title of the TV program currently shown on Channel Number 20118*b*, 'Summary' represents the summary of the TV program currently shown on Channel Number 20118*b*, 'Start Time' represents the starting time of the TV program currently shown on Channel Number 20118*b*, 'Stop Time' represents the ending time of the TV program currently shown on Channel Number 20118*b*, and 'Category' represents the category to which the TV program currently shown on Channel Number 20118*b* pertains.

This paragraph illustrates one of the software programs stored in TV Remote Controller Software Storage Area 20618*b* which displays TV Program Information 20118*c* on LCD 201. When the user of Communication Device 200 selects the TV program information display mode by utilizing Input Device 210 or via voice recognition system (S1), CPU 211 accesses TV Server TVS and retrieves the data (i.e., 'Title', 'Summary', 'Start Time', 'Stop Time', and 'Category' described hereinbefore) of TV program currently shown on Channel Number 20118*b* from TV Program Information Storage Area H18*b* (S2), and displays as TV Program Information 20118*c* on LCD 201 as described hereinbefore (S3). TV Program Information 20118*c* may be web-based.

This paragraph illustrates TV Program Listing 20118*d* displayed on LCD 201 (FIG. 1). 'PRn' represents a title of a TV program, and 'CHn' represents Channel Number 20118*a*. TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 is selected by way of moving the cursor displayed thereon by utilizing Input Device 210 or via voice recognition system. In the present example, the cursor is located on TV Program Pr 2.

This paragraph illustrates one of the software programs stored in TV Remote Controller Software Storage Area 20618*b* which displays TV Program Listing 20118*d* on LCD 201. When the user of Communication Device 200 selects TV program listing display mode by utilizing Input Device 210 or via voice recognition system (S1), CPU 211 accesses TV Server TVS and retrieves data (i.e., 'Title', 'Start Time', and 'Stop Time') from TV Program Listing Storage Area H18*c* (S2), and displays TV Program Listing 20118*d* on LCD 201 (S3). TV Program Listing 20118*d* may be web-based.

This paragraph illustrates TV Program Listing 20118*d* displayed on LCD 201 (FIG. 1) which enables to display TV Program Information 20118*c* of a selected TV program described hereinafter. 'PRn' represents a title of a TV program, and 'CHn' represents Channel Number 20118*a*. Referring to the example described hereinbefore, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. The cursor can be moved from one TV program to another one by utilizing Input Device 210 or via voice recognition system. In the present example, the cursor located on Pr 2 (as described hereinbefore) is moved to Pr4.

This paragraph illustrates the sequence of displaying TV Program Information 20118*c* from TV Program Listing 20118*d*. First, CPU 211 displays TV Program Listing 20118*d* on LCD 201 (S1). Next, the user of Communication Device 200 selects one of the TV programs listed in TV Program Listing 20118*d* by moving the cursor displayed on LCD 201 (S2). CPU 211 sends via Antenna 218 to TV Server TVS a TV program information request signal indicating TV Server TVS to send TV Program Information 20118*c* of the selected TV program (S3). CPU 211 retrieves TV Program Information 20118*c* from TV Server TVS via Antenna 218 (S4), and displays on LCD 201 thereafter as described hereinafter (S5).

This paragraph illustrates TV Program Information 20118*c* displayed on LCD 201 which is retrieved in S4 described hereinbefore. TV Program Information 20118*c* includes Channel Number 20118*b*, 'Title', 'Summary', 'Start Time', 'Stop Time', and 'Category'. Here, Channel Number 20118*b* represents the channel number of the TV program selected in S2 described hereinbefore, 'Title' represents the title of the TV program selected in S2 described hereinbefore, 'Summary' represents the summary of the TV program selected in S2 described hereinbefore, 'Start Time' represents the starting time of the TV program selected in S2 described hereinbefore, 'Stop Time' represents the ending time of the TV program selected in S2 described hereinbefore, and 'Category' represents the category to which the TV program selected in S2 described hereinbefore pertains.

This paragraph illustrates another embodiment of the method to display Channel Number 20118*a*. Instead of displaying all the available Channel Numbers 20118*a* as described hereinbefore, only Channel Number 20118*a* currently shown on TV 802 may be displayed on LCD 201, Channel Number 20118*a* '4' in the present example.

<<Start Up Software Function>>

The following paragraphs illustrate the start up software program function which enables Communication Device 200 to automatically activate (or start up) the registered software programs when the power is on.

This paragraph illustrates the overall sequence of the present function. The user of Communication Device 200 presses the power button of Communication Device 200 (S1). Then the predetermined software programs automatically activate (or start up) without having any instructions from the user of Communication Device 200 (S2).

This paragraph illustrates the storage area included RAM 206 (FIG. 1). RAM 206 includes Start Up Information Storage Area 20621a which is described hereinafter.

This paragraph illustrates the storage areas included in Start Up Information Storage Area 20621a. Start Up Information Storage Area 20621a includes Start Up Software Storage Area 20621b and Start Up Data Storage Area 20621c. Start Up Software Storage Area 20621b stores the software programs necessary to implement the present function, such as the ones described hereinafter. Start Up Data Storage Area 20621c stores the data necessary to implement the present function, such as the ones described hereinafter.

This paragraph illustrates the software programs stored in Start Up Software Storage Area 20621b. Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described hereinafter, Start Up Data Storage Area Scanning Software 20621b2 identifies the software programs which are automatically activated of which the sequence is described hereinafter, and Start Up Software Activating Software 20621b3 activates the identified software programs identified by Start Up Data Storage Area Scanning Software 20621b2 of which the sequence is described hereinafter.

This paragraph illustrates the storage area included in Start Up Data Storage Area 20621c. Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained hereinafter.

This paragraph illustrates the data stored in Start Up Software Index Storage Area 20621c1. Start Up Software Index Storage Area 20621c1 stores the software program indexes of the software programs which are automatically activated by the present function. Here, the software programs may be any software programs explained in this specification. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

This paragraph illustrates the sequence of Power On Detecting Software 20621b1 stored in Start Up Software Storage Area 20621b. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 of which the sequence is explained hereinafter.

This paragraph illustrates the sequence of Start Up Data Storage Area Scanning Software 20621b2 stored in Start Up Software Storage Area 20621b. CPU 211 (FIG. 1) scans Start Up Software Index Storage Area 20621c1 (S1), and identifies the software programs which are automatically activated (S2). CPU 211 activates Start Up Software Activating Software 20621b3 thereafter of which the sequence is explained hereinafter (S3).

This paragraph illustrates the sequence of Start Up Software Activating Software 20621b3 stored in Start Up Software Storage Area 20621b. CPU 211 (FIG. 1) activates the software programs of which the software program indexes are identified in S2 described hereinbefore (S1).

This paragraph illustrates another embodiment wherein the three software programs stored in Start Up Software Storage Area 20621b (i.e., Power On Detecting Software 20621b1, Start Up Data Storage Area Scanning Software 20621b2, Start Up Software Activating Software 20621b3) is integrated into one software program stored therein. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (S3), and identifies the software programs which are automatically activated (S4). CPU 211 activates the software programs thereafter of which the software program indexes are identified in S4 (S5).

As another embodiment, the software programs per se (not the software program indexes described hereinbefore may be stored in a specific storage area which are activated by the present function.

As another embodiment, the present function may be implemented at the time the user of Communication Device 200 logs on instead of at the time the Communication Device 200 is powered as described in S2 described hereinbefore.

<<Stereo Audio Data Output Function>>

The following paragraphs illustrate the stereo audio data output function which enables Communication Device 200 to output audio data from Speakers 216L and 216R in a stereo fashion.

This paragraph illustrates the storage area included in Host Data Storage Area H00c of Host H. In this embodiment, Host Data Storage Area H00c includes Stereo Audio Information Storage Area H22a. Stereo Audio Information Storage Area H22a stores the software programs and data necessary to implement the present function as described in details hereinafter.

This paragraph illustrates the storage areas included in Stereo Audio Information Storage Area H22a. In this embodiment, Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described hereinafter. Stereo Audio Data Storage Area H22c stores the data necessary to implement the present function, such as the ones described hereinafter.

This paragraph illustrates the stereo audio data stored in Stereo Audio Data Storage Area H22c. A plurality of stereo audio data are stored in Stereo Audio Data Storage Area H22c. In this embodiment, three stereo audio data, i.e., Stereo Audio Data H22c1, Stereo Audio Data H22c2, and Stereo Audio Data H22c3 are stored therein.

This paragraph illustrates the components of the stereo audio data stored in Stereo Audio Data Storage Area H22c. This paragraph describes the components of Stereo Audio Data H22c1 as an example. In this embodiment, Stereo Audio Data H22c1 includes Left Speaker Audio Data H22c1L, Right Speaker Audio Data H22c1R, and Stereo Audio Data Output Timing Data H22c1T. Left Speaker Audio Data H22c1L is an audio data which is designed to be output from Speaker 216L. Right Speaker Audio Data H22c1R is an audio data which is designed to be output from Speaker 216R. Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

This paragraph illustrates the sequence of the software program stored in Stereo Audio Software Storage Area H22b. In this embodiment, the software program stored in Stereo Audio Software Storage Area H22b extracts one of the stereo audio data stored in Stereo Audio Data Storage Area H22c and creates Transferred Stereo Audio Data TSAD for purposes of transferring the extracted stereo audio data to Communication Device 200 (S1).

This paragraph illustrates the components of Transferred Stereo Audio Data TSAD created by the software program stored in Stereo Audio Software Storage Area H22b. In this embodiment, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H, and Transferred Stereo Audio Data TSAD4 is the stereo audio data extracted in the manner described hereinbefore. Header TSAD1 and Footer TSAD5 indicate the beginning and the end of Transferred Stereo Audio Data TSAD.

This paragraph illustrates the storage area included in RAM 206 (FIG. 1) of Communication Device 200. In this embodiment, RAM 206 includes Stereo Audio Information Storage Area 20622a. Stereo Audio Information Storage Area 20622a stores the software programs and data necessary to implement the present function as described in details hereinafter.

This paragraph illustrates the storage areas included in Stereo Audio Information Storage Area 20622a. In this embodiment, Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described hereinafter. Stereo Audio Data Storage Area 20622c stores the data necessary to implement the present function, such as the ones described hereinafter.

This paragraph illustrates the stereo audio data stored in Stereo Audio Data Storage Area 20622c. A plurality of stereo audio data are stored in Stereo Audio Data Storage Area 20622c. In this embodiment, three stereo audio data, i.e., Stereo Audio Data 20622c1, Stereo Audio Data 20622c2, and Stereo Audio Data 20622c3 are stored therein.

This paragraph illustrates the components of the stereo audio data stored in Stereo Audio Data Storage Area 20622c. This paragraph describes the components of Stereo Audio Data 20622c1 as an example. In this embodiment, Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L. Right Speaker Audio Data 20622c1R is an audio data which is designed to be output from Speaker 216R. Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

The downloaded stereo audio data are stored in specific area(s) of Stereo Audio Data Storage Area 20622c.

This paragraph illustrates the sequence of selecting and preparing to output the stereo audio data from Speakers 216L and 216R in a stereo fashion. In this embodiment, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (S5).

This paragraph illustrates the sequence of outputting the stereo audio data from Speakers 216L and 216R in a stereo fashion. In this embodiment, the user of Communication Device 200 inputs a specific signal to output the stereo audio data by utilizing Input Device 210 (FIG. 1) or via voice recognition system (S1). Assuming Audio Data 20622c1 is selected in S2 described hereinbefore, CPU 211 outputs Left Speaker Audio Data 20622c1L and Right Speaker Audio Data 20622c1R from Speakers 216L and 216R respectively in a stereo fashion in accordance with Stereo Audio Data Output Timing Data 20622c1T (S2).

<<SOS Calling Function>>

The following paragraphs illustrate the SOS calling function which enables Communication Device 200 to notify the police department the current location of Communication Device 200 and the personal information of the user of Communication 200 when a 911 call is dialed from Communication Device 200.

This paragraph illustrates the storage area included in Host Information Storage Area H00a. Host Information Storage Area H00a includes SOS Calling Information Storage Area H29a of which the data stored therein are described hereinafter.

This paragraph illustrates the storage areas included in SOS Calling Information Storage Area H29a. SOS Calling Information Storage Area H29a includes SOS Calling Data Storage Area H29b and SOS Calling Software Storage Area H29c. SOS Calling Data Storage Area H29b stores the data necessary to implement the present function, such as the ones described hereinafter. SOS Calling Software Storage Area H29c stores the software programs necessary to implement the present function, such as the ones described hereinafter.

This paragraph illustrates the storage area included in SOS Calling Data Storage Area H29b. SOS Calling Data Storage Area H29b includes Police Department Location Data Storage Area H29b1 of which the data stored therein are described hereinafter.

This paragraph illustrates the data stored in Police Department Location Data Storage Area H29b1. Police Department Location Data Storage Area H29b1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the present example, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and/or the software programs necessary to implement the present function on the side of Communication Device 200 as described hereinafter may be downloaded from Host H.

This paragraph illustrates the storage area included in RAM 206 (FIG. 1) of Communication Device 200. RAM 206 includes SOS Calling Information Storage Area 20629a of which the details are described hereinafter.

This paragraph illustrates the storage areas included in SOS Calling Information Storage Area 20629a. SOS Calling Information Storage Area 20629a includes SOS Calling Data Storage Area 20629b and SOS Calling Software Storage Area 20629c. SOS Calling Data Storage Area 20629b includes data necessary to implement the present function, such as the ones described hereinafter. SOS Calling Software Storage Area 20629c stores the software programs necessary to implement the present function, such as the one described hereinafter.

This paragraph illustrates storage areas included in SOS Calling Data Storage Area 20629b. SOS Calling Data Storage Area 20629b includes GPS Data Storage Area 20629b1 and User Data Storage Area 20629b2. GPS Data Storage Area 20629b1 stores the data regarding the current geographical location produced by the method so-called GPS as described hereinbefore. User Data Storage Area 20629b2 stores the data regarding the personal information of the user of Communication Device 200 as described hereinafter.

This paragraph illustrates the data stored in User Data Storage Area 20629b2. User Data Storage Area 20629b2 includes User Data 20629UD which includes data regarding the personal information of the user of Communication Device 200. In the present example, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

This paragraph illustrates the software program stored in SOS Calling Software Storage Area 20629c. When the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629b1 (S3). CPU 211 then retrieves User Data 20629UD from User Data Storage Area 20629b2 and the GPS data from GPS Data Storage Area 20629b1 (S4), and composes SOS Data 20629SOS therefrom (S5), which is sent thereafter to Host H (S6).

This paragraph illustrates the elements of SOS Data 20629SOS. SOS Data 20629SOS comprises Connection Request 20629CR, GPS Data 20629GD, and User Data 20629UD. Connection Request 20629CR represents a request to Host H to forward the 911 call to a police department. GPS Data 20629GD is a data retrieved from GPS Data Storage Area 20629b1 as described in S4 described hereinbefore. User Data 20629UD is a data retrieved from User Data Storage Area 20629b2 as described in S4 described hereinbefore.

This paragraph illustrates the software program stored in SOS Calling Software Storage Area H29c of Host H. Host H periodically checks the incoming call (S1). If the incoming call is SOS Data 20629SOS (S2), Host H initiates the SOS calling process as described hereinafter (S3).

This paragraph illustrates the software program stored in SOS Calling Software Storage Area H29c of Host H. Host H retrieves GPS Data 20629GD from SOS Data 20629SOS (S1), and selects the closest police department by comparing GPS Data 20629GD and the data stored in column Location Data of Police Department Location Data Storage Area H29b1 of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

As another embodiment, User Data 20629UD stored in User Data Storage Area 20629b2 may be stored in SOS Calling Data Storage Area H29b of Host H. In this embodiment, SOS Data 20629SOS primarily comprises Connection Request 20629CR and GPS Data 20629GD, and User Data 20629UD is retrieved from SOS Calling Data Storage Area H29b of Host H, which is sent to the police department in S4 described hereinbefore.

<<Audiovisual Playback Function>>

The following paragraphs illustrate the audiovisual playback function which enables Communication Device 200 to playback audiovisual data, such as movies, soap operas, situation comedies, news, and any type of TV programs.

This paragraph illustrates the information stored in RAM 206 (FIG. 1). RAM 206 includes Audiovisual Playback Information Storage Area 20632a of which the information stored therein are described hereinafter.

The data and/or the software programs necessary to implement the present function may be downloaded to Communication Device 200 from Host H.

This paragraph illustrates the data and software programs stored in Audiovisual Playback Information Storage Area 20632a. Audiovisual Playback Information Storage Area 20632a includes Audiovisual Playback Data Storage Area 20632b and Audiovisual Playback Software Storage Area 20632c. Audiovisual Playback Data Storage Area 20632b stores the data necessary to implement the present function, such as the ones described hereinafter. Audiovisual Playback Software Storage Area 20632c stores the software programs necessary to implement the present function, such as the ones described hereinafter.

This paragraph illustrates the data stored in Audiovisual Playback Data Storage Area 20632b. Audiovisual Playback Data Storage Area 20632b includes Audiovisual Data Storage Area 20632b1 and Message Data Storage Area 20632b2. Audiovisual Data Storage Area 20632b1 stores a plurality of audiovisual data described hereinafter. Message Data Storage Area 20632b2 stores a plurality of message data described hereinafter.

This paragraph illustrates the audiovisual data stored in Audiovisual Data Storage Area 20632b1. Audiovisual Data Storage Area 20632b1 stores a plurality of audiovisual data wherein the audiovisual data stored therein in the present example are: Audiovisual Data 20632b1a, Audiovisual Data 20632b1b, Audiovisual Data 20632b1c, and Audiovisual Data 20632b1d, all of which are primarily composed of video data and audio data. Audiovisual Data 20632b1a is a movie, Audiovisual Data 20632b1b is a soap opera, Audiovisual Data 20632b1c is a situation comedy, Audiovisual Data 20632b1d is TV news in the present embodiment. As another embodiment, Audiovisual Data 20632b1d may be an audiovisual data taken via CCD Unit 214 (FIG. 1) and Microphone 215 (FIG. 1).

This paragraph illustrates the data stored in Message Data Storage Area 20632b2. Message Data Storage Area 20632b2 includes Start Message Text Data 20632b2a, Stop Message Text Data 20632b2b, Pause Message Text Data 20632b2c, Resume Message Text Data 20632b2c1, Slow Replay Message Text Data 20632b2d, Forward Message Text Data 20632b2e, Rewind Message Text Data 20632b2f, Next Message Text Data 20632b2g, and Previous Message Text Data 20632b2h. Start Message Text Data 20632b2a is a text data which is displayed on LCD 201 (FIG. 1) and which indicates that the playback of an audiovisual data is initiated. Stop Message Text Data 20632b2b is a text data which is displayed on LCD 201 and which indicates that the playback process of an audiovisual data is stopped. Pause Message Text Data 20632b2c is a text data which is displayed on LCD 201 and which indicates that the playback process of an audiovisual data is paused. Resume Message Text Data 20632b2c1 is a text data which is displayed on LCD 201 and which indicates that the playback process of an audiovisual data is resumed from the point it is paused. Slow Replay Message Text Data 20632b2d is a text data which is displayed on LCD 201 and which indicates that the playback process of an audiovisual data is implemented in a slow motion. Fast-Forward Message Text Data 20632b2e is a text data which is displayed on LCD 201 and which indicates that an audiovisual data is fast-forwarded. Fast-Rewind Message Text Data 20632b2f is a text data which is displayed on LCD 201 and which indicates that an audiovisual data is fast-rewinded. Next Message Text Data 20632b2g is a text data which is displayed on LCD 201 and which indicates that the playback process of the next audiovisual data stored in Audiovisual Data Storage Area 20632b1 is initiated. Previous Message Text Data 20632b2h is a text data which is displayed on LCD 201 and which indicates that the playback process of the previous audiovisual data stored in Audiovisual Data Storage Area 20632b1 is initiated.

This paragraph illustrates the software programs stored in Audiovisual Playback Software Storage Area 20632c. Audiovisual Playback Software Storage Area 20632c includes Audiovisual Start Software 20632c1, Audiovisual Stop Software 20632c2, Audiovisual Pause Software 20632c3, Audiovisual Resume Software 20632c3a, Audiovisual Slow Replay Software 20632c4, Audiovisual Fast-Forward Software 20632c5, Audiovisual Fast-Rewind Software 20632c6, Audiovisual Next Software 20632c7, and Audiovisual Previous Software 20632c8. Audiovisual Start Software 20632c1 is a software program which initiates the playback process of an audiovisual data. Audiovisual Stop Software 20632c2 is a software program which stops the playback process of an audiovisual data. Audiovisual Pause Software 20632c3 is a software program which pauses the playback process of an audiovisual data. Audiovisual Resume Software 20632c3a is a software program which resumes the playback process of the audiovisual data from the point it is paused by Audiovisual Pause Software 20632c3. Audiovisual Slow Replay Software 20632c4 is a software program which implements the playback process of an audiovisual data in a slow motion. Audiovisual Fast-Forward Software 20632c5 is a software program which fast-forwards an audiovisual data. Audiovisual Fast-Rewind Software 20632c6 is a software program which fast-rewinds an audiovisual data. Audiovisual Next Software 20632c7 is a software program which initiates the playback process of the next audiovisual data stored in Audiovisual Data Storage Area 20632b1. Audiovisual Previous Software 20632c8 is a software program which initiates the playback process of the previous audiovisual data stored in Audiovisual Data Storage Area 20632b1.

This paragraph illustrates the messages displayed on LCD 201 (FIG. 1). Eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20632b2a, 'Stop' is Stop Message Text Data 20632b2b, 'Pause' is Pause Message Text Data 20632b2c, 'Resume' is Resume Message Text Data 20632b2c1, 'Slow Reply' is Slow Replay Message Text Data 20632b2d, 'Fast-Forward' is Fast-Forward Message Text Data 20632b2e, 'Fast-Rewind' is Fast-Rewind Message Text Data 20632b2f, 'Next' is Next Message Text Data 20632b2g, 'Previous' is Previous Message Text Data 20632b2h described hereinbefore.

This paragraph illustrates Audiovisual Selecting Software 20632c9 stored in Audiovisual Playback Software Storage Area 20632c in preparation of executing the software programs described hereinafter. CPU 211 (FIG. 1) retrieves the identifications of the audiovisual data stored in Audiovisual Data Storage Area 20632b1 (S1). CPU 211 then displays a list of the identifications on LCD 201 (FIG. 1) (S2). A particular audiovisual data is selected by utilizing Input Device 210 (FIG. 1) or via voice recognition system (S3).

The following paragraphs illustrate the software programs stored in Audiovisual Playback Software Storage Area 20632c. Nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 described hereinbefore. The audiovisual stop signal indicates to stop the playback process of the audiovisual data selected in S3 described hereinbefore. The audiovisual pause signal indicates to pause the playback process of the audiovisual data selected in S3 described hereinbefore. The audiovisual resume signal indicates to resume the playback process of the audiovisual data selected in S3 described hereinbefore from the point the audio data is paused. The audiovisual slow replay signal indicates to implement the playback process of the audiovisual data selected in S3 described hereinbefore in a slow motion. The audiovisual fast-forward signal indicates to fast-forward the audiovisual data selected in S3 described hereinbefore. The audiovisual fast-rewind signal indicates to fast-rewind the audiovisual data selected in S3 described hereinbefore. The audiovisual next signal indicates to initiate the playback process of the next audiovisual data of the audiovisual data selected in S3 described hereinbefore both of which are stored in Audiovisual Data Storage Area 20632b1. The audiovisual previous signal indicates to initiate the playback process of the previous audiovisual data of the audiovisual data selected in S3 described hereinbefore both of which are stored in Audiovisual Data Storage Area 20632b1.

This paragraph illustrates Audiovisual Start Software 20632c1 stored in Audiovisual Playback Software Storage Area 20632c which initiates the playback process of the audiovisual data selected in S3 described hereinbefore. The audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 described hereinbefore (S2), and retrieves Start Message Text Data 20632b2a from Message Data Storage Area 20632b2 and displays the data on LCD 201 (FIG. 1) for a specified period of time (S3).

This paragraph illustrates Audiovisual Stop Software 20632c2 stored in Audiovisual Playback Software Storage Area 20632c which stops the playback process of the audiovisual data selected in S3 described hereinbefore. The audiovisual stop signal is input by utilizing Input Device 210 (FIG. 1) or via voice recognition system (S1). CPU 211 (FIG. 1) then stops the playback process of the audiovisual data selected in S3 described hereinbefore (S2), and retrieves Stop Message Text Data 20632b2b from Message Data Storage Area 20632b2 and displays the data on LCD 201 (FIG. 1) for a specified period of time (S3).

This paragraph illustrates Audiovisual Pause Software 20632c3 stored in Audiovisual Playback Software Storage Area 20632c which pauses the playback process of the audiovisual data selected in S3 described hereinbefore. The audiovisual pause signal is input by utilizing Input Device 210 (FIG. 1) or via voice recognition system (S1). CPU 211 (FIG. 1) then pauses the playback process of the audiovisual data selected in S3 described hereinbefore (S2), and retrieves Pause Message Text Data 20632b2c from Message Data Storage Area 20632b2 and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

This paragraph illustrates Audiovisual Resume Software 20632c3a stored in Audiovisual Playback Software Storage Area 20632c which resumes the playback process of the audiovisual data selected in S3 described hereinbefore from the point the audiovisual data is paused in S2 described hereinbefore. The audiovisual resume signal is input by utilizing Input Device 210 (FIG. 1) or via voice recognition system (S1). CPU 211 (FIG. 1) then resumes the playback process of the audiovisual data selected in S3 described hereinbefore (S2) from the point it is paused in S2 described hereinbefore, and retrieves Resume Message Text Data 20632b2c1 from Message Data Storage Area 20632b2 and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

This paragraph illustrates Audiovisual Slow Replay Software 20632c4 stored in Audiovisual Playback Software Storage Area 20632c which implements the playback process of the audiovisual data selected in S3 described hereinbefore in a slow motion. The audiovisual slow replay signal is input by utilizing Input Device 210 (FIG. 1) or via voice recognition system (S1). CPU 211 (FIG. 1) then initiates the playback process of the audiovisual data selected in S3 described hereinbefore in a slow motion (S2), and retrieves Slow Replay Message Text Data 20632b2d from Message Data Storage Area 20632b2 and displays the data on LCD 201 (FIG. 1) for a specified period of time (S3).

This paragraph illustrates Audiovisual Fast-Forward Software 20632c5 stored in Audiovisual Playback Software Storage Area 20632c which fast-forwards the audiovisual data selected in S3 described hereinbefore. The audiovisual fast-forward signal is input by utilizing Input Device 210 (FIG. 1) or via voice recognition system (S1). CPU 211 (FIG. 1) then fast-forwards the audiovisual data selected in S3 described hereinbefore (S2), and retrieves Fast-Forward Message Text Data 20632b2e from Message Data Storage Area 20632b2 and displays the data on LCD 201 (FIG. 1) for a specified period of time (S3).

This paragraph illustrates Audiovisual Fast-Rewind Software 20632c6 stored in Audiovisual Playback Software Storage Area 20632c which fast-rewinds the audiovisual data selected in S3 described hereinbefore. The audiovisual fast-rewind signal is input by utilizing Input Device 210 (FIG. 1) or via voice recognition system (S1). CPU 211 (FIG. 1) then fast-rewinds the audiovisual data selected in S3 described hereinbefore (S2), and retrieves Fast-Rewind Message Text Data 20632b2f from Message Data Storage Area 20632b2 and displays the data on LCD 201 (FIG. 1) for a specified period of time (S3).

This paragraph illustrates Audiovisual Next Software 20632c7 stored in Audiovisual Playback Software Storage Area 20632c which initiates the playback process of the next audiovisual data stored in Audiovisual Data Storage Area 20632b1. The audiovisual next signal is input by utilizing Input Device 210 (FIG. 1) or via voice recognition system (S1). CPU 211 (FIG. 1) then initiates the playback process of the next audiovisual data of the audiovisual data selected in S3 described hereinbefore both of which are stored in Audiovisual Data Storage Area 20632b1 (S2), and retrieves Next Message Text Data 20632b2g from Message Data Storage Area 20632b2 and displays the data on LCD 201 (FIG. 1) for a specified period of time (S3).

This paragraph illustrates Audiovisual Previous Software 20632c8 is a software program which initiates the playback process of the previous audiovisual data stored in Audiovisual Data Storage Area 20632b1. The audiovisual previous signal is input by utilizing Input Device 210 (FIG. 1) or via voice recognition system (S1). CPU 211 (FIG. 1) then initiates the playback process of the previous audiovisual data of the audiovisual data selected in S3 described hereinbefore both of which are stored in Audiovisual Data Storage Area 20632b1 (S2), and retrieves Previous Message Text Data 20632b2h from Message Data Storage Area 20632b2 and displays the data on LCD 201 (FIG. 1) for a specified period of time (S3).

As another embodiment, the audiovisual data stored in Audiovisual Data Storage Area 20632b1 may be stored in Host H and retrieved therefrom when the software programs described hereinbefore are executed. In this embodiment, the audio data is temporarily stored in RAM 206 (FIG. 1) and is erased from the portion which is playbacked.

<<Audio Playback Function>>

The following paragraphs illustrate the audio playback function which enables Communication Device 200 to playback audio data, such as jazz music, rock music, classic music, pops music, and any other types of audio data.

This paragraph illustrates the information stored in RAM 206 (FIG. 1). In this embodiment, RAM 206 includes Audio Playback Information Storage Area 20633a of which the information stored therein are described hereinafter.

The data and/or the software programs necessary to implement the present function may be downloaded to Communication Device 200 from Host H.

This paragraph illustrates the data and software programs stored in Audio Playback Information Storage Area 20633a. In this embodiment, Audio Playback Information Storage Area 20633a includes Audio Playback Data Storage Area 20633b and Audio Playback Software Storage Area 20633c. Audio Playback Data Storage Area 20633b stores the data necessary to implement the present function, such as the ones described hereinafter. Audio Playback Software Storage Area 20633c stores the software programs necessary to implement the present function, such as the ones described hereinafter.

This paragraph illustrates the data stored in Audio Playback Data Storage Area 20633b. In this embodiment, Audio Playback Data Storage Area 20633b includes Audio Data Storage Area 20633b1 and Message Data Storage Area 20633b2. Audio Data Storage Area 20633b1 stores a plurality of audio data described hereinafter. Message Data Storage Area 20633b2 stores a plurality of message data described hereinafter.

This paragraph illustrates the audio data stored in Audio Data Storage Area 20633b1. In this embodiment, Audio Data Storage Area 20633b1 stores a plurality of audio data wherein the audio data stored therein in the present example are: Audio Data 20633b1a, Audio Data 20633b1b, Audio Data 20633b1c, and Audio Data 20633b1d, all of which are primarily composed of video data and audio data. Audio Data 20633b1a is a jazz music, Audio Data 20633b1b is a rock music, Audio Data 20633b1c is a classic music, Audio Data 20633b1d is a pops music in the present embodiment. As another embodiment, Audio Data 20633b1d may be an audio data taken via CCD Unit 214 (FIG. 1) and Microphone 215 (FIG. 1).

This paragraph illustrates the data stored in Message Data Storage Area 20633b2. In this embodiment, Message Data Storage Area 20633b2 includes Start Message Text Data 20633b2a, Stop Message Text Data 20633b2b, Pause Message Text Data 20633b2c, Resume Message Text Data 20633b2c1, Slow Replay Message Text Data 20633b2d, Forward Message Text Data 20633b2e, Rewind Message Text Data 20633b2f, Next Message Text Data 20633b2g, and Previous Message Text Data 20633b2h. Start Message Text Data 20633b2a is a text data which is displayed on LCD 201 (FIG. 1) and which indicates that the playback of an audio data is initiated. Stop Message Text Data 20633b2b is a text data which is displayed on LCD 201 and which indicates that the playback process of an audio data is stopped. Pause Message Text Data 20633b2c is a text data which is displayed on LCD 201 and which indicates that the playback process of an audio data is paused. Resume Message Text Data 20633b2c1 is a text data which is displayed on LCD 201 and which indicates that the playback process of an audio data is resumed from the point it is paused. Slow Replay Message Text Data 20633b2d is a text data which is displayed on LCD 201 and which indicates that the playback process of an audio data is implemented in a slow motion. Fast-Forward Message Text Data 20633b2e is a text data which is displayed on LCD 201 and which indicates that an audio data is fast-forwarded. Fast-Rewind Message Text Data 20633b2f is a text data which is displayed on LCD 201 and which indicates that an audio data is fast-rewinded. Next Message Text Data 20633b2g is a text data which is displayed on LCD 201 and which indicates that the playback process of the next audio data stored in Audio Data Storage Area 20633b1 is initiated. Previous Message Text Data 20633b2h is a text data which is displayed on LCD 201 and which indicates that the playback process of the previous audio data stored in Audio Data Storage Area 20633b1 is initiated.

This paragraph illustrates the software programs stored in Audio Playback Software Storage Area 20633c. In this embodiment, Audio Playback Software Storage Area 20633c includes Audio Start Software 20633c1, Audio Stop Software 20633c2, Audio Pause Software 20633c3, Audio Resume Software 20633c3a, Audio Slow Replay Software 20633c4, Audio Fast-Forward Software 20633c5, Audio Fast-Rewind Software 20633c6, Audio Next Software 20633c7, and Audio Previous Software 20633c8. Audio Start Software 20633c1 is a software program which initiates the playback process of an audio data. Audio Stop Software 20633c2 is a software program which stops the playback process of an audio data. Audio Pause Software 20633c3 is a software program which pauses the playback process of an audio data. Audio Resume Software 20633c3a is a software program which resumes the playback process of the audio data from the point it is paused by Audio Pause Software 20633c3. Audio Slow Replay Software 20633c4 is a software program which implements the playback process of an audio data in a slow motion. Audio Fast-Forward Software 20633c5 is a software program which fast-forwards an audio data. Audio Fast-Rewind Software 20633c6 is a software program which fast-rewinds an audio data. Audio Next Software 20633c7 is a software program which initiates the playback process of the next audio data stored in Audio Data Storage Area 20633b1. Audio Previous Software 20633c8 is a software program which initiates the playback process of the previous audio data stored in Audio Data Storage Area 20633b1.

This paragraph illustrates the messages displayed on LCD 201 (FIG. 1). In this embodiment, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20633b2a, 'Stop' is Stop Message Text Data 20633b2b, 'Pause' is Pause Message Text Data 20633b2c, 'Resume' is Resume Message Text Data 20633b2c1, 'Slow Reply' is Slow Replay Message Text Data 20633b2d, 'Fast-Forward' is Fast-Forward Message Text Data 20633b2e, 'Fast-Rewind' is Fast-Rewind Message Text Data 20633b2f, 'Next' is Next Message Text Data 20633b2g, 'Previous' is Previous Message Text Data 20633b2h described hereinbefore.

This paragraph illustrates Audio Selecting Software 20633c9 stored in Audio Playback Software Storage Area 20633c in preparation of executing the software programs described hereinafter. In this embodiment, CPU 211 (FIG. 1) retrieves the identifications of the audio data stored in Audio Data Storage Area 20633b1 (S1). CPU 211 then displays a list of the identifications on LCD 201 (FIG. 1) (S2). A particular audio data is selected by utilizing Input Device 210 (FIG. 1) or via voice recognition system (S3).

This paragraph and the following paragraphs illustrate the software programs stored in Audio Playback Software Storage Area 20633c. As described in each drawing figure hereinafter, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 described hereinbefore. The audio stop signal indicates to stop the playback process of the audio data selected in S3 described hereinbefore. The audio pause signal indicates to pause the playback process of the audio data selected in S3 described hereinbefore. The audio resume signal indicates to resume the playback process of the audio data selected in S3 described hereinbefore from the point the audio data is paused. The audio slow replay signal indicates to implement the playback process of the audio data selected in S3 described hereinbefore in a slow motion. The audio fast-forward signal indicates to fast-forward the audio data selected in S3 described hereinbefore. The audio fast-rewind signal indicates to fast-rewind the audio data selected in S3 described hereinbefore. The audio next signal indicates to initiate the playback process of the next audio data of the audio data selected in S3 described hereinbefore both of which are stored in Audio Data Storage Area 20633b1. The audio previous signal indicates to initiate the playback process of the previous audio data of the audio data selected in S3 described hereinbefore both of which are stored in Audio Data Storage Area 20633b1.

This paragraph illustrates Audio Start Software 20633c1 stored in Audio Playback Software Storage Area 20633c which initiates the playback process of the audio data selected in S3 described hereinbefore. In this embodiment, the audio playback signal is input by utilizing Input Device 210 (FIG. 1) or via voice recognition system (S1). CPU 211 (FIG. 1) then initiates the playback process (i.e., outputs the audio data from Speaker 216 (FIG. 1)) of the audio data selected in S3 described hereinbefore (S2), and retrieves Start Message Text Data 20633b2a from Message Data Storage Area 20633b2 and displays the data on LCD 201 (FIG. 1) for a specified period of time (S3).

This paragraph illustrates Audio Stop Software 20633c2 stored in Audio Playback Software Storage Area 20633c which stops the playback process of the audio data selected in S3 described hereinbefore. In this embodiment, the audio stop signal is input by utilizing Input Device 210 (FIG. 1) or via voice recognition system (S1). CPU 211 (FIG. 1) then stops the playback process of the audio data selected in S3 described hereinbefore (S2), and retrieves Stop Message Text Data 20633b2b from Message Data Storage Area 20633b2 and displays the data on LCD 201 (FIG. 1) for a specified period of time (S3).

This paragraph illustrates Audio Pause Software 20633c3 stored in Audio Playback Software Storage Area 20633c which pauses the playback process of the audio data selected in S3 described hereinbefore. In this embodiment, the audio pause signal is input by utilizing Input Device 210 (FIG. 1) or via voice recognition system (S1). CPU 211 (FIG. 1) then pauses the playback process of the audio data selected in S3 described hereinbefore (S2), and retrieves Pause Message Text Data 20633b2c from Message Data Storage Area 20633b2 and displays the data on LCD 201 (FIG. 1) for a specified period of time (S3) When the playback process is paused in S2, the audio data included in the audio data is refrained from being output from Speaker 216 (FIG. 1).

This paragraph illustrates Audio Resume Software 20633c3a stored in Audio Playback Software Storage Area 20633c which resumes the playback process of the audio data selected in S3 described hereinbefore from the point the audiovisual data is paused in S2 described hereinbefore. In this embodiment, the audio resume signal is input by utilizing Input Device 210 (FIG. 1) or via voice recognition system (S1). CPU 211 (FIG. 1) then resumes the playback process of the audio data selected in S3 described hereinbefore from the point the audiovisual data is paused in S2 described hereinbefore (S2), and retrieves Resume Message Text Data 20633b2c1 from Message Data Storage Area 20633b2 and displays the data on LCD 201 (FIG. 1) for a specified period of time (S3).

This paragraph illustrates Audio Slow Replay Software 20633c4 stored in Audio Playback Software Storage Area 20633c which implements the playback process of the audio data selected in S3 described hereinbefore in a slow motion. In this embodiment, the audio slow replay signal is input by utilizing Input Device 210 (FIG. 1) or via voice recognition system (S1). CPU 211 (FIG. 1) then initiates the playback process of the audio data selected in S3 described hereinbefore in a slow motion (S2), and retrieves Slow Replay Message Text Data 20633b2d from Message Data Storage Area 20633b2 and displays the data on LCD 201 (FIG. 1) for a specified period of time (S3).

This paragraph illustrates Audio Fast-Forward Software 20633c5 stored in Audio Playback Software Storage Area 20633c which fast-forwards the audio data selected in S3 described hereinbefore. In this embodiment, the audio fast-forward signal is input by utilizing Input Device 210 (FIG. 1) or via voice recognition system (S1). CPU 211 (FIG. 1) then fast-forwards the audio data selected in S3 described hereinbefore (S2), and retrieves Fast-Forward Message Text Data 20633b2e from Message Data Storage Area 20633b2 and displays the data on LCD 201 (FIG. 1) for a specified period of time (S3).

This paragraph illustrates Audio Fast-Rewind Software 20633c6 stored in Audio Playback Software Storage Area 20633c which fast-rewinds the audio data selected in S3 described hereinbefore. In this embodiment, the audio fast-rewind signal is input by utilizing Input Device 210 (FIG. 1) or via voice recognition system (S1). CPU 211 (FIG. 1) then fast-rewinds the audio data selected in S3 described hereinbefore (S2), and retrieves Fast-Rewind Message Text Data 20633b2f from Message Data Storage Area 20633b2 and displays the data on LCD 201 (FIG. 1) for a specified period of time (S3).

This paragraph illustrates Audio Next Software 20633c7 stored in Audio Playback Software Storage Area 20633c which initiates the playback process of the next audio data stored in Audio Data Storage Area 20633b1. In this embodiment, the audio next signal is input by utilizing Input Device 210 (FIG. 1) or via voice recognition system (S1). CPU 211 (FIG. 1) then initiates the playback process of the next audio data of the audio data selected in S3 described hereinbefore both of which are stored in Audio Data Storage Area 20633b1 (S2), and retrieves Next Message Text Data 20633b2g from Message Data Storage Area 20633b2 and displays the data on LCD 201 (FIG. 1) for a specified period of time (S3).

This paragraph illustrates Audio Previous Software 20633c8 is a software program which initiates the playback process of the previous audio data stored in Audio Data Storage Area 20633b1. In this embodiment, the audio previous signal is input by utilizing Input Device 210 (FIG. 1) or via voice recognition system (S1). CPU 211 (FIG. 1) then initiates the playback process of the previous audio data of the audio data selected in S3 described hereinbefore both of which are stored in Audio Data Storage Area 20633b1 (S2), and retrieves Previous Message Text Data 20633b2h from Message Data Storage Area 20633b2 and displays the data on LCD 201 (FIG. 1) for a specified period of time (S3).

As another embodiment, the audio data stored in Audio Data Storage Area 20633b1 may be stored in Host H and retrieved therefrom when the software programs described hereinbefore are executed. In this embodiment, the audio data is temporarily stored in RAM 206 (FIG. 1) and is erased from the portion which is playbacked.

<<Digital Camera Function>>

The following paragraphs illustrate the digital camera function which enables Communication Device 200 to take digital photos by utilizing CCD Unit 214 (FIG. 1).

This paragraph illustrates the storage area included in RAM 206 (FIG. 1). In this embodiment, RAM 206 includes Digital Camera Information Storage Area 20646a of which the data and the software programs stored therein are described hereinafter.

The data and software programs stored in Digital Camera Information Storage Area 20646a may be downloaded from Host H.

This paragraph illustrates the storage areas included in Digital Camera Information Storage Area 20646a. In this embodiment, Digital Camera Information Storage Area 20646a includes Digital Camera Data Storage Area 20646b and Digital Camera Software Storage Area 20646c. Digital Camera Data Storage Area 20646b stores the data necessary to implement the present function, such as the ones described hereinafter. Digital Camera Software Storage Area 20646c stores the software programs necessary to implement the present function, such as the ones described hereinafter.

This paragraph illustrates the storage areas included in Digital Camera Data Storage Area 20646b. In this embodiment, Digital Camera Data Storage Area 20646b includes Photo Data Storage Area 20646b1 and Digital Camera Function Data Storage Area 20646b2. Photo Data Storage Area 20646b1 stores the data described hereinafter. Digital Camera Function Data Storage Area 20646b2 stores the data stored hereinafter.

This paragraph illustrates the data stored in Photo Data Storage Area 20646b1. In this embodiment, Photo Data Storage Area 20646b1 comprises two columns, i.e., 'Photo ID' and 'Photo Data'. Column 'Photo ID' stores the identifications of the photo data, and column 'Photo Data' stores a plurality of photo data taken by implementing the present function. In the example described in the present drawing, Photo Data Storage Area 20646b1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

This paragraph illustrates the storage areas included in Digital Camera Function Data Storage Area 20646b2. In this embodiment, Digital Camera Function Data Storage Area 20646b2 includes Quality Data Storage Area 20646b2a, Multiple Photo Shooting Number Data Storage Area 20646b2b, and Strobe Data Storage Area 20646b2c. Quality Data Storage Area 20646b2a stores the data selected in S2 described hereinafter. Multiple Photo Shooting Number Data Storage Area 20646b2b stores the data selected in S2 described hereinafter. Strobe Data Storage Area 20646b2c stores the data selected in S2 described hereinafter.

This paragraph illustrates the software programs stored in Digital Camera Software Storage Area 20646c. In this embodiment, Digital Camera Software Storage Area 20646c stores Quality Selecting Software 20646c1, Multiple Photo Shooting Software 20646c2, Trimming Software 20646c3, Digital Zooming Software 20646c4, Strobe Software 20646c5, Digital Camera Function Selecting Software 20646c6, Multiple Photo Shooting Number Selecting Software 20646c7, Strobe On/Off Selecting Software 20646c8, Photo Data Shooting Software 20646c9, and Multiple Photo Shooting Software 20646c10. Quality Selecting Software 20646c1 is the software program described hereinafter. Multiple Photo Shooting Software 20646c2 is the software program described hereinafter. Trimming Software 20646c3 is the software program described hereinafter. Digital Zooming Software 20646c4 is the software program described hereinafter. Strobe Software 20646c5 is the software program described hereinafter. Digital Camera Function Selecting Software 20646c6 is the software program described hereinafter. Multiple Photo Shooting Number Selecting Software 20646c7 is the software program described hereinafter. Strobe On/Off Selecting Software 20646c8 is the software program described hereinafter. Photo Data Shooting Software 20646c9 is the software program described hereinafter.

This paragraph illustrates Digital Camera Function Selecting Software 20646c6 stored in Digital Camera Software Storage Area 20646c which administers the overall flow of displaying the functions and selecting the option for each function. In this embodiment, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646c1 described hereinafter is activated when 'Quality' displayed on LCD 201 is selected in S2. Multiple Photo Shooting Number Selecting Software 20646c7 described hereinafter is activated when 'Multiple Photo' is selected in S2. Strobe On/Off Selecting Software 20646c8 described hereinafter is activated when 'Strobe' is selected in S2.

This paragraph illustrates Quality Selecting Software 20646c1 stored in Digital Camera Software Storage Area 20646c which selects the quality of the photo data taken by implementing the present function. In this embodiment, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646b2a (S3).

This paragraph illustrates Multiple Photo Shooting Number Selecting Software 20646c7 stored in Digital Camera Software Storage Area 20646c which selects the number of photos taken by a single photo shooting signal. In this embodiment, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646b2b (S3).

This paragraph illustrates Strobe On/Off Selecting Software 20646c8 stored in Digital Camera Software Storage Area 20646c which selects Flash Light Unit 220 (not shown) to be activated or not when a photo is taken. In this embodiment, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646b2c (S3).

This paragraph illustrates Photo Data Shooting Software 20646c9 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646b1. CPU 211 then retrieves the quality data from Quality Data Storage Area 20646b2a (S2). The photo data is input via CCD Unit 214 (S3), and the data is stored in Photo Data Storage Area 20646b1 with new photo ID in accordance with the quality data retrieved in S2 (S4).

This paragraph illustrates Multiple Photo Shooting Software 20646c2 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646b2b (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

This paragraph illustrates Strobe Software 20646c5 stored in Digital Camera Software Storage Area 20646c which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the strobe data from Strobe Data Storage Area 20646b2c (S2). If the strobe data is 'On' (S3), CPU 211 activates Flash Light Unit 220 (not shown) each time a photo is taken (S4). In other words, Strobe Software 20646c5 is harmonized with Multiple Photo Shooting Software 20646c2 described hereinbefore. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

This paragraph illustrates one embodiment of the zooming function which zooms the photo data stored in Photo Data Storage Area 20646b1. In this embodiment, a certain photo selected by the user of Communication Device 200 is displayed on LCD 201 (FIG. 1). Assuming that the user intends to zoom Object 206460bj, the object displayed on LCD 201, to a larger size. The user selects Area 46ARa which includes Object 206460bj by utilizing Input Device 210 (FIG. 1) or via voice recognition system, and the selected area is zoomed to fit the size of LCD 201. The zoomed photo is replaced with the original photo.

This paragraph illustrates the operation performed in RAM 206 (FIG. 1) to implement the zooming function described hereinbefore. A certain photo data selected by the user of Communication Device 200 is stored in Area 20646ARa of RAM 206. Here, the size of the photo data is as same as that of Area 20646ARa. In this embodiment, Display Area 20646DA is the area which is displayed on LCD 201 (FIG. 1). Area 46ARa is the area which is selected by the user of Communication Device 200. Object 206460bj is the object included in the photo data. Area 46ARa which includes Object 206460bj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646b1. The portion of the photo data which does not fit Area 20646ARa is cropped.

This paragraph illustrates Digital Zooming Software 20646c4 stored in Digital Camera Software Storage Area 20646c which implements the operation described hereinbefore. In this embodiment, CPU 211 (FIG. 1) displays a list of the photo IDs representing the photo data stored in Photo Data Storage Area 20646b1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Area 46ARa described hereinbefore is selected by utilizing Input Device 210 or via voice recognition system (S4). When a zooming signal is input by utilizing Input Device 210 or via voice recognition system (S5), CPU 211 (FIG. 1) implements the process described hereinbefore and replaces the original photo data with the zoomed photo data, which is stored in Photo Data Storage Area 20646b1 (S6).

This paragraph illustrates one embodiment of the trimming function which trims the photo data stored in Photo Data Storage Area 20646b1 and thereby moves the selected object to the center of the photo data. In this embodiment, a certain photo selected by the user of Communication Device 200 is displayed on LCD 201 (FIG. 1). Point 20646PTa adjacent to Object 206460bj is selected by utilizing Input Device 210

(FIG. 1) or via voice recognition system, and the photo is centered at Point 20646PTa. The trimmed photo is replaced with the original photo.

This paragraph illustrates the operation performed in RAM 206 (FIG. 1) to implement the trimming function described hereinbefore. In this embodiment, Display Area 20646DA is the portion of the photo data which is displayed on LCD 201 (FIG. 1). Object 206460*bj* is the object included in the photo data. Point 20646PTa is the point selected by the user of Communication Device 200 adjacent to Object 206460*bj* which is centered by the present function. In this embodiment, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646*b*1. The portion of the photo data which does not fit Area 20646ARa is cropped.

This paragraph illustrates Trimming Software 20646*c*3 stored in Digital Camera Software Storage Area 20646*c* which implements the operation described hereinbefore. In this embodiment, CPU 211 (FIG. 1) displays a list of the photo IDs representing the photo data stored in Photo Data Storage Area 20646*b*1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Point 20646PTa described hereinbefore is selected by utilizing Input Device 210 or via voice recognition system (S4). When a trimming signal is input by utilizing Input Device 210 or via voice recognition system (S5), CPU 211 (FIG. 1) centers the photo data at Point 20646PTa and replaces the original photo data with the trimmed photo data, which is stored in Photo Data Storage Area 20646*b*1 (S6).

<<Multiple Language Displaying Function>>

The following paragraphs illustrate the multiple language displaying function wherein a language is selected from a plurality of languages, such as English, Japanese, French, and German, which is utilized to operate Communication Device 200.

This paragraph illustrates the storage area included in RAM 206 (FIG. 1). In the present embodiment, RAM 206 includes Multiple Language Displaying Info Storage Area 20654*a* of which the data and the software programs stored therein are described hereinafter.

The data and/or the software programs stored in Multiple Language Displaying Info Storage Area 20654*a* may be downloaded from Host H.

This paragraph illustrates the storage areas included in Multiple Language Displaying Info Storage Area 20654*a*. In the present embodiment, Multiple Language Displaying Info Storage Area 20654*a* includes Multiple Language Displaying Data Storage Area 20654*b* and Multiple Language Displaying Software Storage Area 20654*c*. Multiple Language Displaying Data Storage Area 20654*b* stores the data necessary to implement the present function, such as the ones described hereinafter. Multiple Language Displaying Software Storage Area 20654*c* stores the software programs necessary to implement the present function, such as the ones described hereinafter.

This paragraph illustrates the storage areas included in Multiple Language Displaying Data Storage Area 20654*b*. In the present embodiment, Multiple Language Displaying Data Storage Area 20654*b* includes Language Tables Storage Area 20654*b*1, Language Type Data Storage Area 20654*b*2, Language Item Data Storage Area 20654*b*3, and Selected Language Table ID Storage Area 20654*b*4. Language Tables Storage Area 20654*b*1 stores the data described hereinafter. Language Type Data Storage Area 20654*b*2 stores the data described hereinafter. Language Item Data Storage Area 20654*b*3 stores the data described hereinafter. Selected Language Table ID Storage Area 20654*b*4 stores the language table ID selected in S4*s* described hereinafter.

This paragraph illustrates the storage areas included in Language Tables Storage Area 20654*b*1. In the present embodiment, Language Tables Storage Area 20654*b*1 includes Language Table #1 Storage Area 20654*b*1*a*, Language Table #2 Storage Area 20654*b*1*b*, Language Table #3 Storage Area 20654*b*1*c*, and Language Table #4 Storage Area 20654*b*1*d*. Language Table #1 Storage Area 20654*b*1*a* stores the data described hereinafter. Language Table #2 Storage Area 20654*b*1*b* stores the data described hereinafter. Language Table #3 Storage Area 20654*b*1*c* stores the data described hereinafter. Language Table #4 Storage Area 20654*b*1*d* stores the data described hereinafter.

This paragraph illustrates the data stored in Language Table #1 Storage Area 20654*b*1*a*. In the present embodiment, Language Table #1 Storage Area 20654*b*1*a* comprises two columns, i.e., 'Language Item ID' and 'Language Text Data'. Column 'Language Item ID' stores the language item IDs, and each language item ID represents the identification of the corresponding language text data.

Column 'Language Text Data' stores the language text data, and each language text data represents the English text data displayed on LCD 201 (FIG. 1). In the present embodiment, Language Table #1 Storage Area 20654*b*1*a* stores the following data: the language item ID 'Language Item #1' and the corresponding language text data 'Open file'; the language item ID 'Language Item #2' and the corresponding language text data 'Close file'; the language item ID 'Language Item #3' and the corresponding language text data 'Delete'; the language item ID 'Language Item #4' and the corresponding language text data 'Copy'; the language item ID 'Language Item #5' and the corresponding language text data 'Cut'; the language item ID 'Language Item #6' and the corresponding language text data 'Paste'; the language item ID 'Language Item #7' and the corresponding language text data 'Insert'; the language item ID 'Language Item #8' and the corresponding language text data 'File'; the language item ID 'Language Item #9' and the corresponding language text data 'Edit'; the language item ID 'Language Item #10' and the corresponding language text data 'View'; the language item ID 'Language Item #11' and the corresponding language text data 'Format'; the language item ID 'Language Item #12' and the corresponding language text data 'Tools'; the language item ID 'Language Item #13' and the corresponding language text data 'Window'; the language item ID 'Language Item #14' and the corresponding language text data 'Help'; the language item ID 'Language Item #15' and the corresponding language text data 'My Network'; the language item ID 'Language Item #16' and the corresponding language text data 'Trash'; the language item ID 'Language Item #17' and the corresponding language text data 'Local Disk'; the language item ID 'Language Item #18' and the corresponding language text data 'Save'; the language item ID 'Language Item #19' and the corresponding language text data 'Yes'; the language item ID 'Language Item #20' and the corresponding language text data 'No'; and the language item ID 'Language Item #21' and the corresponding language text data 'Cancel'.

This paragraph illustrates the data stored in Language Table #1 Storage Area 20654b1b. In the present embodiment, Language Table #1 Storage Area 20654b1b comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the present embodiment, Language Table #1 Storage Area 20654b1b stores the following data: the language item ID 'Language Item #1' and the corresponding language text data meaning 'Open file' in Japanese; the language item ID 'Language Item #2' and the corresponding language text data meaning 'Close file' in Japanese; the language item ID 'Language Item #3' and the corresponding language text data meaning 'Delete' in Japanese; the language item ID 'Language Item #4' and the corresponding language text data meaning 'Copy' in Japanese; the language item ID 'Language Item #5' and the corresponding language text data meaning 'Cut' in Japanese; the language item ID 'Language Item #6' and the corresponding language text data meaning 'Paste' in Japanese; the language item ID 'Language Item #7' and the corresponding language text data meaning 'Insert' in Japanese; the language item ID 'Language Item #8' and the corresponding language text data meaning 'File' in Japanese; the language item ID 'Language Item #9' and the corresponding language text data meaning 'Edit' in Japanese; the language item ID 'Language Item #10' and the corresponding language text data meaning 'View' in Japanese; the language item ID 'Language Item #11' and the corresponding language text data meaning 'Format' in Japanese; the language item ID 'Language Item #12' and the corresponding language text data meaning 'Tools' in Japanese; the language item ID 'Language Item #13' and the corresponding language text data meaning 'Window' in Japanese; the language item ID 'Language Item #14' and the corresponding language text data meaning 'Help' in Japanese; the language item ID 'Language Item #15' and the corresponding language text data meaning 'My Network' in Japanese; the language item ID 'Language Item #16' and the corresponding language text data meaning 'Trash' in Japanese; the language item ID 'Language Item #17' and the corresponding language text data meaning 'Local Disk' in Japanese; the language item ID 'Language Item #18' and the corresponding language text data meaning 'Save' in Japanese; the language item ID 'Language Item #19' and the corresponding language text data meaning 'Yes' in Japanese; the language item ID 'Language Item #20' and the corresponding language text data meaning 'No' in Japanese; and the language item ID 'Language Item #21' and the corresponding language text data meaning 'Cancel' in Japanese.

This paragraph illustrates the data stored in Language Table #1 Storage Area 20654b1c. In the present embodiment, Language Table #1 Storage Area 20654b1c comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the present embodiment, Language Table #1 Storage Area 20654b1c stores the following data: the language item ID 'Language Item #1' and the corresponding language text data 'French #1' meaning 'Open file' in French; the language item ID 'Language Item #2' and the corresponding language text data 'French #2' meaning 'Close file' in French; the language item ID 'Language Item #3' and the corresponding language text data 'French #3' meaning 'Delete' in French; the language item ID 'Language Item #4' and the corresponding language text data 'French #4' meaning 'Copy' in French; the language item ID 'Language Item #5' and the corresponding language text data 'French #5' meaning 'Cut' in French; the language item ID 'Language Item #6' and the corresponding language text data 'French #6' meaning 'Paste' in French; the language item ID 'Language Item #7' and the corresponding language text data 'French #7' meaning 'Insert' in French; the language item ID 'Language Item #8' and the corresponding language text data 'French #8' meaning 'File' in French; the language item ID 'Language Item #9' and the corresponding language text data 'French #9' meaning 'Edit' in French; the language item ID 'Language Item #10' and the corresponding language text data 'French #10' meaning 'View' in French; the language item ID 'Language Item #11' and the corresponding language text data 'French #11' meaning 'Format' in French; the language item ID 'Language Item #12' and the corresponding language text data 'French #12' meaning 'Tools' in French; the language item ID 'Language Item #13' and the corresponding language text data 'French #13' meaning 'Window' in French; the language item ID 'Language Item #14' and the corresponding language text data 'French #14' meaning 'Help' in French; the language item ID 'Language Item #15' and the corresponding language text data 'French #15' meaning 'My Network' in French; the language item ID 'Language Item #16' and the corresponding language text data 'French #16' meaning 'Trash' in French; the language item ID 'Language Item #17' and the corresponding language text data 'French #17' meaning 'Local Disk' in French; the language item ID 'Language Item #18' and the corresponding language text data 'French #18' meaning 'Save' in French; the language item ID 'Language Item #19' and the corresponding language text data 'French #19' meaning 'Yes' in French; the language item ID 'Language Item #20' and the corresponding language text data 'French #20' meaning 'No' in French; and the language item ID 'Language Item #21' and the corresponding language text data 'French #21' meaning 'Cancel' in French.

This paragraph illustrates the data stored in Language Table #1 Storage Area 20654b1d. In the present embodiment, Language Table #1 Storage Area 20654b1d comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the present embodiment, Language Table #1 Storage Area 20654b1d stores the following data: the language item ID 'Language Item #1' and the corresponding language text data 'German #1' meaning 'Open file' in German; the language item ID 'Language Item #2' and the corresponding language text data 'German #2' meaning 'Close file' in German; the language item ID 'Language Item #3' and the corresponding language text data 'German #3' meaning 'Delete' in German; the language item ID 'Language Item #4' and the corresponding language text data 'German #4' meaning 'Copy' in German; the language item ID 'Language Item #5' and the corresponding language text data 'German #5' meaning 'Cut' in German; the language item ID 'Language Item #6' and the corresponding language text data 'German #6' meaning 'Paste' in German; the language item ID 'Language Item #7' and the corresponding language text data 'German #7' meaning 'Insert' in German; the language item ID 'Language Item #8' and the corresponding language text data 'German #8' meaning 'File' in German; the language item ID 'Language Item #9' and the corresponding language text data 'German #9' meaning 'Edit' in German; the language item ID 'Language Item #10' and the corresponding language text data 'German #10' meaning 'View' in German; the language item ID 'Language Item #11' and the corresponding language text data 'German #11' meaning 'Format' in German; the language item ID 'Language Item #12' and the corresponding language text data 'German #12' meaning 'Tools' in German; the language item ID 'Language Item #13' and the corresponding language text data 'German #13' meaning 'Window' in German; the language item ID 'Language Item #14' and the corresponding language text data 'German #14' meaning 'Help' in German; the language item ID 'Language Item #15' and the corresponding language text data 'German #15' meaning 'My Network' in German; the language item ID 'Language Item #16' and the corresponding language text data 'German #16' meaning 'Trash' in German; the language item ID 'Language Item #17' and the corresponding language text data 'German #17' meaning 'Local Disk' in German; the language item ID 'Language Item #18' and the corresponding language text data 'German #18' meaning 'Save' in German; the language item ID 'Language Item #19' and the corresponding language text data 'German #19' meaning 'Yes' in German; the language item ID 'Language Item #20' and the corresponding language text data 'German #20' meaning 'No' in German; and the language item ID 'Language Item #21' and the corresponding language text data 'German #21' meaning 'Cancel' in German.

This paragraph illustrates data stored in Language Type Data Storage Area 20654b2. In the present embodiment, Language Type Data Storage Area 20654b2 comprises two columns, i.e., 'Language Table ID' and 'Language Type Data'. Column 'Language Table ID' stores the language table ID, and each language table ID represents the identification of the storage areas included in Language Tables Storage Area 20654b1. Column 'Language Type Data' stores the language type data, and each language type data represents the type of the language utilized in the language table of the corresponding language table ID. In the present embodiment, Language Type Data Storage Area 20654b2 stores the following data: the language table ID 'Language Table #1' and the corresponding language type data 'English'; the language table ID 'Language Table #2' and the corresponding language type data 'Japanese'; the language table ID 'Language Table #3' and the corresponding language type data 'French'; and the language table ID 'Language Table #4' and the corresponding language type data 'German'. Here, the language table ID 'Language Table #1' is an identification of Language Table #1 Storage Area 20654b1a; the language table ID 'Language Table #2' is an identification of Language Table #2 Storage Area 20654b1b; the language table ID 'Language Table #3' is an identification of Language Table #3 Storage Area 20654b1c; and the language table ID 'Language Table #4' is an identification of Language Table #4 Storage Area 20654b1d.

This paragraph illustrates the data stored in Language Item Data Storage Area 20654b3. In the present embodiment, Language Item Data Storage Area 20654b3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the present embodiment, Language Item Data Storage Area 20654b3 stores the following data: the language item ID 'Language Item #1' and the corresponding language item data 'Open file'; the language item ID 'Language Item #2' and the corresponding language item data 'Close file'; the language item ID 'Language Item #3' and the corresponding language item data 'Delete'; the language item ID 'Language Item #4' and the corresponding language item data 'Copy'; the language item ID 'Language Item #5' and the corresponding language item data 'Cut'; the language item ID 'Language Item #6' and the corresponding language item data 'Paste'; the language item ID 'Language Item #7' and the corresponding language item data 'Insert'; the language item ID 'Language Item #8' and the corresponding language item data 'File'; the language item ID 'Language Item #9' and the corresponding language item data 'Edit'; the language item ID 'Language Item #10' and the corresponding language item data 'View'; the language item ID 'Language Item #11' and the corresponding language item data 'Format'; the language item ID 'Language Item #12' and the corresponding language item data 'Tools'; the language item ID 'Language Item #13' and the corresponding language item data 'Window'; the language item ID 'Language Item #14' and the corresponding language item data 'Help'; the language item ID 'Language Item #15' and the corresponding language item data 'My Network'; the language item ID 'Language Item #16' and the corresponding language item data 'Trash'; the language item ID 'Language Item #17' and the corresponding language item data 'Local Disk'; the language item ID 'Language Item #18' and the corresponding language item data 'Save'; the language item ID 'Language Item #19' and the corresponding language item data 'Yes'; the language item ID 'Language Item #20' and the corresponding language item data 'No'; and the language item ID 'Language Item #21' and the corresponding language item data 'Cancel'. Primarily, the data stored in column 'Language Item Data' are same as the ones stored in column 'Language Text Data' of Language Table #1 Storage Area 20654b1a.

This paragraph illustrates the software program stored in Multiple Language Displaying Software Storage Area 20654c. In the present embodiment, Multiple Language Displaying Software Storage Area 20654c stores Language Selecting Software 20654c1, Selected Language Displaying Software 20654c2, Language Text Data Displaying Software For Word Processor 20654c3a, Language Text Data Displaying Software For Word Processor 20654c3b, and Language Text Data Displaying Software For Explorer 20654c4. Language Selecting Software 20654c1 is the software program described hereinafter. Selected Language Displaying Software 20654c2 is the software program described hereinafter. Language Text Data Displaying Software For Word Processor 20654c3a is the software program described hereinafter. Language Text Data Displaying Software For Word Processor 20654c3b is the software program described hereinafter. Language Text Data Displaying Software For Explorer 20654c4 is the software program described hereinafter.

<<Multiple Language Displaying Function—Utilizing English>>

This paragraph illustrates Language Selecting Software 20654c1 stored in Multiple Language Displaying Software Storage Area 20654c which selects the language utilized to operate Communication Device 200 from a plurality of languages. In the present embodiment, CPU 211 (FIG. 1) of Communication Device 200 retrieves the language type data from Language Type Data Storage Area 20654b2 (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654b2, and stores the language table ID (Language Table #1) in Selected Language Table ID Storage Area 20654b4 (S4).

This paragraph illustrates Selected Language Displaying Software 20654c2 stored in Multiple Language Displaying Software Storage Area 20654c which displays and operates with the language selected in S3 described hereinbefore (i.e., English). In the present embodiment, when Communication Device 200 is powered on (S1), CPU 211 (FIG. 1) of Communication Device 200 retrieves the selected language table ID (Language Table #1) from Selected Language Table ID Storage Area 20654b4 (S2). CPU 211 then identifies the storage area corresponding to the language table ID selected in S2 (Language Table #1 Storage Area 20654b1a) in Language Tables Storage Area 20654b1 (S3). Language text data displaying process is initiated thereafter of which the details are described hereinafter (S4).

This paragraph illustrates Language Text Data Displaying Software For Word Processor 20654c3a stored in Multiple Language Displaying Software Storage Area 20654c which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #1 Storage Area 20654b1a and displays the corresponding language text data 'File' at the predetermined location in the word processor (S2). CPU 211 identifies the language item ID 'Language Item #9' in Language Table #1 Storage Area 20654b1a and displays the corresponding language text data 'Edit' at the predetermined location in the word processor (S3). CPU 211 identifies the language item ID 'Language Item #10' in Language Table #1 Storage Area 20654b1a and displays the corresponding language text data 'View' at the predetermined location in the word processor (S4). CPU 211 identifies the language item ID 'Language Item #11' in Language Table #1 Storage Area 20654b1a and displays the corresponding language text data 'Format' at the predetermined location in the word processor (S5). CPU 211 identifies the language item ID 'Language Item #12' in Language Table #1 Storage Area 20654b1a and displays the corresponding language text data 'Tools' at the predetermined location in the word processor (S6). CPU 211 identifies the language item ID 'Language Item #13' in Language Table #1 Storage Area 20654b1a and displays the corresponding language text data 'Window' at the predetermined location in the word processor (S7). CPU 211 identifies the language item ID 'Language Item #14' in Language Table #1 Storage Area 20654b1a and displays the corresponding language text data 'Help' at the predetermined location in the word processor (S8). Alphanumeric data is input to the word processor by utilizing Input Device 210 (FIG. 1) or via voice recognition system thereafter (S9).

This paragraph illustrates the data displayed on LCD 201 (FIG. 1) of Communication Device 200 at the time Language Text Data Displaying Software For Word Processor 20654c3a is implemented. In the present embodiment, the word processor described hereinbefore is primarily composed of Menu Bar 20154MB and Alphanumeric Data Input Area 20154ADIA wherein the language text data described in S2 through S8 described hereinbefore are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

This paragraph illustrates Language Text Data Displaying Software For Word Processor 20654c3b stored in Multiple Language Displaying Software Storage Area 20654c which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #1 Storage Area 20654b1a and displays the corresponding language text data 'Save' at the predetermined location in the word processor (S2). CPU 211 identifies the language item ID 'Language Item #19' in Language Table #1 Storage Area 20654b1a and displays the corresponding language text data 'Yes' at the predetermined location in the word processor (S3). CPU 211 identifies the language item ID 'Language Item #20' in Language Table #1 Storage Area 20654b1a and displays the corresponding language text data 'No' at the predetermined location in the word processor (S4). CPU 211 identifies the language item ID 'Language Item #21' in Language Table #1 Storage Area 20654b1a and displays the corresponding language text data 'Cancel' at the predetermined location in the word processor (S5). The save signal indicating to save the alphanumeric data input in S9 described hereinbefore is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

This paragraph illustrates the data displayed on LCD 201 (FIG. 1) of Communication Device 200 at the time Language Text Data Displaying Software For Word Processor 20654c3b is implemented. In the present embodiment, Prompt 20154Pr is displayed on LCD 201 (FIG. 1) at the time Language Text Data Displaying Software For Word Processor 20654c3a is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

This paragraph illustrates Language Text Data Displaying Software For Explorer 20654c4 stored in Multiple Language Displaying Software Storage Area 20654c which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item #15' in Language Table #1 Storage Area 20654b1a and displays the corresponding language text data 'My Network' at the predetermined location in the Windows Explorer like software program (S2). CPU 211 identifies the language item ID 'Language Item #16' in Language Table #1 Storage Area 20654b1a and displays the corresponding language text data 'Trash' at the predetermined location in the Windows Explorer like software program (S3). CPU 211 identifies the language item ID 'Language Item #17' in Language Table #1 Storage Area 20654b1a and displays the corresponding language text data 'Local Disk' at the predetermined location in the Windows Explorer like software program (S4).

This paragraph illustrates the data displayed on LCD 201 (FIG. 1) of Communication Device 200 at the time Language Text Data Displaying Software For Explorer 20654c4 is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

<<Multiple Language Displaying Function—Utilizing Japanese>>

This paragraph illustrates Language Selecting Software 20654c1 stored in Multiple Language Displaying Software Storage Area 20654c which selects the language utilized to operate Communication Device 200 from a plurality of languages. In the present embodiment, CPU 211 (FIG. 1) of Communication Device 200 retrieves the language type data from Language Type Data Storage Area 20654b2 (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654b2, and stores the language table ID (Language Table #2) in Selected Language Table ID Storage Area 20654b4 (S4).

This paragraph illustrates Selected Language Displaying Software 20654c2 stored in Multiple Language Displaying Software Storage Area 20654c which displays and operates with the language selected in S3 described hereinbefore (i.e., Japanese). In the present embodiment, when Communication Device 200 is powered on (S1), CPU 211 (FIG. 1) of Communication Device 200 retrieves the selected language table ID (Language Table #2) from Selected Language Table ID Storage Area 20654b4 (S2). CPU 211 then identifies the storage area corresponding to the language table ID selected in S2 (Language Table #2 Storage Area 20654b1b) in Language Tables Storage Area 20654b1 (S3). Language text data displaying process is initiated thereafter of which the details are described hereinafter (S4).

This paragraph illustrates Language Text Data Displaying Software For Word Processor 20654c3a stored in Multiple Language Displaying Software Storage Area 20654c which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #2 Storage Area 20654b1b and displays the corresponding language text data indicating 'File' in Japanese at the predetermined location in the word processor (S2). CPU 211 identifies the language item ID 'Language Item #9' in Language Table #2 Storage Area 20654b1b and displays the corresponding language text data indicating 'Edit' in Japanese at the predetermined location in the word processor (S3). CPU 211 identifies the language item ID 'Language Item #10' in Language Table #2 Storage Area 20654b1b and displays the corresponding language text data indicating 'View' in Japanese at the predetermined location in the word processor (S4). CPU 211 identifies the language item ID 'Language Item #11' in Language Table #2 Storage Area 20654b1b and displays the corresponding language text data indicating 'Format' in Japanese at the predetermined location in the word processor (S5). CPU 211 identifies the language item ID 'Language Item #12' in Language Table #2 Storage Area 20654b1b and displays the corresponding language text data indicating 'Tools' in Japanese at the predetermined location in the word processor (S6). CPU 211 identifies the language item ID 'Language Item #13' in Language Table #2 Storage Area 20654b1b and displays the corresponding language text data indicating 'Window' in Japanese at the predetermined location in the word processor (S7). CPU 211 identifies the language item ID 'Language Item #14' in Language Table #2 Storage Area 20654b1b and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

This paragraph illustrates the data displayed on LCD 201 (FIG. 1) of Communication Device 200 at the time Language Text Data Displaying Software For Word Processor 20654c3a is implemented. In the present embodiment, the word processor described hereinbefore is primarily composed of Menu Bar 20154MB and Alphanumeric Data Input Area 20154ADIA wherein the language text data described in S2 through S8 described hereinbefore are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

This paragraph illustrates Language Text Data Displaying Software For Word Processor 20654c3b stored in Multiple Language Displaying Software Storage Area 20654c which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #2 Storage Area 20654b1b and displays the corresponding language text data indicating 'Save' in Japanese at the predetermined location in the word processor (S2). CPU 211 identifies the language item ID 'Language Item #19' in Language Table #2 Storage Area 20654b1b and displays the corresponding language text data indicating 'Yes' in Japanese at the predetermined location in the word processor (S3). CPU 211 identifies the language item ID 'Language Item #20' in Language Table #2 Storage Area 20654b1b and displays the corresponding language text data indicating 'No' in Japanese at the predetermined location in the word processor (S4). CPU 211 identifies the language item ID 'Language Item #21' in Language Table #2 Storage Area 20654b1b and displays the corresponding language text data indicating 'Cancel' in Japanese at the predetermined location in the word processor (S5). The save signal indicating to save the alphanumeric data input in S9 described hereinbefore is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

This paragraph illustrates the data displayed on LCD 201 (FIG. 1) of Communication Device 200 at the time Language Text Data Displaying Software For Word Processor 20654c3b is implemented. In the present embodiment, Prompt 20154Pr is displayed on LCD 201 (FIG. 1) at the time Language Text Data Displaying Software For Word Processor 20654c3a is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

This paragraph illustrates Language Text Data Displaying Software For Explorer 20654c4 stored in Multiple Language Displaying Software Storage Area 20654c which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item #15' in Language Table #2 Storage Area 20654b1b and displays the corresponding language text data indicating 'My Network' in Japanese at the predetermined location in the Windows Explorer like software program (S2). CPU 211 identifies the language item ID 'Language Item #16' in Language Table #2 Storage Area 20654b1b and displays the corresponding language text data indicating 'Trash' in Japanese at the predetermined location in the Windows Explorer like software program (S3). CPU 211 identifies the language item ID 'Language Item #17' in Language Table #2 Storage Area 20654b1b and displays the corresponding language text data indicating 'Local Disk' in Japanese at the predetermined location in the Windows Explorer like software program (S4).

This paragraph illustrates the data displayed on LCD 201 (FIG. 1) of Communication Device 200 at the time Language Text Data Displaying Software For Explorer 20654c4 is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

<<Multiple Language Displaying Function—Utilizing French>>

This paragraph illustrates Language Selecting Software 20654c1 stored in Multiple Language Displaying Software Storage Area 20654c which selects the language utilized to operate Communication Device 200 from a plurality of languages. In the present embodiment, CPU 211 (FIG. 1) of Communication Device 200 retrieves the language type data from Language Type Data Storage Area 20654b2 (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'French' is selected in S3. CPU 211 then identifies the language table ID corresponding to the language type data in Language Type Data Storage Area 20654b2, and stores the language table ID (Language Table #3) in Selected Language Table ID Storage Area 20654b4 (S4).

This paragraph illustrates Selected Language Displaying Software 20654c2 stored in Multiple Language Displaying Software Storage Area 20654c which displays and operates with the language selected in S3 described hereinbefore (i.e., French). In the present embodiment, when Communication Device 200 is powered on (S1), CPU 211 (FIG. 1) of Communication Device 200 retrieves the selected language table ID (Language Table #3) from Selected Language Table ID Storage Area 20654b4 (S2). CPU 211 then identifies the storage area corresponding to the language table ID selected in S2 (Language Table #3 Storage Area 20654b1c) in Language Tables Storage Area 20654b1 (S3). Language text data displaying process is initiated thereafter of which the details are described hereinafter (S4).

This paragraph illustrates Language Text Data Displaying Software For Word Processor 20654c3a stored in Multiple Language Displaying Software Storage Area 20654c which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #3 Storage Area 20654b1c and displays the corresponding language text data 'French #8' indicating 'File' in French at the predetermined location in the word processor (S2). CPU 211 identifies the language item ID 'Language Item #9' in Language Table #3 Storage Area 20654*b*1*c* and displays the corresponding language text data 'French #9' indicating 'Edit' in French at the predetermined location in the word processor (S3). CPU 211 identifies the language item ID 'Language Item #10' in Language Table #3 Storage Area 20654*b*1*c* and displays the corresponding language text data 'French #10' indicating 'View' in French at the predetermined location in the word processor (S4). CPU 211 identifies the language item ID 'Language Item #11' in Language Table #3 Storage Area 20654*b*1*c* and displays the corresponding language text data 'French #11' indicating 'Format' in French at the predetermined location in the word processor (S5). CPU 211 identifies the language item ID 'Language Item #12' in Language Table #3 Storage Area 20654*b*1*c* and displays the corresponding language text data 'French #12' indicating 'Tools' in French at the predetermined location in the word processor (S6). CPU 211 identifies the language item ID 'Language Item #13' in Language Table #3 Storage Area 20654*b*1*c* and displays the corresponding language text data 'French #13' indicating 'Window' in French at the predetermined location in the word processor (S7). CPU 211 identifies the language item ID 'Language Item #14' in Language Table #3 Storage Area 20654*b*1*c* and displays the corresponding language text data 'French #14' indicating 'Help' in French at the predetermined location in the word processor (S8). Alphanumeric data is input to the word processor by utilizing Input Device 210 (FIG. 1) or via voice recognition system thereafter (S9).

This paragraph illustrates the data displayed on LCD 201 (FIG. 1) of Communication Device 200 at the time Language Text Data Displaying Software For Word Processor 20654*c*3*a* is implemented. In the present embodiment, the word processor described hereinbefore is primarily composed of Menu Bar 20154MB and Alphanumeric Data Input Area 20154ADIA wherein the language text data described in S2 through S8 described hereinbefore are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154 MBH is the language text data processed in S8 of the previous paragraph.

This paragraph illustrates Language Text Data Displaying Software For Word Processor 20654*c*3*b* stored in Multiple Language Displaying Software Storage Area 20654*c* which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #3 Storage Area 20654*b*1*c* and displays the corresponding language text data 'French #18' indicating 'Save' in French at the predetermined location in the word processor (S2). CPU 211 identifies the language item ID 'Language Item #19' in Language Table #3 Storage Area 20654*b*1*c* and displays the corresponding language text data 'French #19' indicating 'Yes' in French at the predetermined location in the word processor (S3). CPU 211 identifies the language item ID 'Language Item #20' in Language Table #3 Storage Area 20654*b*1*c* and displays the corresponding language text data 'French #20' indicating 'No' in French at the predetermined location in the word processor (S4). CPU 211 identifies the language item ID 'Language Item #21' in Language Table #3 Storage Area 20654*b*1*c* and displays the corresponding language text data 'French #21' indicating 'Cancel' in French at the predetermined location in the word processor (S5). The save signal indicating to save the alphanumeric data input in S9 described hereinbefore is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

This paragraph illustrates the data displayed on LCD 201 (FIG. 1) of Communication Device 200 at the time Language Text Data Displaying Software For Word Processor 20654*c*3*b* is implemented. In the present embodiment, Prompt 20154Pr is displayed on LCD 201 (FIG. 1) at the time Language Text Data Displaying Software For Word Processor 20654*c*3*a* is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

This paragraph illustrates Language Text Data Displaying Software For Explorer 20654*c*4 stored in Multiple Language Displaying Software Storage Area 20654*c* which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item #15' in Language Table #3 Storage Area 20654*b*1*c* and displays the corresponding language text data 'French #15' indicating 'My Network' in French at the predetermined location in the Windows Explorer like software program (S2). CPU 211 identifies the language item ID 'Language Item #16' in Language Table #3 Storage Area 20654*b*1*c* and displays the corresponding language text data 'French #16' indicating 'Trash' in French at the predetermined location in the Windows Explorer like software program (S3). CPU 211 identifies the language item ID 'Language Item #17' in Language Table #3 Storage Area 20654*b*1*c* and displays the corresponding language text data 'French #17' indicating 'Local Disk' in French at the predetermined location in the Windows Explorer like software program (S4).

This paragraph illustrates the data displayed on LCD 201 (FIG. 1) of Communication Device 200 at the time Language Text Data Displaying Software For Explorer 20654*c*4 is executed. In the present embodiment, 20154LD, 20154MN, and 20154Tr are displayed on LCD 201 (FIG. 1) at the time Language Text Data Displaying Software For Explorer 20654*c*4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

<<Multiple Language Displaying Function—Utilizing German>>

This paragraph illustrates Language Selecting Software 20654c1 stored in Multiple Language Displaying Software Storage Area 20654c which selects the language utilized to operate Communication Device 200 from a plurality of languages. In the present embodiment, CPU 211 (FIG. 1) of Communication Device 200 retrieves the language type data from Language Type Data Storage Area 20654b2 (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'German' is selected in S3. CPU 211 then identifies the language table ID corresponding to the language type data in Language Type Data Storage Area 20654b2, and stores the language table ID (Language Table #4) in Selected Language Table ID Storage Area 20654b4 (S4).

This paragraph illustrates Selected Language Displaying Software 20654c2 stored in Multiple Language Displaying Software Storage Area 20654c which displays and operates with the language selected in S3 described hereinbefore (i.e., German). In the present embodiment, when Communication Device 200 is powered on (S1), CPU 211 (FIG. 1) of Communication Device 200 retrieves the selected language table ID (Language Table #4) from Selected Language Table ID Storage Area 20654b4 (S2). CPU 211 then identifies the storage area corresponding to the language table ID selected in S2 (Language Table #4 Storage Area 20654b1d) in Language Tables Storage Area 20654b1 (S3). Language text data displaying process is initiated thereafter of which the details are described hereinafter (S4).

This paragraph illustrates Language Text Data Displaying Software For Word Processor 20654c3a stored in Multiple Language Displaying Software Storage Area 20654c which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #4 Storage Area 20654b1d and displays the corresponding language text data 'German #8' indicating 'File' in German at the predetermined location in the word processor (S2). CPU 211 identifies the language item ID 'Language Item #9' in Language Table #4 Storage Area 20654b1d and displays the corresponding language text data 'German #9' indicating 'Edit' in German at the predetermined location in the word processor (S3). CPU 211 identifies the language item ID 'Language Item #10' in Language Table #4 Storage Area 20654b1d and displays the corresponding language text data 'German #10' indicating 'View' in German at the predetermined location in the word processor (S4). CPU 211 identifies the language item ID 'Language Item #11' in Language Table #4 Storage Area 20654b1d and displays the corresponding language text data 'German #11' indicating 'Format' in German at the predetermined location in the word processor (S5). CPU 211 identifies the language item ID 'Language Item #12' in Language Table #4 Storage Area 20654b1d and displays the corresponding language text data 'German #12' indicating 'Tools' in German at the predetermined location in the word processor (S6). CPU 211 identifies the language item ID 'Language Item #13' in Language Table #4 Storage Area 20654b1d and displays the corresponding language text data 'German #13' indicating 'Window' in German at the predetermined location in the word processor (S7). CPU 211 identifies the language item ID 'Language Item #14' in Language Table #4 Storage Area 20654b1d and displays the corresponding language text data 'German #14' indicating 'Help' in German at the predetermined location in the word processor (S8). Alphanumeric data is input to the word processor by utilizing Input Device 210 (FIG. 1) or via voice recognition system thereafter (S9).

This paragraph illustrates the data displayed on LCD 201 (FIG. 1) of Communication Device 200 at the time Language Text Data Displaying Software For Word Processor 20654c3a is implemented. In the present embodiment, the word processor described hereinbefore is primarily composed of Menu Bar 20154MB and Alphanumeric Data Input Area 20154ADIA wherein the language text data described in S2 through S8 described hereinbefore are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

This paragraph illustrates Language Text Data Displaying Software For Word Processor 20654c3b stored in Multiple Language Displaying Software Storage Area 20654c which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #4 Storage Area 20654b1d and displays the corresponding language text data 'German #18' indicating 'Save' in German at the predetermined location in the word processor (S2). CPU 211 identifies the language item ID 'Language Item #19' in Language Table #4 Storage Area 20654b1d and displays the corresponding language text data 'German #19' indicating 'Yes' in German at the predetermined location in the word processor (S3). CPU 211 identifies the language item ID 'Language Item #20' in Language Table #4 Storage Area 20654b1d and displays the corresponding language text data 'German #20' indicating 'No' in German at the predetermined location in the word processor (S4). CPU 211 identifies the language item ID 'Language Item #21' in Language Table #4 Storage Area 20654b1d and displays the corresponding language text data 'German #21' indicating 'Cancel' in German at the predetermined location in the word processor (S5). The save signal indicating to save the alphanumeric data input in S9 described hereinbefore is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

This paragraph illustrates the data displayed on LCD 201 (FIG. 1) of Communication Device 200 at the time Language Text Data Displaying Software For Word Processor 20654c3b is implemented. In the present embodiment, Prompt 20154Pr is displayed on LCD 201 (FIG. 1) at the time Language Text Data Displaying Software For Word Processor 20654c3a is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

This paragraph illustrates Language Text Data Displaying Software For Explorer 20654c4 stored in Multiple Language Displaying Software Storage Area 20654c which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item #15' in Language Table #4 Storage Area 20654b1d and displays the corresponding language text data 'German #15' indicating 'My Network' in German at the predetermined location in the Windows Explorer like software program (S2). CPU 211 identifies the language item ID 'Language Item #16' in Language Table #4 Storage Area 20654b1d and displays the corresponding language text data 'German #16' indicating 'Trash' in German at the predetermined location in the Windows Explorer like software program (S3). CPU 211 identifies the language item ID 'Language Item #17' in Language Table #4 Storage Area 20654b1d and displays the corresponding language text data 'German #17' indicating 'Local Disk' in German at the predetermined location in the Windows Explorer like software program (S4).

This paragraph illustrates the data displayed on LCD 201 (FIG. 1) of Communication Device 200 at the time Language Text Data Displaying Software For Explorer 20654c4 is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

<<Multiple Language Displaying Function—Utilizing Other Languages>>

For the avoidance of doubt, the present function is not limited to select a language, to operate Communication Device 200, only from the foregoing four languages of English, Japanese, French, and German. The present function is also capable to select a language from Dutch, Chinese, Arabic, Korean, Spanish, Italian, and any other languages existing in this world, in addition to the foregoing four languages.

<<Caller's Information Displaying Function>>

The following paragraphs illustrate the Caller's Information displaying function which displays the Information regarding the caller (e.g., name, phone number, email address, and home address, etc.) on LCD 201 (FIG. 1) when Communication Device 200 is utilized as a 'TV phone'.

The first set of paragraphs hereinafter illustrate the data and software programs stored in RAM 206 (FIG. 1) of Caller's Device, a Communication Device 200, utilized by the caller.

The second set of paragraphs hereinafter illustrate the data and software programs stored in RAM 206 (FIG. 1) of Callee's Device, a Communication Device 200, utilized by the callee.

The third set of paragraphs hereinafter illustrate the data and software programs stored in Host H.

This paragraph illustrates the storage area included in RAM 206 (FIG. 1) of Caller's Device. In the present embodiment, RAM 206 of Caller's Device includes Caller's Information Displaying Information Storage Area 20655a of which the data and the software programs stored therein are described hereinafter.

This paragraph illustrates the storage areas included in Caller's Information Displaying Information Storage Area 20655a. In the present embodiment, Caller's Information Displaying Information Storage Area 20655a includes Caller's Information Displaying Data Storage Area 20655b and Caller's Information Displaying Software Storage Area 20655c. Caller's Information Displaying Data Storage Area 20655b stores the data necessary to implement the present function on the side of Caller's Device, such as the ones described hereinafter. Caller's Information Displaying Software Storage Area 20655c stores the software programs necessary to implement the present function on the side of Caller's Device, such as the ones described hereinafter.

This paragraph illustrates the storage areas included in Caller's Information Displaying Data Storage Area 20655b. In the present embodiment, Caller's Information Displaying Data Storage Area 20655b includes Caller's Audiovisual Data Storage Area 20655b1, Callee's Audiovisual Data Storage Area 20655b2, Caller's Personal Data Storage Area 20655b3, Callee's Personal Data Storage Area 20655b4, Caller's Calculated GPS Data Storage Area 20655b5, Callee's Calculated GPS Data Storage Area 20655b6, Caller's Map Data Storage Area 20655b7, Callee's Map Data Storage Area 20655b8, and Work Area 20655b9. Caller's Audiovisual Data Storage Area 20655b1 stores the data described hereinafter. Callee's Audiovisual Data Storage Area 20655b2 stores the data described hereinafter. Caller's Personal Data Storage Area 20655b3 stores the data described hereinafter. Callee's Personal Data Storage Area 20655b4 stores the data described hereinafter. Caller's Calculated GPS Data Storage Area 20655b5 stores the caller's calculated GPS data which represents the current geographic location of Caller's Device in (x, y, z) format. Callee's Calculated GPS Data Storage Area 20655b6 stores the callee's calculated GPS data which represents the current geographic location of Callee's Device in (x, y, z) format. Caller's Map Data Storage Area 20655b7 stores the map data representing the surrounding area of the location indicated by the caller's calculated GPS data. Callee's Map Data Storage Area 20655b8 stores the map data representing the surrounding area of the location indicated by the callee's calculated GPS data. Work Area 20655b9 is a storage area utilized to perform calculation and to temporarily store data.

This paragraph illustrates the storage areas included in Caller's Audiovisual Data Storage Area 20655b1. In the present embodiment, Caller's Audiovisual Data Storage Area 20655*b*1 includes Caller's Audio Data Storage Area 20655*b*1*a* and Caller's Visual Data Storage Area 20655*b*1*b*. Caller's Audio Data Storage Area 20655*b*1*a* stores the caller's audio data which represents the audio data input via Microphone 215 (FIG. 1) of Caller's Device. Caller's Visual Data Storage Area 20655*b*1*b* stores the caller's visual data which represents the visual data input via CCD Unit 214 (FIG. 1) of Caller's Device.

This paragraph illustrates the storage areas included in Callee's Audiovisual Data Storage Area 20655*b*2. In the present embodiment, Callee's Audiovisual Data Storage Area 20655*b*2 includes Callee's Audio Data Storage Area 20655*b*2*a* and Callee's Visual Data Storage Area 20655*b*2*b*. Callee's Audio Data Storage Area 20655*b*2*a* stores the callee's audio data which represents the audio data sent from Callee's Device. Callee's Visual Data Storage Area 20655*b*2*b* stores the callee's visual data which represents the visual data sent from Callee's Device.

This paragraph illustrates the data stored in Caller's Personal Data Storage Area 20655*b*3. In the present embodiment, Caller's Personal Data Storage Area 20655*b*3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the present embodiment, Caller's Personal Data Storage Area 20655*b*3 stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

This paragraph illustrates the data stored in Callee's Personal Data Storage Area 20655*b*4. In the present embodiment, Callee's Personal Data Storage Area 20655*b*4 stores the callee's personal data which represent the personal data of the callee which are displayed on LCD 201 (FIG. 1) of Caller's Device. In the present embodiment, Callee's Personal Data Storage Area 20655*b*4 stores the callee's name and phone number.

This paragraph illustrates the software programs stored in Caller's Information Displaying Software Storage Area 20655*c*. In the present embodiment, Caller's Information Displaying Software Storage Area 20655*c* stores Permitted Caller's Personal Data Selecting Software 20655*c*1, Dialing Software 20655*c*2, Caller's Device Pin-pointing Software 20655*c*3, Map Data Sending/Receiving Software 20655*c*4, Caller's Audiovisual Data Collecting Software 20655*c*5, Caller's Information Sending/Receiving Software 20655*c*6, Callee's Information Sending/Receiving Software 20655*c*6*a*, Permitted Callee's Personal Data Displaying Software 20655*c*7, Map Displaying Software 20655*c*8, Callee's Audio Data Outputting Software 20655*c*9, and Callee's Visual Data Displaying Software 20655*c*10. Permitted Caller's Personal Data Selecting Software 20655*c*1 is the software program described hereinafter. Dialing Software 20655*c*2 is the software program described hereinafter. Caller's Device Pin-pointing Software 20655*c*3 is the software program described hereinafter. Map Data Sending/Receiving Software 20655*c*4 is the software program described hereinafter. Caller's Audiovisual Data Collecting Software 20655*c*5 is the software program described hereinafter. Caller's Information Sending/Receiving Software 20655*c*6 is the software program described hereinafter. Callee's Information Sending/Receiving Software 20655*c*6*a* is the software program described hereinafter. Permitted Callee's Personal Data Displaying Software 20655*c*7 is the software program described hereinafter. Map Displaying Software 20655*c*8 is the software program described hereinafter. Callee's Audio Data Outputting Software 20655*c*9 is the software program described hereinafter. Callee's Visual Data Displaying Software 20655*c*10 is the software program described hereinafter.

This paragraph illustrates the storage area included in RAM 206A (FIG. 1) of Callee's Device. In the present embodiment, RAM 206A of Callee's Device includes Callee's Information Displaying Information Storage Area 20655*a*A of which the data and the software programs stored therein are described hereinafter.

This paragraph illustrates the storage areas included in Callee's Information Displaying Information Storage Area 20655*a*A. In the present embodiment, Callee's Information Displaying Information Storage Area 20655*a*A includes Callee's Information Displaying Data Storage Area 20655*b*A and Callee's Information Displaying Software Storage Area 20655*c*A. Callee's Information Displaying Data Storage Area 20655*b*A stores the data necessary to implement the present function on the side of Callee's Device, such as the ones described hereinafter. Callee's Information Displaying Software Storage Area 20655*c*A stores the software programs necessary to implement the present function on the side of Callee's Device, such as the ones described hereinafter.

This paragraph illustrates the storage areas included in Callee's Information Displaying Data Storage Area 20655*b*A. In the present embodiment, Callee's Information Displaying Data Storage Area 20655*b*A includes Caller's Audiovisual Data Storage Area 20655*b*1A, Callee's Audiovisual Data Storage Area 20655*b*2A, Caller's Personal Data Storage Area 20655*b*3A, Callee's Personal Data Storage Area 20655*b*4A, Caller's Calculated GPS Data Storage Area 20655*b*5A, Callee's Calculated GPS Data Storage Area 20655*b*6A, Caller's Map Data Storage Area 20655*b*7A, Callee's Map Data Storage Area 20655*b*8A, and Work Area 20655*b*9A. Caller's Audiovisual Data Storage Area 20655*b*1A stores the data described hereinafter. Callee's Audiovisual Data Storage Area 20655*b*2A stores the data described hereinafter. Caller's Personal Data Storage Area 20655*b*3A stores the data described hereinafter. Callee's Personal Data Storage Area 20655*b*4A stores the data described hereinafter. Caller's Calculated GPS Data Storage Area 20655*b*5A stores the caller's calculated GPS data which represents the current geographic location of Caller's Device in (x, y, z) format. Callee's Calculated GPS Data Storage Area 20655*b*6A stores the callee's calculated GPS data which represents the current geographic location of Callee's Device in (x, y, z) format. Caller's Map Data Storage Area 20655b7A stores the map data representing the surrounding area of the location indicated by the caller's calculated GPS data. Callee's Map Data Storage Area 20655b8A stores the map data representing the surrounding area of the location indicated by the callee's calculated GPS data. Work Area 20655b9A is a storage area utilized to perform calculation and to temporarily store data.

This paragraph illustrates the storage areas included in Caller's Audiovisual Data Storage Area 20655b1A. In the present embodiment, Caller's Audiovisual Data Storage Area 20655b1A includes Caller's Audio Data Storage Area 20655b1aA and Caller's Visual Data Storage Area 20655b1bA. Caller's Audio Data Storage Area 20655b1aA stores the caller's audio data which represents the audio data sent from Caller's Device in a wireless fashion. Caller's Visual Data Storage Area 20655b1bA stores the caller's visual data which represents the visual data input sent from Caller's Device in a wireless fashion.

This paragraph illustrates the storage areas included in Callee's Audiovisual Data Storage Area 20655b2A. In the present embodiment, Callee's Audiovisual Data Storage Area 20655b2A includes Callee's Audio Data Storage Area 20655b2aA and Callee's Visual Data Storage Area 20655b2bA. Callee's Audio Data Storage Area 20655b2aA stores the callee's audio data which represents the audio data input via Microphone 215 (FIG. 1) of Callee's Device. Callee's Visual Data Storage Area 20655b2bA stores the callee's visual data which represents the visual data input via CCD Unit 214 (FIG. 1) of Callee's Device.

This paragraph illustrates the data stored in Caller's Personal Data Storage Area 20655b3A. In the present embodiment, Caller's Personal Data Storage Area 20655b3A stores the caller's personal data which represent the personal data of the caller which are displayed on LCD 201 (FIG. 1) of Caller's Device. In the present embodiment, Caller's Personal Data Storage Area 20655b3A stores the caller's name, phone number, email address, and home address.

This paragraph illustrates the data stored in Callee's Personal Data Storage Area 20655b4A. In the present embodiment, Callee's Personal Data Storage Area 20655b4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the present embodiment, Callee's Personal Data Storage Area 20655b4A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

This paragraph illustrates the software programs stored in Callee's Information Displaying Software Storage Area 20655cA. In the present embodiment, Callee's Information Displaying Software Storage Area 20655cA stores Permitted Callee's Personal Data Selecting Software 20655c1A, Dialing Software 20655c2A, Callee's Device Pin-pointing Software 20655c3A, Map Data Sending/Receiving Software 20655c4A, Callee's Audiovisual Data Collecting Software 20655c5A, Callee's Information Sending/Receiving Software 20655c6A, Caller's Information Sending/Receiving Software 20655c6aA, Permitted Caller's Personal Data Displaying Software 20655c7A, Map Displaying Software 20655c8A, Caller's Audio Data Outputting Software 20655c9A, and Caller's Visual Data Displaying Software 20655c10A. Permitted Callee's Personal Data Selecting Software 20655c1A is the software program described hereinafter. Dialing Software 20655c2A is the software program described hereinafter. Callee's Device Pin-pointing Software 20655c3A is the software program described hereinafter. Map Data Sending/Receiving Software 20655c4A is the software program described hereinafter. Callee's Audiovisual Data Collecting Software 20655c5A is the software program described hereinafter. Callee's Information Sending/Receiving Software 20655c6A is the software program described hereinafter. Caller's Information Sending/Receiving Software 20655c6aA is the software program described hereinafter. Permitted Caller's Personal Data Displaying Software 20655c7A is the software program described hereinafter. Map Displaying Software 20655c8A is the software program described hereinafter. Caller's Audio Data Outputting Software 20655c9A is the software program described hereinafter. Caller's Visual Data Displaying Software 20655c10A is the software program described hereinafter.

This paragraph illustrates the storage area included in Host H. In the present embodiment, Host H includes Caller/Callee Information Storage Area H55a of which the data and the software programs stored therein are described hereinafter.

This paragraph illustrates the storage areas included in Caller/Callee Information Storage Area H55a. In the present embodiment, Caller/Callee Information Storage Area H55a includes Caller/Callee Data Storage Area H55b and Caller/Callee Software Storage Area H55c. Caller/Callee Data Storage Area H55b stores the data necessary to implement the present function on the side of Host H, such as the ones described hereinafter. Caller/Callee Software Storage Area H55c stores the software programs necessary to implement the present function on the side of Host H, such as the ones described hereinafter.

This paragraph illustrates the storage areas included in Caller/Callee Data Storage Area H55b. In the present embodiment, Caller/Callee Data Storage Area H55b includes Caller's Information Storage Area H55b1, Callee's Information Storage Area H55b2, Map Data Storage Area H55b3, Work Area h55b4, Caller's Calculated GPS Data Storage Area H55b5, and Callee's Calculated GPS Data Storage Area H55b6. Caller's Information Storage Area H55b1 stores the Caller's Information received Caller's Device. Callee's Information Storage Area H55b2 stores the Callee's Information received Callee's Device. Map Data Storage Area H55b3 stores the map data received from Caller's Device and Callee's Device. Work Area H55b4 is a storage area utilized to perform calculation and to temporarily store data. Caller's Calculated GPS Data Storage Area H55b5 stores the caller's calculated GPS data. Callee's Calculated GPS Data Storage Area H55b6 stores the callee's calculated GPS data.

This paragraph illustrates the software programs stored in Caller/Callee Software Storage Area H55c. In the present embodiment, Caller/Callee Software Storage Area H55c stores Dialing Software H55c2, Caller's Device Pin-pointing Software H55c3, Callee's Device Pin-pointing Software H55c3a, Map Data Sending/Receiving Software H55c4, Caller's Information Sending/Receiving Software H55c6, and Callee's Information Sending/Receiving Software H55c6a. Dialing Software H55c2 is the software program described hereinafter. Caller's Device Pin-pointing Software H55c3 is the software program described hereinafter. Callee's Device Pin-pointing Software H55c3a is the software program described hereinafter. Map Data Sending/Receiving Software H55c4 is the software program described hereinafter. Caller's Information Sending/Receiving Software H55c6 is the software program described hereinafter. Callee's Information Sending/Receiving Software H55c6a is the software program described hereinafter.

The following paragraphs primarily illustrate the sequence to output the Caller's Information (which is defined hereinafter) from Callee's Device.

This paragraph illustrates Permitted Caller's Personal Data Selecting Software 20655c1 stored in Caller's Information Displaying Software Storage Area 20655c of Caller's Device, which selects the permitted caller's personal data to be displayed on LCD 201 (FIG. 1) of Callee's Device. In the present embodiment, CPU 211 (FIG. 1) of Caller's Device retrieves all of the caller's personal data from Caller's Personal Data Storage Area 20655b3 (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

This paragraph illustrates Dialing Software H55c2 stored in Caller/Callee Software Storage Area H55c of Host H, Dialing Software 20655c2 stored in Caller's Information Displaying Software Storage Area 20655c of Caller's Device, and Dialing Software 20655c2A stored in Callee's Information Displaying Software Storage Area 20655cA of Callee's Device, which enables to connect between Caller's Device and Callee's Device via Host H in a wireless fashion. In the present embodiment, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

This paragraph illustrates Caller's Device Pin-pointing Software H55c3 stored in Caller/Callee Software Storage Area H55c of Host H and Caller's Device Pin-pointing Software 20655c3 stored in Caller's Information Displaying Software Storage Area 20655c of Caller's Device, which identifies the current geographic location of Caller's Device. In the present embodiment, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55b5 (S5). Host H then retrieves the caller's calculated GPS data from Caller's Calculated GPS Data Storage Area H55b5 (S6), and sends the data to Caller's Device (S7). Upon receiving the caller's calculated GPS data from Host H (S8), CPU 211 stores the data in Caller's Calculated GPS Data Storage Area 20655b5 (S9). Here, the GPS raw data are the primitive data utilized to produce the caller's calculated GPS data, and the caller's calculated GPS data is the data representing the location of Caller's Device in (x, y, z) format. The sequence described in the present paragraph is repeated periodically.

This paragraph illustrates another embodiment of the sequence described hereinbefore in which the entire process is performed solely by Caller's Device Pin-pointing Software 20655c3 stored in Caller's Information Displaying Software Storage Area 20655c of Caller's Device. In the present embodiment, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655b5 (S3). The sequence described in the present paragraph is repeated periodically.

This paragraph illustrates Map Data Sending/Receiving Software H55c4 stored in Caller/Callee Software Storage Area H55c of Host H and Map Data Sending/Receiving Software 20655c4 stored in Caller's Information Displaying Software Storage Area 20655c of Caller's Device, which sends and receives the map data. In the present embodiment, CPU 211 (FIG. 1) of Caller's Device retrieves the caller's calculated GPS data from Caller's Calculated GPS Data Storage Area 20655b5 (S1), and sends the data to Host H (S2). Upon receiving the calculated GPS data from Caller's Device (S3), Host H identifies the map data in Map Data Storage Area H55b3 (S4). Here, the map data represents the surrounding area of the location indicated by the caller's calculated GPS data. Host H retrieves the map data from Map Data Storage Area H55b3 (S5), and sends the data to Caller's Device (S6). Upon receiving the map data from Host H (S7), Caller's Device stores the data in Caller's Map Data Storage Area 20655b7 (S8). The sequence described in the present paragraph is repeated periodically.

This paragraph illustrates Caller's Audiovisual Data Collecting Software 20655c5 stored in Caller's Information Displaying Software Storage Area 20655c of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655b1a (S2), and the caller's visual data in Caller's Visual Data Storage Area 20655b1b (S3). The sequence described in the present paragraph is repeated periodically.

This paragraph illustrates Caller's Information Sending/Receiving Software H55c6 stored in Caller/Callee Software Storage Area H55c of Host H and Caller's Information Sending/Receiving Software 20655c6 stored in Caller's Information Displaying Software Storage Area 20655c of Caller's Device, which sends and receives the Caller's Information (which is defined hereinafter) between Caller's Device and Host H. In the present embodiment, CPU 211 (FIG. 1) of Caller's Device retrieves the permitted caller's personal data from Caller's Personal Data Storage Area 20655b3 (S1). CPU 211 retrieves the caller's calculated GPS data from Caller's Calculated GPS Data Storage Area 20655b5 (S2). CPU 211 retrieves the map data from Caller's Map Data Storage Area 20655b7 (S3). CPU 211 retrieves the caller's audio data from Caller's Audio Data Storage Area 20655b1a (S4). CPU 211 retrieves the caller's visual data from Caller's Visual Data Storage Area 20655b1b (S5). CPU 211 then sends the data retrieved in 51 through S5 (collectively defined as the 'Caller's Information' hereinafter) to Host H (S6). Upon receiving the Caller's Information from Caller's Device (S7), Host H stores the Caller's Information in Caller's Information Storage Area H55b1 (S8). The sequence described in the present paragraph is repeated periodically.

This paragraph illustrates Caller's Information Sending/Receiving Software H55c6 stored in Caller/Callee Software Storage Area H55c of Host H and Caller's Information Sending/Receiving Software 20655c6aA stored in Caller's Information Displaying Software Storage Area 20655c of Caller's Device, which sends and receives the Caller's Information between Host H and Callee's Device. In the present embodiment, Host H retrieves the Caller's Information from Caller's Information Storage Area H55b1 (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655b3A (S4). CPU 211 stores the caller's calculated GPS data in Caller's Calculated GPS Data Storage Area 20655b5A (S5). CPU 211 stores the map data in Caller's Map Data Storage Area 20655b7A (S6). CPU 211 stores the caller's audio data in Caller's Audio Data Storage Area 20655b1aA (S7). CPU 211 stores the caller's visual data in Caller's Visual Data Storage Area 20655b1bA (S8). The sequence described in the present paragraph is repeated periodically.

This paragraph illustrates Permitted Caller's Personal Data Displaying Software 20655c7A stored in Callee's Information Displaying Software Storage Area 20655cA of Callee's Device, which displays the permitted caller's personal data on LCD 201 (FIG. 1) of Callee's Device. In the present embodiment, CPU 211 (FIG. 1) of Callee's Device retrieves the permitted caller's personal data from Caller's Personal Data Storage Area 20655b3A (S1). CPU 211 then displays the permitted caller's personal data on LCD 201 (FIG. 1) (S2). The sequence described in the present paragraph is repeated periodically.

This paragraph illustrates Map Displaying Software 20655c8A stored in Callee's Information Displaying Software Storage Area 20655cA of Callee's Device, which displays the map representing the surrounding area of the location indicated by the caller's calculated GPS data. In the present embodiment, CPU 211 (FIG. 1) of Callee's Device retrieves the caller's calculated GPS data from Caller's Calculated GPS Data Storage Area 20655b5A (S1). CPU 211 then retrieves the map data from Caller's Map Data Storage Area 20655b7A (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present paragraph is repeated periodically.

This paragraph illustrates Caller's Audio Data Outputting Software 20655c9A stored in Caller's Information Displaying Software Storage Area 20655c of Caller's Device, which outputs the caller's audio data from Speaker 216 (FIG. 1) of Callee's Device. In the present embodiment, CPU 211 (FIG. 1) of Callee's Device retrieves the caller's audio data from Caller's Audio Data Storage Area 20655b1aA (S1). CPU 211 then outputs the caller's audio data from Speaker 216 (FIG. 1) (S2). The sequence described in the present paragraph is repeated periodically.

This paragraph illustrates Caller's Visual Data Displaying Software 20655c10A stored in Callee's Information Displaying Software Storage Area 20655cA of Callee's Device, which displays the caller's visual data on LCD 201 (FIG. 1) of Callee's Device. In the present embodiment, CPU 211 (FIG. 1) of Callee's Device retrieves the caller's visual data from Caller's Visual Data Storage Area 20655b1bA (S1). CPU 211 then displays the caller's visual data on LCD 201 (FIG. 1) (S2). The sequence described in the present paragraph is repeated periodically.

The following paragraphs primarily illustrate the sequence to output the Callee's Information (which is defined hereinafter) from Caller's Device.

This paragraph illustrates Permitted Callee's Personal Data Selecting Software 20655c1A stored in Callee's Information Displaying Software Storage Area 20655cA of Callee's Device, which selects the permitted callee's personal data to be displayed on LCD 201 (FIG. 1) of Caller's Device. In the present embodiment, CPU 211 (FIG. 1) of Callee's Device retrieves all of the callee's personal data from Callee's Personal Data Storage Area 20655b4A (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

This paragraph illustrates Dialing Software H55c2 stored in Caller/Callee Software Storage Area H55c of Host H, Dialing Software 20655c2A stored in Callee's Information Displaying Software Storage Area 20655cA of Callee's Device, and Dialing Software 20655c2 stored in Caller's Information Displaying Software Storage Area 20655c of Caller's Device, which enables to connect between Callee's Device and Caller's Device via Host H in a wireless fashion. In the present embodiment, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present paragraph is not necessarily implemented if the connection between Caller's Device and Callee's Device is established as described hereinbefore. The sequence described in the present paragraph may be implemented if the connection is accidentally terminated by Callee's Device and the connection process is initiated by Callee's Device.

This paragraph illustrates Callee's Device Pin-pointing Software H55c3a stored in Caller/Callee Software Storage Area H55c of Host H and Callee's Device Pin-pointing Software 20655c3A stored in Callee's Information Displaying Software Storage Area 20655cA of Callee's Device, which identifies the current geographic location of Callee's Device. In the present embodiment, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55b6 (S5). Host H then retrieves the callee's calculated GPS data from Callee's Calculated GPS Data Storage Area H55b6 (S6), and sends the data to Callee's Device (S7). Upon receiving the callee's calculated GPS data from Host H (S8), CPU 211 stores the data in Callee's Calculated GPS Data Storage Area 20655b6A (S9). Here, the GPS raw data are the primitive data utilized to produce the callee's calculated GPS data, and the callee's calculated GPS data is the data representing the location of Callee's Device in (x, y, z) format. The sequence described in the present paragraph is repeated periodically.

This paragraph illustrates another embodiment of the sequence described hereinbefore in which the entire process is performed solely by Callee's Device Pin-pointing Software 20655c3A stored in Callee's Information Displaying Software Storage Area 20655cA of Callee's Device. In the present embodiment, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655b6A (S3). The sequence described in the present paragraph is repeated periodically.

This paragraph illustrates Map Data Sending/Receiving Software H55c4 stored in Caller/Callee Software Storage Area H55c of Host H and Map Data Sending/Receiving Software 20655c4A stored in Callee's Information Displaying Software Storage Area 20655cA of Callee's Device, which sends and receives the map data. In the present embodiment, CPU 211 (FIG. 1) of Callee's Device retrieves the callee's calculated GPS data from Callee's Calculated GPS Data Storage Area 20655b6A (S1), and sends the data to Host H (S2). Upon receiving the calculated GPS data from Callee's Device (S3), Host H identifies the map data in Map Data Storage Area H55b3 (S4). Here, the map data represents the surrounding area of the location indicated by the callee's calculated GPS data. Host H retrieves the map data from Map Data Storage Area H55b3 (S5), and sends the data to Callee's Device (S6). Upon receiving the map data from Host H (S7), Callee's Device stores the data in Callee's Map Data Storage Area 20655b8A (S8). The sequence described in the present paragraph is repeated periodically.

This paragraph illustrates Callee's Audiovisual Data Collecting Software 20655c5A stored in Callee's Information Displaying Software Storage Area 20655cA of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655b2aA (S2), and the callee's visual data in Callee's Visual Data Storage Area 20655b2bA (S3). The sequence described in the present paragraph is repeated periodically.

This paragraph illustrates Callee's Information Sending/Receiving Software H55c6a stored in Caller/Callee Software Storage Area H55c of Host H and Callee's Information Sending/Receiving Software 20655c6A stored in Callee's Information Displaying Software Storage Area 20655cA of Callee's Device, which sends and receives the Callee's Information (which is defined hereinafter) between Callee's Device and Host H. In the present embodiment, CPU 211 (FIG. 1) of Callee's Device retrieves the permitted callee's personal data from Callee's Personal Data Storage Area 20655b4A (S1). CPU 211 retrieves the callee's calculated GPS data from Callee's Calculated GPS Data Storage Area 20655b6A (S2). CPU 211 retrieves the map data from Callee's Map Data Storage Area 20655b8A (S3). CPU 211 retrieves the callee's audio data from Callee's Audio Data Storage Area 20655b2aA (S4). CPU 211 retrieves the callee's visual data from Callee's Visual Data Storage Area 20655b2bA (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55b2 (S8). The sequence described in the present paragraph is repeated periodically.

This paragraph illustrates Callee's Information Sending/Receiving Software H55c6a stored in Caller/Callee Software Storage Area H55c of Host H and Callee's Information Sending/Receiving Software 20655c6a stored in Caller's Information Displaying Software Storage Area 20655c of Caller's Device, which sends and receives the Callee's Information between Host H and Caller's Device. In the present embodiment, Host H retrieves the Callee's Information from Callee's Information Storage Area H55b2 (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655b4 (S4). CPU 211 stores the callee's calculated GPS data in Callee's Calculated GPS Data Storage Area 20655b6 (S5). CPU 211 stores the map data in Callee's Map Data Storage Area 20655b8 (S6). CPU 211 stores the callee's audio data in Callee's Audio Data Storage Area 20655b2a (S7). CPU 211 stores the callee's visual data in Callee's Visual Data Storage Area 20655b2b (S8). The sequence described in the present paragraph is repeated periodically.

This paragraph illustrates Permitted Callee's Personal Data Displaying Software 20655c7 stored in Caller's Information Displaying Software Storage Area 20655c of Caller's Device, which displays the permitted callee's personal data on LCD 201 (FIG. 1) of Caller's Device. In the present embodiment, CPU 211 (FIG. 1) of Caller's Device retrieves the permitted callee's personal data from Callee's Personal Data Storage Area 20655b4 (S1). CPU 211 then displays the permitted callee's personal data on LCD 201 (FIG. 1) (S2). The sequence described in the present paragraph is repeated periodically.

This paragraph illustrates Map Displaying Software 20655c8 stored in Caller's Information Displaying Software Storage Area 20655c of Caller's Device, which displays the map representing the surrounding area of the location indicated by the callee's calculated GPS data. In the present embodiment, CPU 211 (FIG. 1) of Caller's Device retrieves the callee's calculated GPS data from Callee's Calculated GPS Data Storage Area 20655b6 (S1). CPU 211 then retrieves the map data from Callee's Map Data Storage Area 20655b8 (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present paragraph is repeated periodically.

This paragraph illustrates Callee's Audio Data Outputting Software 20655c9 stored in Caller's Information Displaying Software Storage Area 20655c of Caller's Device, which outputs the callee's audio data from Speaker 216 (FIG. 1) of Caller's Device. In the present embodiment, CPU 211 (FIG. 1) of Caller's Device retrieves the callee's audio data from Callee's Audio Data Storage Area 20655b2a (S1). CPU 211 then outputs the caller's audio data from Speaker 216 (FIG. 1) (S2). The sequence described in the present paragraph is repeated periodically.

This paragraph illustrates Callee's Visual Data Displaying Software 20655c10 stored in Caller's Information Displaying Software Storage Area 20655c of Caller's Device, which displays the callee's visual data on LCD 201 (FIG. 1) of Caller's Device. In the present embodiment, CPU 211 (FIG. 1) of Caller's Device retrieves the callee's visual data from Callee's Visual Data Storage Area 20655b2b (S1). CPU 211 then displays the callee's visual data on LCD 201 (FIG. 1) (S2). The sequence described in the present paragraph is repeated periodically.

<<Communication Device Remote Controlling Function (By Web)>>

The following paragraphs illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

This paragraph illustrates the storage areas included in Host H. In the present embodiment, Host H includes Communication Device Controlling Information Storage Area H58a of which the data and the software programs stored therein are described hereinafter.

This paragraph illustrates the storage areas included in Communication Device Controlling Information Storage Area H58a. In the present embodiment, Communication Device Controlling Information Storage Area H58a includes Communication Device Controlling Data Storage Area H58b and Communication Device Controlling Software Storage Area H58c. Communication Device Controlling Data Storage Area H58b stores the data necessary to implement the present function on the side of Host H, such as the ones described hereinafter. Communication Device Controlling Software Storage Area H58c stores the software programs necessary to implement the present function on the side of Host H, such as the ones described hereinafter.

This paragraph illustrates the storage areas included in Communication Device Controlling Data Storage Area H58b. In the present embodiment, Communication Device Controlling Data Storage Area H58b includes Password Data Storage Area H58b1, Phone Number Data Storage Area H58b2, Web Display Data Storage Area H58b3, and Work Area H58b4. Password Data Storage Area H58b1 stores the data described hereinafter. Phone Number Data Storage Area H58b2 stores the data described hereinafter. Web Display Data Storage Area H58b3 stores the data described hereinafter. Work Area H58b4 is utilized as a work area to perform calculation and to temporarily store data.

This paragraph illustrates the data stored in Password Data Storage Area H58b1. In the present embodiment, Password Data Storage Area H58b1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the present embodiment, Password Data Storage Area H58b1 stores the following data: the user ID 'User #1' and the corresponding password data 'Password Data #1'; the user ID 'User #2' and the corresponding password data 'Password Data #2'; the user ID 'User #3' and the corresponding password data 'Password Data #3'; the user ID 'User #4' and the corresponding password data 'Password Data #4'; and the user ID 'User #5' and the corresponding password data 'Password Data #5'.

This paragraph illustrates the data stored in Phone Number Data Storage Area H58b2. In the present embodiment, Phone Number Data Storage Area H58b2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the present embodiment, Phone Number Data Storage Area H58b2 stores the following data: the user ID 'User #1' and the corresponding phone number data 'Phone Number Data #1'; the user ID 'User #2' and the corresponding phone number data 'Phone Number Data #2'; the user ID 'User #3' and the corresponding phone number data 'Phone Number Data #3'; the user ID 'User #4' and the corresponding phone number data 'Phone Number Data #4'; and the user ID 'User #5' and the corresponding phone number data 'Phone Number Data #5'.

This paragraph illustrates the data stored in Web Display Data Storage Area H58b3. In the present embodiment, Web Display Data Storage Area H58b3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the present embodiment, Web Display Data Storage Area H58b3 stores the following data: the web display ID 'Web Display #0' and the corresponding web display data 'Web Display Data #0'; the web display ID 'Web Display #1' and the corresponding web display data 'Web Display Data #1'; the web display ID 'Web Display #2' and the corresponding web display data 'Web Display Data #2'; the web display ID 'Web Display #3' and the corresponding web display data 'Web Display Data #3'; the web display ID 'Web Display #4' and the corresponding web display data 'Web Display Data #4'; the web display ID 'Web Display #5' and the corresponding web display data 'Web Display Data #5'; and the web display ID 'Web Display #6' and the corresponding web display data 'Web Display Data #6'. 'Web Display Data #0' represents the message: 'To deactivate manner mode, press 1'. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data #1' represents the message: 'The manner mode has been deactivated.' Web Display Data #2' represents the message: 'The manner mode has been deactivated and your mobile phone has been rung.' Web Display Data #3' represents the message: 'Your mobile phone has been rung.' 'Web Display Data #4' represents the message: 'The password of your mobile phone has been changed.' 'Web Display Data #5' represents the message: 'Your mobile phone has been changed.' Web Display Data #6' represents the message: 'Your mobile phone has been power-offed.' This paragraph illustrates the display of Personal Computer PC. In the present embodiment, Home Page 20158HP, i.e., a home page to implement the present function is displayed on Personal Computer PC. Home Page 20158HP is primarily composed of Web Display Data #0 and six buttons, i.e., Buttons 1 through 6. Following the instruction described in Web Display Data #0, the user may select one of the buttons to implement the desired function as described hereinafter.

This paragraph illustrates the software programs stored in Communication Device Controlling Software Storage Area H58c. In the present embodiment, Communication Device Controlling Software Storage Area H58c stores User Authenticating Software H58c1, Menu Introducing Software H58c2, Line Connecting Software H58c3, Manner Mode Deactivating Software H58c4, Manner Mode Deactivating & Ringing Software H58c5, Ringing Software H58c6, Password Changing Software H58c7, Device Locking Software H58c8, and Power Off Software H58c9. User Authenticating Software H58c1 is the software program described hereinafter. Menu Introducing Software H58c2 is the software program described hereinafter. Line Connecting Software H58c3 is the software program described hereinafter. Manner Mode Deactivating Software H58c4 is the software program described hereinafter. Manner Mode Deactivating & Ringing Software H58c5 is the software program described hereinafter. Ringing Software H58c6 is the software program described hereinafter. Password Changing Software H58c7 is the software program described hereinafter. Device Locking Software H58c8 is the software program described hereinafter. Power Off Software H58c9 is the software program described hereinafter.

This paragraph illustrates the storage area included in RAM 206 (FIG. 1). In the present embodiment, RAM 206 includes Communication Device Controlling Information Storage Area 20658a of which the data and the software programs stored therein are described hereinafter.

This paragraph illustrates the storage areas included in Communication Device Controlling Information Storage Area 20658a. In the present embodiment, Communication Device Controlling Information Storage Area 20658a includes Communication Device Controlling Data Storage Area 20658b and Communication Device Controlling Software Storage Area 20658c. Communication Device Controlling Data Storage Area 20658b stores the data necessary to implement the present function on the side of Communication Device 200, such as the ones described hereinafter. Communication Device Controlling Software Storage Area 20658c stores the software programs necessary to implement the present function on the side of Communication Device 200, such as the ones described hereinafter.

The data and/or the software programs stored in Communication Device Controlling Information Storage Area 20658a may be downloaded from Host H.

This paragraph illustrates the storage areas included in Communication Device Controlling Data Storage Area 20658b. In the present embodiment, Communication Device Controlling Data Storage Area 20658b includes Password Data Storage Area 20658b1 and Work Area 20658b4. Password Data Storage Area 20658b1 stores the data described hereinafter. Work Area 20658b4 is utilized as a work area to perform calculation and to temporarily store data.

This paragraph illustrates the data stored in Password Data Storage Area 20658b1. In the present embodiment, Password Data Storage Area 20658b1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User #1'. In the present embodiment, Password Data Storage Area H58b1 stores the following data: the user ID 'User #1' and the corresponding password data 'Password Data #1'.

This paragraph illustrates the data stored in Phone Number Data Storage Area 20658b2. In the present embodiment, Phone Number Data Storage Area 20658b2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the present embodiment, Phone Number Data Storage Area H58b2 stores the following data: the user ID 'User #1' and the corresponding phone number data 'Phone Number Data #1'.

This paragraph illustrates the software programs stored in Communication Device Controlling Software Storage Area 20658c. In the present embodiment, Communication Device Controlling Software Storage Area 20658c stores Line Connecting Software 20658c3, Manner Mode Deactivating Software 20658c4, Manner Mode Deactivating & Ringing Software 20658c5, Ringing Software 20658c6, Password Changing Software 20658c7, Device Locking Software 20658c8, and Power Off Software 20658c9. Line Connecting Software 20658c3 is the software program described hereinafter. Manner Mode Deactivating Software 20658c4 is the software program described hereinafter. Manner Mode Deactivating & Ringing Software 20658c5 is the software program described hereinafter. Ringing Software 20658c6 is the software program described hereinafter. Password Changing Software 20658c7 is the software program described hereinafter. Device Locking Software 20658c8 is the software program described hereinafter. Power Off Software 20658c9 is the software program described hereinafter.

The following paragraphs illustrate the software programs which enables the user of Communication Device 200 to remotely control Communication Device 200 by Personal Computer PC.

This paragraph illustrates User Authenticating Software H58c1 stored in Communication Device Controlling Software Storage Area H58c of Host H, which authenticates the user of Communication Device 200 to implement the present function via Personal Computer PC. In the present embodiment, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58b1 and Phone Number Data Storage Area H58b2) (S6). The authentication process is completed (and the sequences described hereafter are enabled thereafter) if the password data and the phone number data described in S4 and S5 match with the data stored in Password Data Storage Area H58b1 and Phone Number Data Storage Area H58b2.

This paragraph illustrates Menu Introducing Software H58c2 stored in Communication Device Controlling Software Storage Area H58c of Host H, which introduces the menu on Personal Computer PC. In the present embodiment, Host H retrieves Web Display Data #0 from Web Display Data Storage Area H58b3 (S1), and sends the data to Personal Computer PC (S2). Upon receiving Web Display Data #0 from Host H (S3), Personal Computer PC displays Web Display Data #0 on its display (S4). The user selects from one of the buttons of '1' through '6' wherein the sequences implemented thereafter are described hereinafter (S5).

This paragraph illustrates Line Connecting Software H58c3 stored in Communication Device Controlling Software Storage Area H58c of Host H and Line Connecting Software 20658c3 stored in Communication Device Controlling Software Storage Area 20658c of Communication Device 200, which connect line between Host H and Communication Device 200. In the present embodiment, Host H calls Communication Device 200 by retrieving the corresponding phone number data from Phone Number Data Storage Area H58*b*2 (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

This paragraph illustrates Manner Mode Deactivating Software H58*c*4 stored in Communication Device Controlling Software Storage Area H58*c* of Host H and Manner Mode Deactivating Software 20658*c*4 stored in Communication Device Controlling Software Storage Area 20658*c* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1' displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data #1 from Web Display Data Storage Area H58*b*3 and sends the data to Personal Computer PC (S6). Upon receiving Web Display Data #1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200. Therefore, a voice communication between human beings is not enabled thereafter.

This paragraph illustrates Manner Mode Deactivating & Ringing Software H58*c*5 stored in Communication Device Controlling Software Storage Area H58*c* of Host H and Manner Mode Deactivating & Ringing Software 20658*c*5 stored in Communication Device Controlling Software Storage Area 20658*c* of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data #2 from Web Display Data Storage Area H58*b*3 and sends the data to Personal Computer PC (S7). Upon receiving Web Display Data #2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200. Therefore, a voice communication between human beings is not enabled thereafter by implementing the present function.

This paragraph illustrates Ringing Software H58*c*6 stored in Communication Device Controlling Software Storage Area H58*c* of Host H and Ringing Software 20658*c*6 stored in Communication Device Controlling Software Storage Area 20658*c* of Communication Device 200, which output a ringing sound from Speaker 216 (FIG. 1). Assume that the user selects button '3' displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data #3 from Web Display Data Storage Area H58*b*3 and sends the data to Personal Computer PC (S6). Upon receiving Web Display Data #3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58*c*6 and Ringing Software 20658*c*6 is merely to let the user to identify the location of Communication Device 200. Therefore, a voice communication between human beings is not enabled thereafter by implementing the present function.

This paragraph illustrates Password Changing Software H58*c*7 stored in Communication Device Controlling Software Storage Area H58*c* of Host H and Password Changing Software 20658*c*7 stored in Communication Device Controlling Software Storage Area 20658*c* of Communication Device 200, which change the password necessary to operate Communication Device 200. Assume that the user selects button '4' displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658*b*1 and the old password data is erased (S6). Host H retrieves Web Display Data #4 from Web Display Data Storage Area H58*b*3 and sends the data to Personal Computer PC (S7). Upon receiving Web Display Data #4 from Host H, Personal Computer PC displays the data (S 8).

This paragraph illustrates Device Locking Software H58*c*8 stored in Communication Device Controlling Software Storage Area H58*c* of Host H and Device Locking Software 20658*c*8 stored in Communication Device Controlling Software Storage Area 20658*c* of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658*b*1 is entered (S5). Host H retrieves Web Display Data #5 from Web Display Data Storage Area H58b3 and sends the data to Personal Computer PC (S6). Upon receiving Web Display Data #5 from Host H, Personal Computer PC displays the data (S7).

This paragraph illustrates Power Off Software H58c9 stored in Communication Device Controlling Software Storage Area H58c of Host H and Power Off Software 20658c9 stored in Communication Device Controlling Software Storage Area 20658c of Communication Device 200, which turn off the power of Communication Device 200. Assume that the user selects button '6' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data #6 from Web Display Data Storage Area H58b3 and sends the data to Personal Computer PC (S6). Upon receiving Web Display Data #6 from Host H, Personal Computer PC displays the data (S7).

<<Shortcut Icon Displaying Function>>

The following paragraphs illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

This paragraph illustrates the shortcut icons displayed on LCD 201 (FIG. 1) of Communication Device 200 by implementing the present function. In this embodiment, three shortcut icons are displayed on LCD 201 (FIG. 1), i.e., Shortcut Icon #1, Shortcut Icon #2, and Shortcut Icon #3. The user of Communication Device 200 can execute the software programs by selecting (e.g., clicking or double clicking) one of the shortcut icons. For example, assume that Shortcut Icon #1 represents MS Word 97. By selecting (e.g., clicking or double clicking) Shortcut Icon #1, the user can execute MS Word 97 installed in Communication Device 200 or Host H. Three shortcut icons are illustrated in the present drawing, however, only for purposes of simplifying the explanation of the present function. Therefore, as many shortcut icons equivalent to the number of the software programs described in this specification may be displayed on LCD 201, and the corresponding software programs may be executed by implementing the present function.

This paragraph illustrates the storage area included in RAM 206 (FIG. 1). In this embodiment, RAM 206 includes Shortcut Icon Displaying Information Storage Area 20659a of which the data and the software programs stored therein are described hereinafter.

This paragraph illustrates the storage areas included in Shortcut Icon Displaying Information Storage Area 20659a. In this embodiment, Shortcut Icon Displaying Information Storage Area 20659a includes Shortcut Icon Displaying Data Storage Area 20659b and Shortcut Icon Displaying Software Storage Area 20659c. Shortcut Icon Displaying Data Storage Area 20659b stores the data necessary to implement the present function, such as the ones described hereinafter. Shortcut Icon Displaying Software Storage Area 20659c stores the software programs necessary to implement the present function, such as the ones described hereinafter.

The data and/or the software programs stored in Shortcut Icon Displaying Software Storage Area 20659c may be downloaded from Host H.

This paragraph illustrates the storage areas included in Shortcut Icon Displaying Data Storage Area 20659b. In this embodiment, Shortcut Icon Displaying Data Storage Area 20659b includes Shortcut Icon Image Data Storage Area 20659b1, Shortcut Icon Location Data Storage Area 20659b2, Shortcut Icon Link Data Storage Area 20659b3, and Selected Shortcut Icon Data Storage Area 20659b4. Shortcut Icon Image Data Storage Area 20659b1 stores the data described hereinafter. Shortcut Icon Location Data Storage Area 20659b2 stores the data described hereinafter. Shortcut Icon Link Data Storage Area 20659b3 stores the data described hereinafter. Selected Shortcut Icon Data Storage Area 20659b4 stores the data described hereinafter.

This paragraph illustrates the data stored in Shortcut Icon Image Data Storage Area 20659b1. In this embodiment, Shortcut Icon Image Data Storage Area 20659b1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described hereinbefore. In this embodiment, Shortcut Icon Image Data Storage Area 20659b1 stores the following data: the shortcut icon ID 'Shortcut Icon #1' and the corresponding shortcut icon image data 'Shortcut Icon Image Data #1'; the shortcut icon ID 'Shortcut Icon #2' and the corresponding shortcut icon image data 'Shortcut Icon Image Data #2'; the shortcut icon ID 'Shortcut Icon #3' and the corresponding shortcut icon image data 'Shortcut Icon Image Data #3'; and the shortcut icon ID 'Shortcut Icon #4' and the corresponding shortcut icon image data 'Shortcut Icon Image Data #4'.

This paragraph illustrates the data stored in Shortcut Icon Location Data Storage Area 20659b2. In this embodiment, Shortcut Icon Location Data Storage Area 20659b2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In this embodiment, Shortcut Icon Location Data Storage Area 20659b2 stores the following data: the shortcut icon ID 'Shortcut Icon #1' and the corresponding shortcut icon location data 'Shortcut Icon Location Data #1'; the shortcut icon ID 'Shortcut Icon #2' and the corresponding shortcut icon location data 'Shortcut Icon Location Data #2'; the shortcut icon ID 'Shortcut Icon #3' and the corresponding shortcut icon location data 'Shortcut Icon Location Data #3'; and the shortcut icon ID 'Shortcut Icon #4' and the corresponding shortcut icon location data 'Shortcut Icon Location Data #4'.

This paragraph illustrates the data stored in Shortcut Icon Link Data Storage Area 20659b3. In this embodiment, Shortcut Icon Link Data Storage Area 20659b3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In this embodiment, Shortcut Icon Link Data Storage Area 20659b3 stores the following data: the shortcut icon ID 'Shortcut Icon #1' and the corresponding shortcut icon link data 'Shortcut Icon Link Data #1'; the shortcut icon ID 'Shortcut Icon #2' and the corresponding shortcut icon link data 'Shortcut Icon Link Data #2'; the shortcut icon ID 'Shortcut Icon #3' and the corresponding shortcut icon link data 'Shortcut Icon Link Data #3'; and the shortcut icon ID 'Shortcut Icon #4' and the corresponding shortcut icon link data 'Shortcut Icon Link Data #4'. The foregoing software program may be any software program described in this specification.

This paragraph illustrates the data stored in Selected Shortcut Icon Data Storage Area 20659b4. In this embodiment, Selected Shortcut Icon Data Storage Area 20659b4 stores one or more of shortcut icon IDs. Only the shortcut icon image data of the shortcut icon IDs stored in Selected Shortcut Icon Data Storage Area 20659b4 are displayed on LCD 201 (FIG. 1). In this embodiment, Selected Shortcut Icon Data Storage Area 20659b4 stores the following data: the shortcut icon IDs 'Shortcut Icon #1', 'Shortcut Icon #2', and 'Shortcut Icon #3', which means that only the shortcut icon image data corresponding to 'Shortcut Icon #1', 'Shortcut Icon #2', and 'Shortcut Icon #3' are displayed on LCD 201.

This paragraph illustrates the software programs stored in Shortcut Icon Displaying Software Storage Area 20659c. In this embodiment, Shortcut Icon Displaying Software Storage Area 20659c stores Shortcut Icon Displaying Software 20659c1, Software Executing Software 20659c2, Shortcut Icon Location Data Changing Software 20659c3, and Software Executing Software 20659c4. Shortcut Icon Displaying Software 20659c1 is the software program described hereinafter. Software Executing Software 20659c2 is the software program described hereinafter. Shortcut Icon Location Data Changing Software 20659c3 is the software program described hereinafter. Software Executing Software 20659c4 is the software program described hereinafter.

This paragraph illustrates Shortcut Icon Displaying Software 20659c1 stored in Shortcut Icon Displaying Software Storage Area 20659c of Communication Device 200, which displays the shortcut icon image data displayed on LCD 201 (FIG. 1) of Communication Device 200. In this embodiment, CPU 211 (FIG. 1) refers to the shortcut icon IDs stored in Selected Shortcut Icon Data Storage Area 20659b4 to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659b1 (S2). CPU 211 further retrieves the shortcut icon location data of the corresponding shortcut icon IDs identified in S1 from Shortcut Icon Location Data Storage Area 20659b2 (S3). CPU 211 displays on LCD 201 (FIG. 1) the shortcut icon image data thereafter (S4).

This paragraph illustrates Software Executing Software 20659c2 stored in Shortcut Icon Displaying Software Storage Area 20659c of Communication Device 200, which executes the corresponding software program upon selecting the shortcut icon image data displayed on LCD 201 (FIG. 1) of Communication Device 200. In this embodiment, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659b3 from the shortcut icon ID identified in S2 (S3), and executes the corresponding software program (S4).

This paragraph illustrates Shortcut Icon Location Data Changing Software 20659c3 stored in Shortcut Icon Displaying Software Storage Area 20659c of Communication Device 200, which enables the user of Communication Device 200 to change the location of the shortcut icon image data displayed on LCD 201 (FIG. 1). In this embodiment, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659b2 (S5).

<<Shortcut Icon Displaying Function—Executing Software In Host H>>

The following paragraphs illustrate the implementation of the present invention wherein the user of Communication Device 200 executes the software programs stored in Host H by selecting the shortcut icons displayed on LCD 201 (FIG. 1).

This paragraph illustrates the storage areas included in Host H. In this embodiment, Host H includes Shortcut Icon Displaying Information Storage Area H59a of which the data and the software programs stored therein are described hereinafter.

This paragraph illustrates the storage areas included in Shortcut Icon Displaying Information Storage Area H59a. In this embodiment, Shortcut Icon Displaying Information Storage Area H59a includes Shortcut Icon Displaying Data Storage Area H59b and Shortcut Icon Displaying Software Storage Area H59c. Shortcut Icon Displaying Data Storage Area H59b stores the data necessary to implement the present function on the side of Host H, such as the ones described hereinafter. Shortcut Icon Displaying Software Storage Area H59c stores the software programs necessary to implement the present function on the side of Host H, such as the ones described hereinafter.

This paragraph illustrates the storage area included in Shortcut Icon Displaying Data Storage Area H59b. In this embodiment, Shortcut Icon Displaying Data Storage Area H59b includes Software Programs Storage Area H59b1. Software Programs Storage Area H59b1 stores the data described hereinafter.

This paragraph illustrates the data stored in Software Programs Storage Area H59b1. In this embodiment, Software Programs Storage Area H59b1 comprises two columns, i.e., 'Software ID' and 'Software Program'. Column 'Software ID' stores the software IDs, and each software ID is an identification of the software program stored in column 'Software Program'. Column 'Software Program' stores the software programs. In this embodiment, Software Programs Storage Area H59b1 stores the following data: software ID 'Software #3' and the corresponding software program 'Software Program #3'; software ID 'Software #4' and the corresponding software program 'Software Program #4'; software ID 'Software #5' and the corresponding software program 'Software Program #5'; and software ID 'Software #6' and the corresponding software program 'Software Program #6'. Here, the software programs may be any software programs which are stored in Host H described in this specification. As another embodiment, the software programs may be any software programs stored in RAM 206 (FIG. 1) of Communication Device 200 described in this specification.

This paragraph illustrates the software program stored in Shortcut Icon Displaying Software Storage Area H59c. In this embodiment, Shortcut Icon Displaying Software Storage Area H59c stores Software Executing Software H59c4. Software Executing Software H59c4 is the software program described hereinafter.

This paragraph illustrates Software Executing Software H59c4 stored in Shortcut Icon Displaying Software Storage Area H59c of Host H and Software Executing Software 20659c4 stored in Shortcut Icon Displaying Software Storage Area 20659c of Communication Device 200, which execute the corresponding software program upon selecting the shortcut icon image data displayed on LCD 201 (FIG. 1) of Communication Device 200. In this embodiment, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659b3 from the shortcut icon ID identified in S2 (S3), which is sent to Host H (S4). Upon receiving the shortcut icon link data from Communication Device 200 (S5), Host H executes the corresponding software program (S6) and produces the relevant display data, which are send to Communication Device 200 (S7). Upon receiving the relevant display data from Host H, Communication Device 200 displays the data on LCD 201 (S8).

<<Multiple Channel Processing Function>>

The following paragraphs illustrate the multiple channel processing function which enables Communication Device 200 to send and receive a large amount of data in a short period of time by increasing the upload and download speed.

This paragraph illustrates the storage area included in Host H. In this embodiment, Host H includes Multiple Channel Processing Information Storage Area H61a of which the data and the software programs stored therein are described hereinafter. Here, Host H is a base station which communicates with Communication Device 200 in a wireless fashion.

This paragraph illustrates the storage areas included in Multiple Channel Processing Information Storage Area H61a. In this embodiment, Multiple Channel Processing Information Storage Area H61a includes Multiple Channel Processing Data Storage Area H61b and Multiple Channel Processing Software Storage Area H61c. Multiple Channel Processing Data Storage Area H61b stores the data necessary to implement the present function on the side of Host H, such as the ones described hereinafter. Multiple Channel Processing Software Storage Area H61c stores the software programs necessary to implement the present function on the side of Host H, such as the ones described hereinafter.

This paragraph illustrates the storage areas included in Multiple Channel Processing Data Storage Area H61b. In this embodiment, Multiple Channel Processing Data Storage Area H61b includes User Data Storage Area H61b1, Channel Number Storage Area H61b2, and Signal Type Data Storage Area H61b3. User Data Storage Area H61b1 stores the data described hereinafter. Channel Number Storage Area H61b2 stores the data described hereinafter. Signal Type Data Storage Area H61b3 stores the data described hereinafter.

This paragraph illustrates the data stored in User Data Storage Area H61b1. In this embodiment, User Data Storage Area H61b1 comprises two columns, i.e., 'User ID' and 'User Data'. Column 'User ID' stores the user IDs, and each user ID in an identification of the user of Communication Device 200. Column 'User Data' stores the user data, and each user data represents the personal data of the user of the corresponding user ID, such as name, home address, office address, phone number, email address, fax number, age, sex, credit card number of the user of the corresponding user ID. In this embodiment, User Data Storage Area H61b1 stores the following data: the user ID 'User #1' and the corresponding user data 'User Data #1'; the user ID 'User #2' and the corresponding user data 'User Data #2'; the user ID 'User #3' and the corresponding user data 'User Data #3'; and the user ID 'User #4' and the corresponding user data 'User Data #4'.

This paragraph illustrates the data stored in Channel Number Storage Area H61b2. In this embodiment, Channel Number Storage Area H61b2 comprises two columns, i.e., 'Channel ID' and 'User ID'. Column 'Channel ID' stores the channel IDs, and each channel ID is an identification of the channel which is assigned to each Communication Device 200 and through which Host H and Communication Device 200 send and receive data. Normally one channel ID is assigned to one user ID. Column 'User ID' stores the user IDs described hereinbefore. In this embodiment, Channel Number Storage Area H61b2 stores the following data: the channel ID 'Channel #1' and the user ID 'User #1'; the channel ID 'Channel #2' with no corresponding user ID stored; the channel ID 'Channel #3' and the user ID 'User #3'; and the channel ID 'Channel #4' and the user ID 'User #4'. Here, the foregoing data indicates that, to communicate with Host H, the channel ID 'Channel #1' is utilized by Communication Device 200 represented by the user ID 'User #1'; the channel ID 'Channel #2' is not utilized by any Communication Device 200 (i.e., vacant); the channel ID 'Channel #3' is utilized by Communication Device 200 represented by the user ID 'User #3'; and the channel ID 'Channel #4' is utilized by Communication Device 200 represented by the user ID 'User #4'.

This paragraph illustrates another example of the data stored in Channel Number Storage Area H61b2. In this embodiment, Channel Number Storage Area H61b2 comprises two columns, i.e., 'Channel ID' and 'User ID'. Column 'Channel ID' stores the channel IDs described hereinbefore. Column 'User ID' stores the user IDs described hereinbefore. In this embodiment, Channel Number Storage Area H61b2 stores the following data: the channel ID 'Channel #1' and the user ID 'User #1'; the channel ID 'Channel #2' and the user ID 'User #1'; the channel ID 'Channel #3' and the user ID 'User #3'; and the channel ID 'Channel #4' and the user ID 'User #4'. Here, the foregoing data indicates that, to communicate with Host H, the channel ID 'Channel #1' is utilized by Communication Device 200 represented by the user ID 'User #1'; the channel ID 'Channel #2' is also utilized by Communication Device 200 represented by the user ID 'User #1'; the channel ID 'Channel #3' is utilized by Communication Device 200 represented by the user ID 'User #3'; and the channel ID 'Channel #4' is utilized by Communication Device 200 represented by the user ID 'User #4'. In sum, the foregoing data indicates that two channel IDs, i.e., 'Channel #1' and 'Channel #2' are utilized by one Communication Device 200 represented by the user ID 'User #1'.

This paragraph illustrates the data stored in Signal Type Data Storage Area H61b3. In this embodiment, Signal Type Data Storage Area H61b3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area H61b3 stores the following data: the channel ID 'Channel #1' and the corresponding signal type data 'cdma2000'; the channel ID 'Channel #2' and the corresponding signal type data 'cdma2000'; the channel ID 'Channel #3' and the corresponding signal type data 'W-CDMA'; and the channel ID 'Channel #4' and the corresponding signal type data 'cdma2000'. The foregoing data indicates that the channel identified by the channel ID 'Channel #1' is assigned to the signal type data 'cdma2000'; the channel identified by the channel ID 'Channel #2' is assigned to the signal type data 'cdma2000'; the channel identified by the channel ID 'Channel #3' is assigned to the signal type data 'W-CDMA'; and the channel identified by the channel ID 'Channel #4' is assigned to the signal type data 'cdma2000'. Assuming that Communication Device 200 represented by the user ID 'User #1' utilizes the channels represented by the channel ID 'Channel #1' and 'Channel #2' as described hereinbefore. In this embodiment, Communication Device 200 represented by the user ID 'User #1' utilizes the signal type data 'cdma2000' for the channels represented by the channel ID 'Channel #1' and 'Channel #2' for communicating with Host H.

This paragraph illustrates another example of the data stored in Signal Type Data Storage Area H61b3. In this embodiment, Signal Type Data Storage Area H61b3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area H61b3 stores the following data: the channel ID 'Channel #1' and the corresponding signal type data 'cdma2000'; the channel ID 'Channel #2' and the corresponding signal type data 'W-CDMA'; the channel ID 'Channel #3' and the corresponding signal type data 'W-CDMA'; and the channel ID 'Channel #4' and the corresponding signal type data 'cdma2000'. The foregoing data indicates that the channel identified by the channel ID 'Channel #1' is assigned to the signal type data 'cdma2000'; the channel identified by the channel ID 'Channel #2' is assigned to the signal type data 'W-CDMA'; the channel identified by the channel ID 'Channel #3' is assigned to the signal type data 'W-CDMA'; and the channel identified by the channel ID 'Channel #4' is assigned to the signal type data 'cdma2000'. Assuming that Communication Device 200 represented by the user ID 'User #1' utilizes the channels represented by the channel ID 'Channel #1' and 'Channel #2' as described hereinbefore. In this embodiment, Communication Device 200 represented by the user ID 'User #1' utilizes the signal type data in a hybrid manner for communicating with Host H, i.e., the signal type data 'cdma2000' for 'Channel #1' and the signal type data 'W-CDMA' for 'Channel #2'.

This paragraph illustrates the software programs stored in Multiple Channel Processing Software Storage Area H61c. In this embodiment, Multiple Channel Processing Software Storage Area H61c stores Signal Type Data Detecting Software H61c1, User ID Identifying Software H61c2, Data Sending/Receiving Software H61c2a, Channel Number Adding Software H61c3, Data Sending/Receiving Software H61c3a, Signal Type Data Adding Software H61c4, and Data Sending/Receiving Software H61c4a. Signal Type Data Detecting Software H61c1 is the software program described hereinafter. User ID Identifying Software H61c2 is the software program described hereinafter. Data Sending/Receiving Software H61c2a is the software program described hereinafter. Channel Number Adding Software H61c3 is the software program described hereinafter. Data Sending/Receiving Software H61c3a is the software program described hereinafter. Signal Type Data Adding Software H61c4 is the software program described hereinafter. Data Sending/Receiving Software H61c4a is the software program described hereinafter.

This paragraph illustrates the storage area included in RAM 206 (FIG. 1) of Communication Device 200. In this embodiment, RAM 206 includes Multiple Channel Processing Information Storage Area 20661a of which the data and the software programs stored therein are described hereinafter.

This paragraph illustrates the storage areas included in Multiple Channel Processing Information Storage Area 20661a. In this embodiment, Multiple Channel Processing Information Storage Area 20661a includes Multiple Channel Processing Data Storage Area 20661b and Multiple Channel Processing Software Storage Area 20661c. Multiple Channel Processing Data Storage Area 20661b stores the data necessary to implement the present function on the side of Communication Device 200, such as the ones described hereinafter. Multiple Channel Processing Software Storage Area 20661c stores the software programs necessary to implement the present function on the side of Communication Device 200, such as the ones described hereinafter.

The data and/or the software programs stored in Multiple Channel Processing Software Storage Area 20661c may be downloaded from Host H.

This paragraph illustrates the storage areas included in Multiple Channel Processing Data Storage Area 20661b. In this embodiment, Multiple Channel Processing Data Storage Area 20661b includes User Data Storage Area 20661b1, Channel Number Storage Area 20661b2, and Signal Type Data Storage Area 20661b3. User Data Storage Area 20661b1 stores the data described hereinafter. Channel Number Storage Area 20661b2 stores the data described hereinafter. Signal Type Data Storage Area 20661b3 stores the data described hereinafter.

This paragraph illustrates the data stored in User Data Storage Area 20661b1. In this embodiment, User Data Storage Area 20661b1 comprises two columns, i.e., 'User ID' and 'User Data'. Column 'User ID' stores the user ID which is an identification of Communication Device 200. Column 'User Data' stores the user data represents the personal data of the user of Communication Device 200, such as name, home address, office address, phone number, email address, fax number, age, sex, credit card number of the user. In this embodiment, User Data Storage Area 20661b1 stores the following data: the user ID 'User #1' and the corresponding user data 'User Data #1'.

This paragraph illustrates the data stored in Channel Number Storage Area 20661b2. In this embodiment, Channel Number Storage Area 20661b2 comprises two columns, i.e., 'Channel ID' and 'User ID'. Column 'Channel ID' stores the channel ID which is an identification of the channel through which Host H and Communication Device 200 send and receive data. Column 'User ID' stores the user ID described hereinbefore. In this embodiment, Channel Number Storage Area 20661b2 stores the following data: the channel ID 'Channel #1' and the corresponding user ID 'User #1'. The foregoing data indicates that, to communicate with Host H, the channel ID 'Channel #1' is utilized by Communication Device 200 represented by the user ID 'User #1'.

This paragraph illustrates another example of the data stored in Channel Number Storage Area 20661b2. In this embodiment, Channel Number Storage Area 20661b2 comprises two columns, i.e., 'Channel ID' and 'User ID'. Column 'Channel ID' stores the channel IDs, and each channel ID is an identification of the channel through which Host H and Communication Device 200 send and receive data. Column 'User ID' stores the user ID described hereinbefore. In this embodiment, Channel Number Storage Area 20661b2 stores the following data: the channel ID 'Channel #1' and the corresponding user ID 'User #1'; and the channel ID 'Channel #2' and the corresponding user ID 'User #2'. The foregoing data indicates that, to communicate with Host H, the channel IDs of 'Channel #1' and 'Channel #2' are utilized by Communication Device 200 represented by the user ID 'User #1'.

This paragraph illustrates the data stored in Signal Type Data Storage Area 20661b3. In this embodiment, Signal Type Data Storage Area 20661b3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area 20661b3 stores the following data: the channel ID 'Channel #1' and the corresponding signal type data 'cdma2000'; and the channel ID 'Channel #2' and the corresponding signal type data 'cdma2000'. The foregoing data indicates that the channel identified by the channel ID 'Channel #1' is assigned to the signal type data 'cdma2000'; and the channel identified by the channel ID 'Channel #2' is assigned to the signal type data 'cdma2000'. In this embodiment, Communication Device 200 represented by the user ID 'User #1' utilizes the signal type data 'cdma2000' for the channels represented by the channel ID 'Channel #1' and 'Channel #2' for communicating with Host H.

This paragraph illustrates another example of the data stored in Signal Type Data Storage Area 20661b3. In this embodiment, Signal Type Data Storage Area 20661b3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In this embodiment, Signal Type Data Storage Area 20661b3 stores the following data: the channel ID 'Channel #1' and the corresponding signal type data 'cdma2000'; and the channel ID 'Channel #2' and the corresponding signal type data 'W-CDMA'. The foregoing data indicates that the channel identified by the channel ID 'Channel #1' is assigned to the signal type data 'cdma2000'; and the channel identified by the channel ID 'Channel #2' is assigned to the signal type data 'W-CDMA'. In this embodiment, Communication Device 200 represented by the user ID 'User #1' utilizes the signal type data in a hybrid manner for communicating with Host H, i.e., the signal type data 'cdma2000' for 'Channel #1' and the signal type data 'W-CDMA' for 'Channel #2'.

This paragraph illustrates the software programs stored in Multiple Channel Processing Software Storage Area 20661c. In this embodiment, Multiple Channel Processing Software Storage Area 20661c stores Signal Type Data Detecting Software 20661c1, User ID Identifying Software 20661c2, Data Sending/Receiving Software 20661c2a, Channel Number Adding Software 20661c3, Data Sending/Receiving Software 20661c3a, Signal Type Data Adding Software 20661c4, and Data Sending/Receiving Software 20661c4a. Signal Type Data Detecting Software 20661c1 is the software program described hereinafter. User ID Identifying Software 20661c2 is the software program described hereinafter. Data Sending/Receiving Software 20661c2a is the software program described hereinafter. Channel Number Adding Software 20661c3 is the software program described hereinafter. Data Sending/Receiving Software 20661c3a is the software program described hereinafter. Signal Type Data Adding Software 20661c4 is the software program described hereinafter. Data Sending/Receiving Software 20661c4a is the software program described hereinafter.

This paragraph illustrates Signal Type Data Detecting Software H61c1 of Host H and Signal Type Data Detecting Software 20661c1 of Communication Device 200, which detect the signal type utilized for the communication between Host H and Communication Device 200 from any signal type categorized as 2G, 3G, and 4G The detection of the signal type is implemented by Host H in the present embodiment. In this embodiment, Host H detects the signal type (S1), and stores the signal type data in Signal Type Data Storage Area H61b3 at the default channel number (in the present example, Channel #1) (S2). Host H then sends the signal type data to Communication Device 200 (S3). Upon receiving the signal type data from Host H (S4), Communication Device 200 stores the signal type data in Signal Type Data Storage Area 20661b3 at the default channel number (in the present example, Channel #1) (S5).

This paragraph illustrates another embodiment of Signal Type Data Detecting Software H61c1 of Host H and Signal Type Data Detecting Software 20661c1 of Communication Device 200, which detect the signal type utilized for the communication between Host H and Communication Device 200 from any signal type categorized as 2G, 3G, and 4G. The detection of the signal type is implemented by Communication Device 200 in the present embodiment. In this embodiment, CPU 211 (FIG. 1) of Communication Device 200 detects the signal type (S1), and stores the signal type data in Signal Type Data Storage Area 20661b3 at the default channel number (in the present example, Channel #1) (S2). CPU 211 then sends the signal type data to Host H (S3). Upon receiving the signal type data from Communication Device 200 (S4), Host H stores the signal type data in Signal Type Data Storage Area H61b3 at the default channel number (in the present example, Channel #1) (S5).

This paragraph illustrates User ID Identifying Software H61c2 of Host H and User ID Identifying Software 20661c2 of Communication Device 200, which identify the user ID of the corresponding Communication Device 200. In this embodiment, Communication Device 200 sends the user ID to Host H (S1). Upon receiving the User ID from Communication Device 200 (S2), Host H identifies the default channel number (in the present example, Channel #1) for Communication Device 200 (S3), and stores the User ID in Channel Number Storage Area H61b2 at the channel number identified in S3 (S4).

This paragraph illustrates Data Sending/Receiving Software H61c2a of Host H and Data Sending/Receiving Software 20661c2a of Communication Device 200 by which Host H sends data to Communication Device 200. In this embodiment, Host H retrieves the default channel number (in the present example, Channel #1) from Channel Number Storage Area H61b2 (S1), and sends data (e.g., audiovisual data and alphanumeric data) to Communication Device 200 through the default channel number (in the present example, Channel #1) retrieved in S1 (S2). Communication Device 200 receives the data (e.g., audiovisual data and alphanumeric data) from Host H through the same channel number (S3).

This paragraph illustrates another embodiment of Data Sending/Receiving Software H61c2a of Host H and Data Sending/Receiving Software 20661c2a of Communication Device 200 by which Communication Device 200 sends data (e.g., audiovisual data and alphanumeric data) to Host H. In this embodiment, Communication Device 200 retrieves the default channel number (in the present example, Channel #1) from Channel Number Storage Area 20661b2 (S1), and sends data (e.g., audiovisual data and alphanumeric data) to Host H through the default channel number (in the present example, Channel #1) retrieved in S1 (S2). Host H receives the data (e.g., audiovisual data and alphanumeric data) from Communication Device 200 through the same channel number (S3).

This paragraph illustrates Channel Number Adding Software H61c3 of Host H and Channel Number Adding Software 20661c3 of Communication Device 200, which add another channel to increase the download and/or upload speed of Communication Device 200. In this embodiment, Communication Device 200 sends a channel number adding request to Host H (S1). Upon receiving the channel number adding request from Communication Device 200 (S2), Host H checks the availability in the same signal type data (S3). Assuming that vacancy is found in the same signal type data, Host H selects a new channel number (in the present example, Channel #2) from the available channel numbers for Communication Device 200 (S4). Host H stores the user ID of Communication Device 200 in Channel Number Storage Area H61b2 at new channel number (in the present example, Channel #2) selected in S4 (S5). Host H then sends the new channel number (in the present example, Channel #2) selected in S4 to Communication Device 200 (S6). Upon receiving the new channel number (in the present example, Channel #2) from Host H (S7), Communication Device 200 stores the new channel number (in the present example, Channel #2) in Channel Number Storage Area 20661b2 (S8). As another embodiment, instead of Host H adding a new channel number by receiving a channel number adding request from Communication Device 200, Host H may do so in its own initiative.

This paragraph illustrates Data Sending/Receiving Software H61c3a of Host H and Data Sending/Receiving Software 20661c3a of Communication Device 200 by which Host H sends data to Communication Device 200 by increasing the download speed. In this embodiment, Host H retrieves the channel numbers (in the present example, Channel #1 and #2) from Channel Number Storage Area H61b2 of the corresponding user ID (in the present example, User #1) (S1). Host H splits the data (e.g., audiovisual data and alphanumeric data) to be sent to Communication Device 200 to the First Data and the Second Data (S2). Host H sends the First Data to Communication Device 200 through Channel #1 (S3), and sends the Second Data to Communication Device 200 through Channel #2 (S4). Communication Device 200 receives the First Data from Host H through Channel #1 (S5), and receives the Second Data from Host H through Channel #2 (S6). Communication Device 200 merges the First Data and the Second Data thereafter (S7).

This paragraph illustrates Data Sending/Receiving Software H61c3a of Host H and Data Sending/Receiving Software 20661c3a of Communication Device 200 by which Communication Device 200 sends data to Host H by increasing the upload speed. In this embodiment, Communication Device 200 retrieves the channel numbers (in the present example, Channels #1 and #2) from Channel Number Storage Area 20661b2 (S1). Communication Device 200 splits the data (e.g., audiovisual data and alphanumeric data) to be sent to Host H to the Third Data and the Fourth Data (S2). Communication Device 200 sends the Third Data to Host H through Channel #1 (S3), and sends the Fourth Data to Host H through Channel #2 (S4). Host H receives the Third Data from Communication Device 200 through Channel #1 (S5), and receives the Fourth Data from Communication Device 200 through Channel #2 (S6). Host H merges the Third Data and the Fourth Data thereafter (S7).

This paragraph illustrates Signal Type Data Adding Software H61c4 of Host H and Signal Type Data Adding Software 20661c4 of Communication Device 200, which add new channel in different signal type if no available channel is found in the same signal type in S3 described hereinbefore. In this embodiment, Host H checks the availability in other signal type data (S1). Assuming that an available new channel is found in W-CDMA. Host H selects a new channel number (in the present example, Channel #2) In Signal Type Data Storage Area H61b3 for Communication Device 200 (S2). Host H stores the user ID (in the present example, User #1) in Channel Number Storage Area H61b2 at new channel number selected in S2 (in the present example, Channel #2) (S3). Host H stores the signal type data (in the present example, W-CDMA) in Signal Type Data Storage Area H61b3 at new channel number selected in S2 (in the present example, Channel #2) (S4). Host H sends the new channel number (in the present example, Channel #2) and the new signal type data (in the present example, W-CDMA) to Communication Device 200 (S5). Communication Device 200 receives the new channel number (in the present example, Channel #2) and the new signal type data (in the present example, W-CDMA) from Host H (S6). Communication Device 200 stores the new channel number (in the present example, Channel #2) in Channel Number Storage Area 20661b2 (S7). Communication Device 200 (in the present example, W-CDMA) in Signal Type Data Storage Area 20661b3 (S8).

This paragraph illustrates Data Sending/Receiving Software H61c4a of Host H and Data Sending/Receiving Software 20661c4a of Communication Device 200 by which Host H sends data to Communication Device 200 by increasing the download speed. In this embodiment, Host H retrieves the channel numbers (in the present example, Channel #1 and #2) from Channel Number Storage Area H61b2 of the corresponding user ID (in the present example, User #1) (S1). Host H splits the data (e.g., audiovisual data and alphanumeric data) to be sent to Communication Device 200 to the First Data and the Second Data (S2). Host H sends the First Data to Communication Device 200 through Channel #1 in cdma2000 (S3), and sends the Second Data to Communication Device 200 through Channel #2 in W-CDMA (S4). Communication Device 200 receives the First Data from Host H through Channel #1 in cdma2000 (S5), and receives the Second Data from Host H through Channel #2 in W-CDMA (S6). Communication Device 200 merges the First Data and the Second Data thereafter (S7).

This paragraph illustrates Data Sending/Receiving Software H61c4a of Host H and Data Sending/Receiving Software 20661c4a of Communication Device 200 by which Communication Device 200 sends data to Host H by increasing the upload speed. In this embodiment, Communication Device 200 retrieves the channel numbers (in the present example, Channel #1 and #2) from Channel Number Storage Area 20661b2 (S1). Communication Device 200 splits the data (e.g., audiovisual data and alphanumeric data) to be sent to Host H to the Third Data and the Fourth Data (S2). Communication Device 200 sends the Third Data to Host H through Channel #1 in cdma2000 (S3), and sends the Fourth Data to Host H through Channel #2 in W-CDMA (S4). Host H receives the Third Data from Communication Device 200 through Channel #1 in cdma2000 (S5), and receives the Fourth Data from Communication Device 200 through Channel #2 in W-CDMA (S6). Host H merges the Third Data and the Fourth Data thereafter (S7).

As another embodiment, the present function may be utilized for processing other sets of combination of the signals, such as the 2G signal and the 3G signal. In order to implement this embodiment, the term 'cdma2000' is substituted by '2G' and the term 'W-CDMA' is substituted by '3G' in the explanation set out hereinbefore for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA.

As another embodiment, the present function may be utilized for processing other sets of combination of the signals, such as the 3G signal and the 4G signal. In order to implement this embodiment, the term 'cdma2000' is substituted by '3G' and the term 'W-CDMA' is substituted by '4G' in the explanation set out hereinbefore for purposes of implementing the present embodiment. Here, the 3G signal may be of any type of signal categorized as 3G, including, but not limited to cdma2000, W-CDMA, and TDS-CDMA, and the 4G signal may be of any type of signal categorized as 4G.

As another embodiment, the present function may be utilized for processing the first type of 4G signal and the second type of 4G signal. In order to implement this embodiment, the term 'cdma2000' is substituted by 'the first type of 4G signal' and the term 'W-CDMA' is substituted by 'the second type of 4G signal' for purposes of implementing the present embodiment. Here, the first type of 4G signal and the second type of 4G signal may be of any type of signal categorized as 4G.

As another embodiment, the present function may be utilized for processing the 2G signal and the 3G signal. In order to implement this embodiment, the term 'cdma2000' is substituted by 'the 2G signal' and the term 'W-CDMA' is substituted by 'the 3G signal' for purposes of implementing the present embodiment. Here, the 2G signal may be of any type of signal categorized as 2G, including, but not limited to cdmaOne, GSM, and D-AMPS, and the 3G signal may be of any type of signal categorized as 3G, including, but not limited to cdma2000, W-CDMA, and TDS-CDMA.

As another embodiment, the present function may be utilized for processing the first type of 2G signal and the second type of 2G signal. In order to implement this embodiment, the term 'cdma2000' is substituted by 'the first type of 2G signal' and the term 'W-CDMA' is substituted by 'the second type of 2G signal' for purposes of implementing the present embodiment. Here, the first type of 2G signal and the second type of 2G signal may be of any type of signal categorized as 2G, including, but not limited to cdmaOne, GSM, and D-AMPS.

In sum, the present function described hereinbefore may be utilized for processing any combination of any type of signals.

For the avoidance of doubt, the multiple signal processing function may be utilized while implementing the present function.

For the avoidance of doubt, all software programs described hereinbefore to implement the present function may be executed solely by CPU 211 (FIG. 1) or by Signal Processor 208 (FIG. 1), or by both CPU 211 and Signal Processor 208.

<<Automobile Controlling Function>>

The following paragraphs illustrate the automobile controlling function which enables Communication Device 200 to remotely control an automobile in a wireless fashion via Antenna 218 (FIG. 1).

This paragraph illustrates the storage area included in Automobile 835, i.e., an automobile or a car. In the present embodiment, Automobile 835 includes Automobile Controlling Information Storage Area 83565a of which the data and the software programs stored therein are described hereinafter.

The data and/or the software programs stored in Automobile Controlling Information Storage Area 83565a may be downloaded from Host H.

This paragraph illustrates the storage areas included in Automobile Controlling Information Storage Area 83565a. In the present embodiment, Automobile Controlling Information Storage Area 83565a includes Automobile Controlling Data Storage Area 83565b and Automobile Controlling Software Storage Area 83565c. Automobile Controlling Data Storage Area 83565b stores the data necessary to implement the present function on the side of Automobile 835, such as the ones described hereinafter. Automobile Controlling Software Storage Area 83565c stores the software programs necessary to implement the present function on the side of Automobile 835, such as the ones described hereinafter.

This paragraph illustrates the storage areas included in Automobile Controlling Data Storage Area 83565b. In the present embodiment, Automobile Controlling Data Storage Area 83565b includes User Access Data Storage Area 83565b1, Window Data Storage Area 83565b2, Door Data Storage Area 83565b3, Radio Channel Data Storage Area 83565b4, TV Channel Data Storage Area 83565b5, Blinker Data Storage Area 83565b6, and Work Area 83565b7. User Access Data Storage Area 83565b1 stores the data described hereinafter. Window Data Storage Area 83565b2 stores the data described hereinafter. Door Data Storage Area 83565b3 stores the data described hereinafter. Radio Channel Data Storage Area 83565b4 stores the data described hereinafter. TV Channel Data Storage Area 83565b5 stores the data described hereinafter. Blinker Data Storage Area 83565b6 stores the data described hereinafter. Work Area 83565b7 is utilized as a work area to perform calculation and temporarily store data. The data stored in Automobile Controlling Data Storage Area 83565b excluding the ones stored in User Access Data Storage Area 83565b1 and Work Area 83565b7 are primarily utilized for reinstallation, i.e., to reinstall the data to Communication Device 200 as described hereinafter in case the data stored in Communication Device 200 are corrupted or lost.

This paragraph illustrates the data stored in User Access Data Storage Area 83565b1. In the present embodiment, User Access Data Storage Area 83565b1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the present embodiment, User Access Data Storage Area 83565b1 stores the following data: the user ID 'User #1' and the corresponding password data 'Password Data #1'; the user ID 'User #2' and the corresponding password data 'Password Data #2'; the user ID 'User #3' and the corresponding password data 'Password Data #3'; and the user ID 'User #4' and the corresponding password data 'Password Data #4'. According to the present example, the users represented by User #1 through #4 are authorized to implement the present function.

This paragraph illustrates the data stored in Window Data Storage Area 83565b2. In the present embodiment, Window Data Storage Area 83565b2 comprises two columns, i.e., 'Window ID' and 'Window Data'. Column 'Window ID' stores the window IDs, and each window ID is an identification of the window (not shown) of Automobile 835. Column 'Window Data' stores the window data, and each window data is the image data designed to be displayed on LCD 201 (FIG. 1) which represents the position of the window (not shown) of the corresponding window ID. In the present embodiment, Window Data Storage Area 83565b2 stores the following data: the window ID 'Window #1' and the corresponding window data 'Window Data #1'; the window ID 'Window #2' and the corresponding window data 'Window Data #2'; the window ID 'Window #3' and the corresponding window data 'Window Data #3'; and the window ID 'Window #4' and the corresponding window data 'Window Data #4'. Four windows of Automobile 835 which are represented by the window IDs, 'Window #1' through 'Window #4', are remotely controllable by implementing the present function.

This paragraph illustrates the data stored in Door Data Storage Area 83565b3. In the present embodiment, Door Data Storage Area 83565b3 comprises two columns, i.e., 'Door ID' and 'Door Data'. Column 'Door ID' stores the door IDs, and each door ID is an identification of the door (not shown) of Automobile 835. Column 'Door Data' stores the door data, and each door data is the image data designed to be displayed on LCD 201 (FIG. 1) which represents the position of the door (not shown) of the corresponding door ID. In the present embodiment, Door Data Storage Area 83565b3 stores the following data: the door ID 'Door #1' and the corresponding door data 'Door Data #1'; the door ID 'Door #2' and the corresponding door data 'Door Data #2'; the door ID 'Door #3' and the corresponding door data 'Door Data #3'; and the door ID 'Door #4' and the corresponding door data 'Door Data #4'. Four doors of Automobile 835 which are represented by the door IDs, 'Door #1' through 'Door #4', are remotely controllable by implementing the present function.

This paragraph illustrates the data stored in Radio Channel Data Storage Area 83565b4. In the present embodiment, Radio Channel Data Storage Area 83565b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835. Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 83565b4 stores the following data: the radio channel ID 'Radio Channel #1' and the corresponding radio channel data 'Radio Channel Data #1'; the radio channel ID 'Radio Channel #2' and the corresponding radio channel data 'Radio Channel Data #2'; the radio channel ID 'Radio Channel #3' and the corresponding radio channel data 'Radio Channel Data #3'; and the radio channel ID 'Radio Channel #4' and the corresponding radio channel data 'Radio Channel Data #4'. Four radio channels which are represented by the radio channel IDs, 'Radio Channel #1' through 'Radio Channel #4', are remotely controllable by implementing the present invention.

This paragraph illustrates the data stored in TV Channel Data Storage Area 83565b5. In the present embodiment, TV Channel Data Storage Area 83565b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835. Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 83565b5 stores the following data: the TV channel ID 'TV Channel #1' and the corresponding TV channel data 'TV Channel Data #1'; the TV channel ID 'TV Channel #2' and the corresponding TV channel data 'TV Channel Data #2'; the TV channel ID 'TV Channel #3' and the corresponding TV channel data 'TV Channel Data #3'; and the TV channel ID 'TV Channel #4' and the corresponding TV channel data 'TV Channel Data #4'. Four TV channels which are represented by the TV channel IDs, 'TV Channel #1' through 'TV Channel #4', are remotely controllable by implementing the present invention.

This paragraph illustrates the data stored in Blinker Data Storage Area 83565b6. In the present embodiment, Blinker Data Storage Area 83565b6 comprises two columns, i.e., 'Blinker ID' and 'Blinker Data'. Column 'Blinker ID' stores the blinker IDs, and each blinker ID is an identification of the blinker (not shown) of Automobile 835. Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 83565b6 stores the following data: the blinker ID 'Blinker #1' and the corresponding blinker data 'Blinker Data #1'; and the blinker ID 'Blinker #2' and the corresponding blinker data 'Blinker Data #2'. Two blinkers which are represented by the blinker IDs, 'Blinker #1' and 'Blinker #2', are remotely controllable by implementing the present invention. Here, the blinker (not shown) represented by 'Blinker #1' is the right blinker and the blinker (not shown) represented by 'Blinker #2' is the left blinker.

This paragraph illustrates the storage areas included in Automobile Controlling Software Storage Area 83565c. In the present embodiment, Automobile Controlling Software Storage Area 83565c includes Automobile Controller Storage Area 83565c1 and Remote Controlling Software Storage Area 83565c2. Automobile Controller Storage Area 83565c1 stores the controllers described hereinafter. Remote Controlling Software Storage Area 83565c2 stores the software programs described hereinafter.

This paragraph illustrates the controllers stored in Automobile Controller Storage Area 83565c1. In the present embodiment, Automobile Controller Storage Area 83565c1 stores Engine Controller 83565c1a, Direction Controller 83565c1b, Speed Controller 83565c1c, Window Controller 83565c1d, Door Controller 83565c1e, Radio Controller 83565c1f, TV Controller 83565c1g, Radio Channel Selector 83565c1h, TV Channel Selector 83565c1i, Blinker Controller 83565c1j, Emergency Lamp Controller 83565c1k, Cruise Control Controller 83565c1l, and Speaker Volume Controller 83565c1m. Engine Controller 83565c1a is the controller which controls the engine (not shown) of Automobile 835. Direction Controller 83565c1b is the controller which controls the steering wheel (not shown) of Automobile 835. Speed Controller 83565c1c is the controller which controls the accelerator (not shown) of Automobile 835. Window Controller 83565c1d is the controller which controls the windows (not shown) of Automobile 835. Door Controller 83565c1e is the controller which controls the doors (not shown) of Automobile 835. Radio Controller 83565c1f is the controller which controls the radio (not shown) of Automobile 835. TV Controller 83565c1g is the controller which controls the TV (not shown) of Automobile 835. Radio Channel Selector 83565c1h is the controller which controls the radio channels (not shown) of the radio (not shown) installed in Automobile 835. TV Channel Selector 83565c1i is the controller which controls the radio channels (not shown) of the radio (not shown) installed in Automobile 835. Blinker Controller 83565c1j is the controller which controls the blinkers (not shown) of Automobile 835. Emergency Lamp Controller 83565c1k is the controller which controls the emergency lamp (not shown) of Automobile 835. Cruise Control Controller 83565c1l is the controller which controls the cruise control (not shown) of Automobile 835. Speaker Volume Controller 83565c1m is the controller which controls the speaker (not shown) of Automobile 835. As another embodiment, the foregoing controllers may be in the form of hardware instead of software.

This paragraph illustrates the software programs stored in Remote Controlling Software Storage Area 83565c2. In the present embodiment, Remote Controlling Software Storage Area 83565c2 stores Engine Controlling Software 83565c2a, Direction Controlling Software 83565c2b, Speed Controlling Software 83565c2c, Window Controlling Software 83565c2d, Door Controlling Software 83565c2e, Radio Controlling Software 83565c2f, TV Controlling Software 83565c2g, Radio Channel Selecting Software 83565c2h, TV Channel Selecting Software 83565c2i, Blinker Controlling Software 83565c2j, Emergency Lamp Controlling Software 83565c2k, Cruise Control Controlling Software 83565c2l, Speaker Volume Controlling Software 83565c2m, Controller Reinstalling Software 83565c2n, Data Reinstalling Software 83565c2o, and User Access Authenticating Software 83565c2p. Engine Controlling Software 83565c2a is the software program described hereinafter. Direction Controlling Software 83565c2b is the software program described hereinafter. Speed Controlling Software 83565c2c is the software program described hereinafter. Window Controlling Software 83565c2d is the software program described hereinafter. Door Controlling Software 83565c2e is the software program described hereinafter. Radio Controlling Software 83565c2f is the software program described hereinafter. TV Controlling Software 83565c2g is the software program described hereinafter. Radio Channel Selecting Software 83565c2h is the software program described hereinafter. TV Channel Selecting Software 83565c2i is the software program described hereinafter. Blinker Controlling Software 83565c2j is the software program described hereinafter. Emergency Lamp Controlling Software 83565c2k is the software program described hereinafter. Cruise Control Controlling Software 83565c2l is the software program described hereinafter. Speaker Volume Controlling Software 83565c2m is the software program described hereinafter. Controller Reinstalling Software 83565c2n is the software program described hereinafter. Data Reinstalling Software 83565c2o is the software program described hereinafter. User Access Authenticating Software 83565c2p is the software program described hereinafter. The controllers stored in Automobile Controller Storage Area 83565c1 primarily functions as directly controlling Automobile 835 in the manner described hereinbefore, and the software programs stored in Remote Controlling Software Storage Area 83565c2 controls the controllers stored in Automobile Controller Storage Area 83565c1, by cooperating with the software programs stored in Remote Controlling Software Storage Area 20665c2 of Communication Device 200, in a wireless fashion via Antenna 218 (FIG. 1).

This paragraph illustrates the storage area included in RAM 206 (FIG. 1) of Communication Device 200. In the present embodiment, RAM 206 includes Automobile Controlling Information Storage Area 20665a of which the data and the software programs stored therein are described hereinafter.

The data and/or the software programs stored in Automobile Controlling Information Storage Area 20665a may be downloaded from Host H.

This paragraph illustrates the storage areas included in Automobile Controlling Information Storage Area 20665a. In the present embodiment, Automobile Controlling Information Storage Area 20665a includes Automobile Controlling Data Storage Area 20665b and Automobile Controlling Software Storage Area 20665c. Automobile Controlling Data Storage Area 20665b stores the data necessary to implement the present function on the side of Communication Device 200, such as the ones described hereinafter. Automobile Controlling Software Storage Area 20665c stores the software programs necessary to implement the present function on the side of Communication Device 200, such as the ones described hereinafter.

This paragraph illustrates the storage areas included in Automobile Controlling Data Storage Area 20665b. In the present embodiment, Automobile Controlling Data Storage Area 20665b includes User Access Data Storage Area 20665b1, Window Data Storage Area 20665b2, Door Data Storage Area 20665b3, Radio Channel Data Storage Area 20665b4, TV Channel Data Storage Area 20665b5, Blinker Data Storage Area 20665b6, and Work Area 20665b7. User Access Data Storage Area 20665b1 stores the data described hereinafter. Window Data Storage Area 20665b2 stores the data described hereinafter. Door Data Storage Area 20665b3 stores the data described hereinafter. Radio Channel Data Storage Area 20665b4 stores the data described hereinafter. TV Channel Data Storage Area 20665b5 stores the data described hereinafter. Blinker Data Storage Area 20665b6 stores the data described hereinafter. Work Area 20665b7 is utilized as a work area to perform calculation and temporarily store data.

This paragraph illustrates the data stored in User Access Data Storage Area 20665b1. In the present embodiment, User Access Data Storage Area 20665b1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the present embodiment, User Access Data Storage Area 20665b1 stores the following data: the user ID 'User #1' and the corresponding password data 'Password Data #1'.

This paragraph illustrates the data stored in Window Data Storage Area 20665b2. In the present embodiment, Window Data Storage Area 20665b2 comprises two columns, i.e., 'Window ID' and 'Window Data'. Column 'Window ID' stores the window IDs, and each window ID is an identification of the window (not shown) of Automobile 835. Column 'Window Data' stores the window data, and each window data is the image data designed to be displayed on LCD 201 (FIG. 1) which represents the position of the window (not shown) of the corresponding window ID. In the present embodiment, Window Data Storage Area 20665b2 stores the following data: the window ID 'Window #1' and the corresponding window data 'Window Data #1'; the window ID 'Window #2' and the corresponding window data 'Window Data #2'; the window ID 'Window #3' and the corresponding window data 'Window Data #3'; and the window ID 'Window #4' and the corresponding window data 'Window Data #4'. Four windows of Automobile 835 which are represented by the window IDs, 'Window #1' through 'Window #4', are remotely controllable by implementing the present function.

This paragraph illustrates the data stored in Door Data Storage Area 20665b3. In the present embodiment, Door Data Storage Area 20665b3 comprises two columns, i.e., 'Door ID' and 'Door Data'. Column 'Door Data' stores the door data, and each door data is the image data designed to be displayed on LCD 201 (FIG. 1) which represents the position of the door (not shown) of the corresponding door ID. In the present embodiment, Door Data Storage Area 20665b3 stores the following data: the door ID 'Door #1' and the corresponding door data 'Door Data #1'; the door ID 'Door #2' and the corresponding door data 'Door Data #2'; the door ID 'Door #3' and the corresponding door data 'Door Data #3'; and the door ID 'Door #4' and the corresponding door data 'Door Data #4'. Four doors of Automobile 835 which are represented by the door IDs, 'Door #1' through 'Door #4', are remotely controllable by implementing the present function.

This paragraph illustrates the data stored in Radio Channel Data Storage Area 20665b4. In the present embodiment, Radio Channel Data Storage Area 20665b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835. Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 20665b4 stores the following data: the radio channel ID 'Radio Channel #1' and the corresponding radio channel data 'Radio Channel Data #1'; the radio channel ID 'Radio Channel #2' and the corresponding radio channel data 'Radio Channel Data #2'; the radio channel ID 'Radio Channel #3' and the corresponding radio channel data 'Radio Channel Data #3'; and the radio channel ID 'Radio Channel #4' and the corresponding radio channel data 'Radio Channel Data #4'. Four radio channels which are represented by the radio channel IDs, 'Radio Channel #1' through 'Radio Channel #4', are remotely controllable by implementing the present invention.

This paragraph illustrates the data stored in TV Channel Data Storage Area 20665b5. In the present embodiment, TV Channel Data Storage Area 20665b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835. Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 20665b5 stores the following data: the TV channel ID 'TV Channel #1' and the corresponding TV channel data 'TV Channel Data #1'; the TV channel ID 'TV Channel #2' and the corresponding TV channel data 'TV Channel Data #2'; the TV channel ID 'TV Channel #3' and the corresponding TV channel data 'TV Channel Data #3'; and the TV channel ID 'TV Channel #4' and the corresponding TV channel data 'TV Channel Data #4'. Four TV channels which are represented by the TV channel IDs, 'TV Channel #1' through 'TV Channel #4', are remotely controllable by implementing the present invention.

This paragraph illustrates the data stored in Blinker Data Storage Area 20665b6. In the present embodiment, Blinker Data Storage Area 20665b6 comprises two columns, i.e., 'Blinker ID' and 'Blinker Data'. Column 'Blinker ID' stores the blinker IDs, and each blinker ID is an identification of the blinker (not shown) of Automobile 835. Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 20665b6 stores the following data: the blinker ID 'Blinker #1' and the corresponding blinker data 'Blinker Data #1'; and the blinker ID 'Blinker #2' and the corresponding blinker data 'Blinker Data #2'. Two blinkers which are represented by the blinker IDs, 'Blinker #1' and 'Blinker #2', are remotely controllable by implementing the present invention. Here, the blinker (not shown) represented by 'Blinker #1' is the right blinker and the blinker (not shown) represented by 'Blinker #2' is the left blinker.

This paragraph illustrates the storage areas included in Automobile Controlling Software Storage Area 20665c. In the present embodiment, Automobile Controlling Software Storage Area 20665c includes Automobile Controller Storage Area 20665c1 and Remote Controlling Software Storage Area 20665c2. Automobile Controller Storage Area 20665c1 stores the controllers described hereinafter. Remote Controlling Software Storage Area 20665c2 stores the software programs described hereinafter.

This paragraph illustrates the controllers stored in Automobile Controller Storage Area 20665c1. In the present embodiment, Automobile Controller Storage Area 20665c1 stores Engine Controller 20665c1a, Direction Controller 20665c1b, Speed Controller 20665c1c, Window Controller 20665c1d, Door Controller 20665c1e, Radio Controller 20665c1f, TV Controller 20665c1g, Radio Channel Selector 20665c1h, TV Channel Selector 20665c1i, Blinker Controller 20665c1j, Emergency Lamp Controller 20665c1k, Cruise Control Controller 20665c1l, and Speaker Volume Controller 20665c1m. Engine Controller 20665c1a is the controller which controls the engine (not shown) of Automobile 206. Direction Controller 20665c1b is the controller which controls the steering wheel (not shown) of Automobile 206. Speed Controller 20665c1c is the controller which controls the accelerator (not shown) of Automobile 206. Window Controller 20665c1d is the controller which controls the windows (not shown) of Automobile 206. Door Controller 20665c1e is the controller which controls the doors (not shown) of Automobile 206. Radio Controller 20665c1f is the controller which controls the radio (not shown) of Automobile 206. TV Controller 20665c1g is the controller which controls the TV (not shown) of Automobile 206. Radio Channel Selector 20665c1h is the controller which controls the radio channels (not shown) of the radio (not shown) installed in Automobile 206. TV Channel Selector 20665c1i is the controller which controls the radio channels (not shown) of the radio (not shown) installed in Automobile 206. Blinker Controller 20665c1j is the controller which controls the blinkers (not shown) of Automobile 206. Emergency Lamp Controller 20665c1k is the controller which controls the emergency lamp (not shown) of Automobile 206. Cruise Control Controller 20665c1l is the controller which controls the cruise control (not shown) of Automobile 206. Speaker Volume Controller 20665c1m is the controller which controls the speaker (not shown) of Automobile 206. As another embodiment, the foregoing controllers may be in the form of hardware instead of software. The data stored in Automobile Controller Storage Area 20665c1 are primarily utilized for reinstallation, i.e., to reinstall the data to Automobile 835 as described hereinafter in case the data stored in Automobile 835 are corrupted or lost.

This paragraph illustrates the software programs stored in Remote Controlling Software Storage Area 20665c2. In the present embodiment, Remote Controlling Software Storage Area 20665c2 stores Engine Controlling Software 20665c2a, Direction Controlling Software 20665c2b, Speed Controlling Software 20665c2c, Window Controlling Software 20665c2d, Door Controlling Software 20665c2e, Radio Controlling Software 20665c2f, TV Controlling Software 20665c2g, Radio Channel Selecting Software 20665c2h, TV Channel Selecting Software 20665c2i, Blinker Controlling Software 20665c2j, Emergency Lamp Controlling Software 20665c2k, Cruise Control Controlling Software 20665c2l, Speaker Volume Controlling Software 20665c2m, Controller Reinstalling Software 20665c2n, Data Reinstalling Software 20665c2o, and User Access Authenticating Software 20665c2p. Engine Controlling Software 20665c2a is the software program described hereinafter. Direction Controlling Software 20665c2b is the software program described hereinafter. Speed Controlling Software 20665c2c is the software program described hereinafter. Window Controlling Software 20665c2d is the software program described hereinafter. Door Controlling Software 20665c2e is the software program described hereinafter. Radio Controlling Software 20665c2f is the software program described hereinafter. TV Controlling Software 20665c2g is the software program described hereinafter. Radio Channel Selecting Software 20665c2h is the software program described hereinafter. TV Channel Selecting Software 20665c2i is the software program described hereinafter. Blinker Controlling Software 20665c2j is the software program described hereinafter. Emergency Lamp Controlling Software 20665c2k is the software program described hereinafter. Cruise Control Controlling Software 20665c2l is the software program described hereinafter. Speaker Volume Controlling Software 20665c2m is the software program described hereinafter. Controller Reinstalling Software 20665c2n is the software program described hereinafter. Data Reinstalling Software 20665c2o is the software program described hereinafter. User Access Authenticating Software 20665c2p is the software program described hereinafter. The controllers stored in Automobile Controller Storage Area 83565c1 primarily functions as directly controlling Automobile 835 in the manner described hereinbefore, and the software programs stored in Remote Controlling Software Storage Area 83565c2 controls the controllers stored in Automobile Controller Storage Area 83565c1, by cooperating with the software programs stored in Remote Controlling Software Storage Area 83565c2 of Automobile 835, in a wireless fashion via Antenna 218 (FIG. 1).

This paragraph illustrates User Access Authenticating Software 83565c2p of Automobile 835 and User Access Authenticating Software 20665c2p of Communication Device 200, which determine whether Communication Device 200 in question is authorized to remotely control Automobile 835 by implementing the present function. In the present embodiment, the user of Communication Device 200 inputs the user ID and the password data by utilizing Input Device 210 (FIG. 1) or via voice recognition system. The user ID and the password data are temporarily stored in User Access Data Storage Area 20665b1 from which the two data are sent to Automobile 835 (S1). Assume that the user input 'User #1' as the user ID and 'Password Data #1' as the password data. Upon receiving the user ID and the password data (in the present example, User #1 and Password Data #1) from Communication Device 200, Automobile 835 stores the two data in Work Area 83565b7 (S2). Automobile 835 then initiates the authentication process to determine whether Communication Device 200 in question is authorized to remotely control Automobile 835 by referring to the data stored in User Access Data Storage Area 83565b1 (S3). Assume that the authenticity of Communication Device 200 in question is cleared. Automobile 835 permits Communication Device 200 in question to remotely control Automobile 835 in the manner described hereinafter (S4).

This paragraph illustrates Engine Controlling Software 83565c2a of Automobile 835 and Engine Controlling Software 20665c2a of Communication Device 200, which ignite or turn off the engine (not shown) of Automobile 835. In the present embodiment, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565b7 (S2). Automobile 835 controls the engine (not shown) via Engine Controller 83565c1a in accordance with the engine controlling signal (S3).

This paragraph illustrates Direction Controlling Software 83565c2b of Automobile 835 and Direction Controlling Software 20665c2b of Communication Device 200, which control the direction of Automobile 835. In the present embodiment, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565b7 (S2). Automobile 835 controls the direction via Direction Controller 83565c1b in accordance with the direction controlling signal (S3).

This paragraph illustrates Speed Controlling Software 83565c2c of Automobile 835 and Speed Controlling Software 20665c2c of Communication Device 200, which control the speed of Automobile 835. In the present embodiment, the user of Communication Device 200 inputs a speed controlling signal by utilizing Input Device 210 (FIG. 1) or via voice recognition system. The signal is sent to Automobile 835 (S1). Here, the speed controlling signal indicates either to increase speed or decrease speed of Automobile 835. Upon receiving the speed controlling signal from Communication Device 200, Automobile 835 stores the signal in Work Area 83565b7 (S2). Automobile 835 controls the speed via Speed Controller 83565c1c In accordance the with speed controlling signal (S3).

This paragraph illustrates Window Controlling Software 83565c2d of Automobile 835 and Window Controlling Software 20665c2d of Communication Device 200, which control the window (not shown) of Automobile 835. In the present embodiment, CPU 211 (FIG. 1) of Communication Device 200 retrieves all window data from Window Data Storage Area 20665b2 and displays the data on LCD 201 (FIG. 1) (S1). The user of Communication Device 200 selects one of the window data (for example, Window Data #1), and CPU 211 identifies the corresponding window ID (for example, Window #1) by referring to Window Data Storage Area 20665b2 (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565b7 (S5). Automobile 835 controls the window identified by the window ID via Window Controller 83565c1d in accordance with the window controlling signal (S6).

This paragraph illustrates Door Controlling Software 83565c2e of Automobile 835 and Door Controlling Software 20665c2e of Communication Device 200, which control the door (not shown) of Automobile 835. In the present embodiment, CPU 211 (FIG. 1) of Communication Device 200 retrieves all door data from Door Data Storage Area 20665b3 and displays the data on LCD 201 (FIG. 1) (S1). The user of Communication Device 200 selects one of the door data (for example, Door Data #1), and CPU 211 identifies the corresponding door ID (for example, Door #1) by referring to Door Data Storage Area 20665b3 (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565b7 (S5). Automobile 835 controls the door identified by the door ID via Door Controller 83565c1e in accordance with the door controlling signal (S6).

This paragraph illustrates Radio Controlling Software 83565c2f of Automobile 835 and Radio Controlling Software 20665c2f of Communication Device 200, which turn on or turn off the radio (not shown) installed in Automobile 835. In the present embodiment, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565b7 (S2). Automobile 835 controls the radio via Radio Controller 83565c1f in accordance with the radio controlling signal (S3).

This paragraph illustrates TV Controlling Software 83565c2g of Automobile 835 and TV Controlling Software 20665c2g of Communication Device 200, which turn on or turn off the TV (not shown) installed in Automobile 835. In the present embodiment, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565b7 (S2). Automobile 835 controls the TV via TV Controller 83565c1g in accordance with the TV controlling signal (S3).

This paragraph illustrates Radio Channel Selecting Software 83565c2h of Automobile 835 and Radio Channel Selecting Software 20665c2h of Communication Device 200, which select the channel of the radio (not shown) installed in Automobile 835. In the present embodiment, CPU 211 (FIG. 1) of Communication Device 200 retrieves all radio channel data from Radio Channel Data Storage Area 20665b4 and Displays the data on LCD 201 (FIG. 1) (S1). The user of Communication Device 200 selects one of the radio channel data (for example, Radio Channel Data #1), and CPU 211 identifies the corresponding radio channel ID (for example, Radio Channel #1) by referring to Radio Channel Data Storage Area 20665b4 (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565b7 (S4). Automobile 835 controls the radio channel of the radio via Radio Channel Selector 83565c1h in accordance with the Radio Channel Controlling Signal (S5).

This paragraph illustrates TV Channel Selecting Software 83565c2i of Automobile 835 and TV Channel Selecting Software 20665c2i of Communication Device 200, which select the channel of the TV (not shown) installed in Automobile 835. In the present embodiment, CPU 211 (FIG. 1) of Communication Device 200 retrieves all TV channel data from TV Channel Data Storage Area 20665b5 and displays the data on LCD 201 (FIG. 1) (S1). The user of Communication Device 200 selects one of the TV channel data, and CPU 211 identifies the corresponding TV channel ID (for example, TV Channel #1) by referring to TV Channel Data Storage Area 20665b5 (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565b7 (S4). Automobile 835 controls the TV Channel via TV Channel Selector 83565c1i in accordance with the TV channel controlling signal (S5).

This paragraph illustrates Blinker Controlling Software 83565c2j of Automobile 835 and Blinker Controlling Software 20665c2j of Communication Device 200, which turn on or turn off the blinker (not shown) of Automobile 835. In the present embodiment, CPU 211 (FIG. 1) of Communication Device 200 retrieves all blinker data from Blinker Data Storage Area 20665b6 and displays the data on LCD 201 (FIG. 1) (S1). The user of Communication Device 200 selects one of the blinker data, and CPU 211 identifies the corresponding blinker ID (for example Blinker #1) by referring to Blinker Data Storage Area 20665b6 (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565b7 (S4). Automobile 835 controls the blinker via Blinker Controller 20665c1j in accordance with the blinker controlling signal (S5).

This paragraph illustrates Emergency Lamp Controlling Software 83565c2k of Automobile 835 and Emergency Lamp Controlling Software 20665c2k of Communication Device 200, which turn on or turn off the emergency lamp (not shown) installed in Automobile 835. In the present embodiment, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565b7 (S2). Automobile 835 controls the emergency lamp via Emergency Lamp Controller 83565c1k in accordance with the emergency lamp controlling signal (S3).

This paragraph illustrates Cruise Control Controlling Software 83565c2l of Automobile 835 and Cruise Control Controlling Software 20665c2l of Communication Device 200, which turn on or turn off the cruise control (not shown) of Automobile 835. In the present embodiment, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565b7 (S2). Automobile 835 controls the cruise control via Cruise Control Controller 83565c1l in accordance with the cruise control controlling signal (S3).

This paragraph illustrates Speaker Volume Controlling Software 83565c2m of Automobile 835 and Speaker Volume Controlling Software 20665c2m of Communication Device 200, which raise or lower the volume of the speaker (not shown) of Automobile 835. In the present embodiment, the user of Communication Device 200 inputs a speaker volume controlling signal, and CPU 211 (FIG. 1) sends the signal to Automobile 835 (S1). Here, the speaker volume controlling signal indicates either to raise the volume or lower the volume of the speaker. Upon receiving the speaker volume controlling signal from Communication Device 200, Automobile 835 stores the signal in Work Area 83565b7 (S2). Automobile 835 controls the speaker volume of the speaker via Speaker Volume Controller 83565c1m in accordance with the speaker volume controlling signal (S3).

This paragraph illustrates Controller Reinstalling Software 83565c2n of Automobile 835 and Controller Reinstalling Software 20665c2n of Communication Device 200, which reinstalls the controllers to Automobile Controller Storage Area 83565c1. In the present embodiment, CPU 211 (FIG. 1) of Communication Device 200 retrieves all controllers from Automobile Controller Storage Area 20665c1, and sends the controllers to Automobile 835 (S1). Upon receiving the controllers from Communication Device 200, Automobile 835 stores the controllers in Work Area 83565b7 (S2). Automobile 835 then reinstalls the controllers in Automobile Controller Storage Area 83565c1 (S3).

This paragraph illustrates Data Reinstalling Software 83565c2o of Automobile 835 and Data Reinstalling Software 20665c2o of Communication Device 200, which reinstall the data to Automobile Controlling Data Storage Area 20665b. In the present embodiment, Automobile 835 retrieves all data from Automobile Controlling Data Storage Area 83565b, and sends the data to Communication Device 200 (S1). Upon receiving the data from Automobile 835, CPU 211 (FIG. 1) of Communication Device 200 stores the data in Work Area 20665b7 (S2). CPU 211 then reinstalls the data in Automobile Controlling Data Storage Area 20665b (S3).

, Automobile 835 is not limited to an automobile or a car; the present function may be implemented with any type of carrier or vehicle, such as airplane, space ship, artificial satellite, space station, train, and motor cycle.

<<OCR Function>>

This paragraph illustrates the storage area included in RAM 206 (FIG. 1). In this embodiment, RAM 206 includes OCR Information Storage Area 20666a of which the data and the software programs stored therein are described hereinafter.

The data and/or the software programs stored in OCR Information Storage Area 20666a2]) may be downloaded from Host H.

This paragraph illustrates the storage areas included in OCR Information Storage Area 20666a. In this embodiment, OCR Information Storage Area 20666a includes OCR Data Storage Area 20666b and OCR Software Storage Area 20666c. OCR Data Storage Area 20666b stores the data necessary to implement the present function, such as the ones described hereinafter. OCR Software Storage Area 20666c stores the software programs necessary to implement the present function, such as the ones described hereinafter.

This paragraph illustrates the storage areas included in OCR Data Storage Area 20666b. In this embodiment, OCR Data Storage Area 20666b includes Web Address Data Storage Area 20666b1, Email Address Data Storage Area 20666b2, Phone Data Storage Area 20666b3, Alphanumeric Data Storage Area 20666b4, Image Data Storage Area 20666b5, and Work Area 20666b6. Web Address Data Storage Area 20666b1 stores the data described hereinafter. Email Address Data Storage Area 20666b2 stores the data described hereinafter. Phone Data Storage Area 20666b3 stores the data described hereinafter. Alphanumeric Data Storage Area 20666b4 stores the data described hereinafter. Image Data Storage Area 20666b5 stores the data described hereinafter. Work Area 20666b6 is utilized as a work area to perform calculation and temporarily store data.

This paragraph illustrates the data stored in Web Address Data Storage Area 20666b1. In this embodiment, Web Address Data Storage Area 20666b1 comprises two columns, i.e., 'Web Address ID' and 'Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://'. In this embodiment, Web Address Data Storage Area 20666b1 stores the following data: the web address ID 'Web Address #1' and the corresponding web address data 'Web Address Data #1'; the web address ID 'Web Address #2' and the corresponding web address data 'Web Address Data #2'; the web address ID 'Web Address #3' and the corresponding web address data 'Web Address Data #3'; and the web address ID 'Web Address #4' and the corresponding web address data 'Web Address Data #4'.

This paragraph illustrates the data stored in Email Address Data Storage Area 20666b2. In this embodiment, Email Address Data Storage Area 20666b2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In this embodiment, Email Address Data Storage Area 20666b2 stores the following data: the email address ID 'Email Address #1' and the corresponding email address data 'Email Address Data #1'; the email address ID 'Email Address #2' and the corresponding email address data 'Email Address Data #2'; the email address ID 'Email Address #3' and the corresponding email address data 'Email Address Data #3'; and the email address ID 'Email Address #4' and the corresponding email address data 'Email Address Data #4'.

This paragraph illustrates the data stored in Phone Data Storage Area 20666b3. In this embodiment, Phone Data Storage Area 20666b3 comprises two columns, i.e., 'Phone ID' and 'Phone Data'. Column 'Phone ID' stores the phone IDs, and each phone ID is the title of the corresponding phone data stored in column 'Phone Data' utilized for identification purposes. Column 'Phone Data' stores the phone data, and each phone data represents a phone number composed of numeric figure of which the format is 'xxx-xxx-xxxx'. In this embodiment, Phone Data Storage Area 20666b3 stores the following data: the phone ID 'Phone #1' and the corresponding phone data 'Phone Data #1'; the phone ID 'Phone #2' and the corresponding phone data 'Phone Data #2'; the phone ID 'Phone #3' and the corresponding phone data 'Phone Data #3'; and the phone ID 'Phone #4' and the corresponding phone data 'Phone Data #4'.

This paragraph illustrates the data stored in Alphanumeric Data Storage Area 20666b4. In this embodiment, Alphanumeric Data Storage Area 20666b4 comprises two columns, i.e., 'Alphanumeric ID' and 'Alphanumeric Data'. Column 'Alphanumeric ID' stores alphanumeric IDs, and each alphanumeric ID is the title of the corresponding alphanumeric data stored in column 'Alphanumeric Data' utilized for identification purposes. Column 'Alphanumeric Data' stores the alphanumeric data, and each alphanumeric data represents alphanumeric figure primarily composed of numbers, texts, words, and letters. In this embodiment, Alphanumeric Data Storage Area 20666b4 stores the following data: the alphanumeric ID 'Alphanumeric #1' and the corresponding alphanumeric data 'Alphanumeric Data #1'; the alphanumeric ID 'Alphanumeric #2' and the corresponding alphanumeric data 'Alphanumeric Data #2'; the alphanumeric ID 'Alphanumeric #3' and the corresponding alphanumeric data 'Alphanumeric Data #3'; and the alphanumeric ID 'Alphanumeric #4' and the corresponding alphanumeric data 'Alphanumeric Data #4'.

This paragraph illustrates the data stored in Image Data Storage Area 20666b5. In this embodiment, Image Data Storage Area 20666b5 comprises two columns, i.e., 'Image ID' and 'Image Data'. Column 'Image ID' stores the image IDs, and each image ID is the title of the corresponding image data stored in column 'Image Data' utilized for identification purposes. Column 'Image Data' stores the image data, and each image data is a data composed of image such as the image input via CCD Unit 214 (FIG. 1). In this embodiment, Image Data Storage Area 20666b5 stores the following data: the Image ID 'Image #1' and the corresponding Image Data 'Image Data #1'; the Image ID 'Image #2' and the corresponding Image Data 'Image Data #2'; the Image ID 'Image #3' and the corresponding Image Data 'Image Data #3'; and the Image ID 'Image #4' and the corresponding Image Data 'Image Data #4'.

This paragraph illustrates the software programs stored in OCR Software Storage Area 20666c. In this embodiment, OCR Software Storage Area 20666c stores Image Data Scanning Software 20666c1, Image Data Storing Software 20666c2, OCR Software 20666c3, Alphanumeric Data Storing Software 20666c4, Web Address Data Identifying Software 20666c5a, Web Address Data Correcting Software 20666c5b, Web Address Data Storing Software 20666c5c, Address Accessing Software 20666c5d, Email Address Data Identifying Software 20666c6a, Email Address Data Correcting Software 20666c6b, Email Address Data Storing Software 20666c6c, Email Editing Software 20666c6d, Phone Data Identifying Software 20666c7a, Phone Data Correcting Software 20666c7b, Phone Data Storing Software 20666c7c, and Dialing Software 20666c7d. Image Data Scanning Software 20666c1 is the software program described hereinafter. Image Data Storing Software 20666c2 is the software program described hereinafter. OCR Software 20666c3 is the software program described hereinafter. Alphanumeric Data Storing Software 20666c4 is the software program described hereinafter. Web Address Data Identifying Software 20666c5a is the software program described hereinafter. Web Address Data Correcting Software 20666c5b is the software program described hereinafter. Web Address Data Storing Software 20666c5c is the software program described hereinafter. Web Address Accessing Software 20666c5d is the software program described hereinafter. Email Address Data Identifying Software 20666c6a is the software program described hereinafter. Email Address Data Correcting Software 20666c6b is the software program described hereinafter. Email Address Data Storing Software 20666c6c is the software program described hereinafter. Email Editing Software 20666c6d is the software program described hereinafter. Phone Data Identifying Software 20666c7a is the software program described hereinafter. Phone Data Correcting Software 20666c7b is the software program described hereinafter. Phone Data Storing Software 20666c7c is the software program described hereinafter. Dialing Software 20666c7d is the software program described hereinafter.

This paragraph illustrates Image Data Scanning Software 20666c1 of Communication Device 200, which scans an image by utilizing CCD Unit (FIG. 1). In this embodiment, CPU 211 (FIG. 1) scans an image by utilizing CCD Unit (FIG. 1) (S1), and stores the extracted image data in Work Area 20666b6 (S2). CPU 211 then retrieves the image data from Work Area 20666b6 and displays the data on LCD 201 (FIG. 1) (S3).

This paragraph illustrates Image Data Storing Software 20666c2 of Communication Device 200, which stores the image data scanned by CCD Unit (FIG. 1). In this embodiment, CPU 211 (FIG. 1) retrieves the image data from Work Area 20666b6 and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666b5 (S3).

This paragraph illustrates OCR Software 20666c3 of Communication Device 200, which extracts alphanumeric data from image data by utilizing the method so-called 'optical character recognition' or 'OCR'. In this embodiment, CPU 211 (FIG. 1) retrieves the image IDs from Image Data Storage Area 20666b5 and displays the data on LCD 201 (FIG. 1) (S1). The user of Communication Device 200 selects one of the image IDs by utilizing Input Device 210 (FIG. 1) or via voice recognition system (S2). CPU 211 then retrieves the image data of the image ID selected in S2 from Image Data Storage Area 20666b5 and displays the image data on LCD 201 (FIG. 1) (S3). CPU 211 executes the OCR process, i.e., extracts alphanumeric data from the image data (S4), and stores the extracted alphanumeric data in Work Area 20666b6 (S5).

This paragraph illustrates Alphanumeric Data Storing Software 20666c4 of Communication Device 200, which stores the extracted alphanumeric data in Alphanumeric Data Storage Area 20666b4. In this embodiment, the user of Communication Device 200 inputs an alphanumeric ID (i.e., the title of the alphanumeric data) (S1). CPU 211 (FIG. 1) then retrieves the alphanumeric data from Work Area 20666b6 (S2), and stores the data in Alphanumeric Data Storage Area 20666b4 with the Alphanumeric ID (S3).

This paragraph illustrates Web Address Data Identifying Software 20666c5a of Communication Device 200, which identifies the web address data among the Alphanumeric Data. In this embodiment, CPU 211 (FIG. 1) retrieves the alphanumeric IDs from Alphanumeric Data Storage Area 20666b4 and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666b4 and displays the data on LCD 201 (FIG. 1) (S3). CPU 211 stores the alphanumeric data retrieved in S3 in Work Area 20666b6 for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7).

This paragraph illustrates Web Address Data Correcting Software 20666c5b of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yahoo.com'. In this embodiment, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6).

This paragraph illustrates Web Address Data Storing Software 20666c5c of Communication Device 200, which stores the web address data in Web Address Data Storage Area 20666b1. In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666b1 (S4).

This paragraph illustrates Web Address Accessing Software 20666c5d of Communication Device 200, which accesses the web site represented by the web address data. In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an internet browser (for example, the Internet Explorer) and enters the web address data selected in S2 therein (S3). CPU 211 accesses the web site thereafter (S4).

This paragraph illustrates Email Address Data Identifying Software 20666c6a of Communication Device 200, which identifies the email address data among the alphanumeric data. In this embodiment, CPU 211 (FIG. 1) retrieves the alphanumeric IDs from Alphanumeric Data Storage Area 20666b4 and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666b4 and displays the data on LCD 201 (FIG. 1) (S3). CPU 211 stores the alphanumeric data retrieved in S3 in Work Area 20666b6 for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7).

This paragraph illustrates Email Address Data Correcting Software 20666c6b of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yahoo.com'. In this embodiment, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6).

This paragraph illustrates Email Address Data Storing Software 20666c6c of Communication Device 200, which stores the email address data to Email Address Data Storage Area 20666b2. In this embodiment, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666b2 (S4).

This paragraph illustrates Email Editing Software 20666c6d of Communication Device 200, which opens an email editor (for example, the Outlook Express) wherein the email address data is set as the receiver's address. In this embodiment, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4).

This paragraph illustrates Phone Data Identifying Software 20666c7a of Communication Device 200, which identifies the phone data among the alphanumeric data. In this embodiment, CPU 211 (FIG. 1) retrieves the alphanumeric IDs from Alphanumeric Data Storage Area 20666b4 and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666b4 and displays the data on LCD 201 (FIG. 1) (S3). CPU 211 stores the alphanumeric data retrieved in S3 in Work Area 20666b6 for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7).

This paragraph illustrates Phone Data Correcting Software 20666c7b of Communication Device 200, which corrects the misidentified phone data by manually selecting the start point and the end point of the phone data. For example, if the phone data is misidentified as '916-455-' and leaves out the remaining '1293', the user of Communication Device 200 may manually correct the phone data by selecting the start point and the end point of '916-455-1293'. In this embodiment, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6).

This paragraph illustrates Phone Data Storing Software 20666c7c of Communication Device 200, which stores the phone data to Phone Data Storage Area 20666b3. In this embodiment, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666b3 (S4).

This paragraph illustrates Dialing Software 20666c7d of Communication Device 200, which opens a phone dialer and initiates a dialing process by utilizing the phone data. In this embodiment, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4). A dialing process is initiated thereafter.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. The user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. CPU 211 (FIG. 1), under the command of Mode Activating Software 20690e, activates the mode, function, or, system selected in S2 described hereinbefore. CPU 211 thereafter implements the activated mode, function, or system as described in the relevant section of this specification.

This paragraph illustrates the sequence of Mode Implementation Repeater 20690f. The user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant section of this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Incorporation By Reference>>

The paragraphs and drawings described in U.S. Ser. No. 10/710,600 filed 2004-07-23 incorporated to this application by reference are, based on U.S. Pat. No. 8,090,402: the preamble (col 57 line 64-col 58 line 15; no drawings); Communication Device 200 (Voice Communication Mode) (col 58 line 16-col 60 line 2; FIGS. 1 through 2c); Voice Recognition System (col 60 line 3-col 65 line 3; FIGS. 3 through 19); Positioning System (col 65 line 4-col 69 line 46; FIGS. 20a through 32g); Auto Backup System (col 69 line 47-col 70 line 51; FIGS. 33 through 37); Signal Amplifier (col 70 line 52-col 71 line 13; FIG. 38); Audio/Video Data Capturing System (col 71 line 14-col 72 line 67; FIGS. 39 through 44b); Digital Mirror Function (1) (col 73 line 1-col 74 line 45; FIGS. 44c through 44e); Caller ID System (col 74 line 46-col 75 line 18; FIGS. 45 through 47); Stock Purchasing Function (col 75 line 19-col 76 line 23; FIGS. 48 through 52); Timer Email Function (col 76 line 24-col 76 line 67; FIGS. 53a and 53b); Call Blocking Function (col 77 line 1-col 78 line 35; FIGS. 54 through 59); Online Payment Function (col 78 line 36-col 79 line 67; FIGS. 60 through 64); Navigation System (col 80 line 1-col 84 line 3; FIGS. 65 through 74a); Remote Controlling System (col 84 line 4-col 87 line 10; FIGS. 75 through 85); Auto Emergency Calling System (col 87 line 11-col 87 line 62; FIGS. 86 and 87); Cellular TV Function (col 87 line 63-col 101 line 54; FIGS. 88 through 135); 3D Video Game Function (col 101 line 55-col 104 line 18; FIGS. 136 through 144); Digital Mirror Function (2) (col 104 line 19-col 106 line 6; FIGS. 145 through 155); Voice Recognition Sys—E-mail (2) (col 106 line 7-col 107 line 38; FIGS. 156 through 160); Positioning System—GPS Search Engine (col 107 line 39-col 117 line 12; FIGS. 161 through 182); Mobile Ignition Key Function (col 117 line 13-col 121 line 35; FIGS. 183 through 201); Voice Print Authentication System (col 121 line 36-col 123 line 44; FIGS. 202 through 211); Fingerprint Authentication System (col 123 line 45-col 126 line 7; FIGS. 212 through 221); Auto Time Adjust Function (col 126 line 8-col 126 line 48; FIGS. 222 through 224); Video/Photo Mode (col 126 line 49-col 131 line 63; FIGS. 225 through 242); Call Taxi Function (col 131 line 64-col 140 line 52; FIGS. 243 through 269); Shooting Video Game Function (col 140 line 53-col 143 line 42; FIGS. 270 through 283); Driving Video Game Function (col 143 line 43-col 146 line 7; FIGS. 284 through 294); Address Book Updating Function (col 146 line 8-col 149 line 13; FIGS. 295 through 312); Batch Address Book Updating Function—With Host (col 149 line 14-col 152 line 4; FIGS. 313 through 329); Batch Address Book Updating Function—Peer-To-Peer Connection (col 152 line 5-col 152 line 49; FIGS. 329a through 329c); Batch Scheduler Updating Function—With Host (col 152 line 50-col 156 line 16; FIGS. 330 through 350); Batch Scheduler Updating Function—Peer-To-Peer Connection (col 156 line 17-col 156 line 67; FIGS. 351 and 352); Calculator Function (col 157 line 1-col 157 line 59; FIGS. 353 through 356); Spreadsheet Function (col 157 line 60-col 159 line 9; FIGS. 357 through 360); Word Processing Function (col 159 line 10-col 162 line 61; FIGS. 361 through 373); TV Remote Controller Function (col 162 line 62-col 167 line 19; FIGS. 374 through 394); CD/PC Inter-communicating Function (col 167 line 20-col 171 line 49; FIGS. 413 through 427); PDWR Sound Selecting Function (col 171 line 50-col 179 line 3; FIGS. 428 through 456); Start Up Software Function (col 179 line 4-col 180 line 67; FIGS. 457 through 466); Another Embodiment Of Communication Device 200 (col 181 line 1-col 183 line 13; FIGS. 467a through 467d); Stereo Audio Data Output Function (col 183 line 14-col 185 line 67; FIGS. 468 through 479); Stereo Visual Data Output Function (col 186 line 1-col 188 line 51; FIGS. 480 through 491); Multiple Signal Processing Function (col 188 line 52-col 199 line 13; FIGS. 492 through 529); Positioning System—Pinpointing Function (col 199 line 14-col 204 line 67; FIGS. 530 through 553); Artificial Satellite Host (col 205 line 1-col 208 line 22; FIGS. 554 through 567); CCD Bar Code Reader Function (col 208 line 23-col 211 line 27; FIGS. 568 through 579); Online Renting Function (col 211 line 28-col 225 line 57; FIGS. 580 through 633); SOS Calling Function (col 225 line 58-col 228 line 31; FIGS. 634 through 645); Input Device (col 228 line 32-col 229 line 50; FIGS. 646 through 650); PC Remote Controlling Function (col 229 line 51-col 235 line 27; FIGS. 651 through 670); PC Remote Downloading Function (col 235 line 28-col 244 line 15; FIGS. 671 through 701); Audiovisual Playback Function (col 244 line 16-col 249 line 15; FIGS. 702 through 716); Audio Playback Function (col 249 line 16-col 253 line 58; FIGS. 717 through 731); Ticket Purchasing Function (col 253 line 59-col 259 line 5; FIGS. 732 through 753); Remote Data Erasing Function (col 259 line 6-col 263 line 43; FIGS. 754 through 774); Business Card Function (col 263 line 44-col 266 line 6; FIGS. 775 through 783); Game Vibrating Function (col 266 line 7-col 267 line 17; FIGS. 784 through 786); Part-time Job Finding Function (col 267 line 18-col 270 line 57; FIGS. 787 through 801); Parking Lot Finding Function (col 270 line 58-col 277 line 47; FIGS. 802 through 832); Parts upgradeable Communication Device (col 277 line 48-col 280 line 67; FIGS. 833a through 833x); On Demand TV Function (col 281 line 1-col 287 line 3; FIGS. 834 through 855); Inter-communicating TV Function (col 287 line 4-col 292 line 6; FIGS. 856 through 882); Display Controlling Function (col 292 line 7-col 295 line 4; FIGS. 883 through 894); Multiple Party Communicating Function (col 295 line 5-col 301 line 34; FIGS. 894a through 917); Display Brightness Controlling Function (col 301 line 35-col 302 line 50; FIGS. 918 through 923); Multiple Party Pin-pointing Function (col 302 line 51-col 311 line 12; FIGS. 924 through 950f); Digital Camera Function (col 311 line 13-col 316 line 15; FIGS. 951 through 968); Phone Number Linking Function (col 316 line 16-col 320 line 5; FIGS. 968a through 983); Multiple Window Displaying Function (col 320 line 6-col 323 line 32; FIGS. 984 through 995); Mouse Pointer Displaying Function (col 323 line 33-col 328 line 64; FIGS. 996 through 1021); House Item Pin-pointing Function (col 328 line 65-col 356 line 64; FIGS. 1022 through 1152); Membership Administrating Function (col 356 line 65-col 363 line 67; FIGS. 1153 through 1188); Keyword Search Timer Recording Function (col 364 line 1-col 385 line 55; FIGS. 1189 through 1254); Weather Forecast Displaying Function (col 385 line 56-col 394 line 56; FIGS. 1255 through 1288); Multiple Language Displaying Function (col 394 line 57-col 411 line 63; FIGS. 1289 through 1331); Caller's Information Displaying Function (col 411 line 64-col 423 line 52; FIGS. 1332 through 1375); Communication Device Remote Controlling Function (By Phone) (col 423 line 53-col 430 line 46; FIGS. 1394 through 1415); Communication Device Remote Controlling Function (By Web) (col 430 line 47-col 437 line 61; FIGS. 1416 through 1437); Shortcut Icon Displaying Function (col 437 line 62-col 442 line 29; FIGS. 1438 through 1455); Task Tray Icon Displaying Function (col 442 line 30-col 445 line 62; FIGS. 1456 through 1470); Multiple Channel Processing Function (col 445 line 63-col 455 line 27; FIGS. 1471 through 1498); Solar Battery Charging Function (col 455 line 28-col 458 line 26; FIGS. 1499 through 1509); OS Updating Function (col 458 line 27-col 489 line 3; FIGS. 1510 through 1575); Device Managing Function (col 489 line 4-col 492 line 59; FIGS. 1576 through 1587); Automobile Controlling Function (col 492 line 60-col 505 line 55; FIGS. 1588 through 1627); OCR Function (col 505 line 56-col 512 line 51; FIGS. 1628 through 1652); Multiple Mode Implementing Function (col 512 line 52-col 515 line 56; FIGS. 395 through 400); Multiple Software Download Function (col 515 line 57-col 518 line 3; FIGS. 401 through 407); Selected Software Distributing Function (col 518 line 4-col 523 line 54; FIGS. 1376 through 1393d); Multiple Software Download And Mode Implementation Function (col 523 line 55-col 525 line 33; FIGS. 408 through 412); and the last sentence (col 525 line 34-col 525 line 51; no drawings). If there is ever discrepancy between the disclosures of this application and U.S. Pat. No. 8,090,402, the latter prevails.

<<Overall Functions>>

Communication Device 200 is capable to implement the following functions, modes, and systems: a voice communication function which transfers a 1st voice data input from the microphone via the wireless communication system and outputs a 2nd voice data received via the wireless communication system from the speaker; a voice recognition system which retrieves alphanumeric information from the user's voice input via the microphone; a voice recognition system which retrieves alphanumeric information from the user's voice input via the microphone, and a voice recognition refraining system which refrains from implementing the voice recognition system while a voice communication is implemented by the communication device; a tag function and a phone number data storage area, the phone number data storage area includes a plurality of phone numbers, a voice tag is linked to each of the plurality of phone number, when a voice tag is detected in the voice data retrieved via the microphone, the corresponding phone number is retrieved from the phone number data storage area; a voice recognition noise filtering mode, wherein a background noise is identified, a filtered voice data is produced by removing the background noise from the voice data input via the microphone, and the communication device is operated by the filtered voice data; a sound/beep auto off function wherein the communication device refrains from outputting a sound data stored in a sound data storage area while a voice recognition system is implemented; a voice recognition system auto off implementor, wherein the voice recognition system auto off implementor identifies the lapsed time since a voice recognition system is activated and deactivates the voice recognition system after a certain period of time has lapsed; a voice recognition email function which produces a voice produced email which is an email produced by alphanumeric information retrieved from the user's voice input via the microphone, and the voice produced email is stored in the data storage area; a voice communication text converting function, wherein a 1st voice data which indicates the voice data of the caller and a 2nd voice data which indicates the voice data of the callee are retrieved, and the 1st voice data and the 2nd voice data are converted to a 1st text data and a 2nd text data respectively, which are displayed on the display; a target device location indicating function, wherein a target device location data identifying request is transferred to a host computing system in a wireless fashion, a map data and a target device location data is received from the host computing system in a wireless fashion, and the map data with the location corresponding to the target device location data indicated thereon is displayed on the display; an auto backup function, wherein the data identified by the user is automatically retrieved from a data storage area and transferred to another computing system in a wireless fashion periodically for purposes of storing a backup data therein; an audio/video data capturing system which stores an audiovisual data retrieved via the microphone and a camera installed in the communication device in the data storage area, retrieves the audiovisual data from the data storage area, and sends the audiovisual data to another device in a wireless fashion; a digital mirror function which displays an inverted visual data of the visual data input via a camera of the communication device on the display; a caller ID function which retrieves a predetermined color data and/or sound data which is specific to the caller of the incoming call received by the communication device from the data storage area and outputs the predetermined color data and/or sound data from the communication device; a stock purchase function which outputs a notice signal from the communication device when the communication device receives a notice data wherein the notice data is produced by a computing system and sent to the communication device when a stock price of a predetermined stock brand meets a predetermined criteria; a timer email function which sends an email data stored in the data storage area to a predetermined email address at the time indicated by an email data sending time data stored in the data storage area; a call blocking function which blocks the incoming call if the identification thereof is included in a call blocking list; an online payment function which sends a payment data indicating a certain amount of currency to a certain computing system in a wireless fashion in order for the certain computing system to deduct the amount indicated by the payment data from a certain account stored in the certain computing system; a navigation system which produces a map indicating the shortest route from a first location to a second location by referring to an attribution data; a remote controlling system which sends a 1st remote control signal in a wireless fashion by which a 1st device is controlled via a network, a 2nd remote control signal in a wireless fashion by which a 2nd device is controlled via a network, and a 3rd remote control signal in a wireless fashion by which a 3rd device is controlled via a network; an auto emergency calling system wherein the communication device transfers an emergency signal to a certain computing system when an impact of a certain level is detected in a predetermined automobile; a cellular TV function which receives a TV data, which is a series of digital data indicating a TV program, via the wireless communication system in a wireless fashion and outputs the TV data from the communication device; a 3D video game function which retrieves a 3D video game object, which is controllable by a video game object controlling command input via the input device, from the data storage area and display the 3D video game object on the display; a GPS search engine function, wherein a specific criteria is selected by the input device and one or more of geographic locations corresponding to the specific criteria are indicated on the display; a mobile ignition key function which sends a mobile ignition key signal via the wireless communication system in a wireless fashion in order to ignite an engine of an automobile; a voice print authentication system which implements authentication process by utilizing voice data of the user of the communication device; a fingerprint authentication system which implements authentication process by utilizing fingerprint data of the user of the communication device; an auto time adjusting function which automatically adjusts the clock of the communication device by referring to a wireless signal received by the wireless communication system; a video/photo function which implements a video mode and a photo mode, wherein the video/photo function displays moving image data under the video mode and the video/photo function displays still image data under the photo mode on the display; a taxi calling function, wherein a 1st location which indicates the geographic location of the communication device is identified, a 2nd location which indicates the geographic location of the taxi closest to the 1st location is identified, and the 1st location and the 2nd location are indicated on the display; a 3D shooting video game function, wherein the input device utilized for purposes of implementing a voice communication mode is configured as an input means for performing a 3D shooting video game, a user controlled 3D game object which is the three-dimensional game object controlled by the user and a CPU controlled 3D game object which is the three-dimensional game object controlled by the CPU of the communication device are displayed on the display, the CPU controlled 3D game object is programmed to attack the user controlled 3D game object, and a user fired bullet object which indicates a bullet fired by the user controlled 3D game object is displayed on the display when a bullet firing command is input via the input device; a 3D driving video game function, wherein the input device utilized for purposes of implementing a voice communication mode is configured as an input means for performing a 3D driving video game, a user controlled 3D automobile which is the three-dimensional game object indicating an automobile controlled by the user and a CPU controlled 3D automobile which is the three-dimensional game object indicating another automobile controlled by the CPU of the communication device are displayed on the display, the CPU controlled 3D automobile is programmed to compete with the user controlled 3D automobile, and the user controlled 3D automobile is controlled by a user controlled 3D automobile controlling command input via the input device; an address book updating function which updates the address book stored in the communication device by personal computer via network; a batch address book updating function which updates all address books of a plurality of devices including the communication device in one action; a batch scheduler updating function which updates all schedulers of a plurality of devices including the communication device in one action; a calculating function which implements mathematical calculation by utilizing digits input via the input device; a spreadsheet function which displays a spreadsheet on the display, wherein the spreadsheet includes a plurality of cells which are aligned in a matrix fashion; a word processing function which implements a bold formatting function, an italic formatting function, and/or a font formatting function, wherein the bold formatting function changes alphanumeric data to bold, the italic formatting function changes alphanumeric data to italic, and the font formatting function changes alphanumeric data to a selected font; a TV remote controlling function wherein a TV control signal is transferred via the wireless communication system, the TV control signal is a wireless signal to control a TV tuner; a CD/PC inter-communicating function which retrieves the data stored in a data storage area and transfers the data directly to another computer by utilizing infra-red signal in a wireless fashion; a pre-dialing/dialing/waiting sound selecting function, wherein a selected pre-dialing sound which is one of the plurality of pre-dialing sound is registered, a selected dialing sound which is one of the plurality of dialing sound is registered, and a selected waiting sound which is one of the plurality of waiting sound is registered by the user of the communication device, and during the process of implementing a voice communication mode, the selected pre-dialing sound is output from the speaker before a dialing process is initiated, the selected dialing sound is output from the speaker during the dialing process is initiated, and the selected waiting sound is output from the speaker after the dialing process is completed; a startup software function, wherein a startup software identification data storage area stores a startup software identification data which is an identification of a certain software program selected by the user, when the power of the communication device is turned on, the startup software function retrieves the startup software identification data from the startup software identification data storage area and activates the certain software program; the display includes a 1st display and a 2nd display which display visual data in a stereo fashion, the microphone includes a 1st microphone and a 2nd microphone which input audio data in a stereo fashion, and the communication device further comprises a vibrator which vibrates the communication device, an infra-red transmitting device which transmits infra-red signals, a flash light unit which emits strobe light, a removable memory which stores a plurality of digital data and removable from the communication device, and a photometer which a sensor to detect light intensity; a stereo audio data output function which enables the communication device to output audio data in a stereo fashion; a stereo visual data output function, wherein a left visual data storage area stores a left visual data, a right visual data storage area stores a right visual data, stereo visual data output function retrieves the left visual data from the left visual data storage area and displays on a left display and retrieves the right visual data from the right visual data storage area and displays on a right display; a multiple signal processing function, wherein the communication implements wireless communication under a 1st mode and a 2nd mode, the wireless communication is implemented by utilizing cdma2000 signal under the 1st mode, and the wireless communication is implemented by utilizing W-CDMA signal under the 2nd mode; a pin-pointing function, wherein a plurality of in-door access points are installed in an artificial structure, a target device location data which indicates the current geographic location of another device is identified by the geographical relation between the plurality of in-door access points and the another device, and the target device location data is indicated on the display; a CCD bar code reader function, wherein a bar code data storage area stores a plurality of bar code data, each of the plurality of bar code data corresponds to a specific alphanumeric data, the CCD bar code reader function identifies the bar code data corresponding to a bar code retrieved via a camera and identifies and displays the alphanumeric data corresponding to the identified bar code data; an online renting function which enables the user of communication device to download from another computing system and rent digital information for a certain period of time; an SOS calling function, wherein when a specific call is made from the communication device, the SOS calling function retrieves a current geographic location data from a current geographic location data storage area and retrieves a personal information data from a personal information data storage area and transfers the current geographic location data and the personal information data to a specific device in a wireless fashion; a PC remote controlling function, wherein an image data is produced by a personal computer, the image data is displayed on the personal computer, the image data is transferred to the communication device, the image data is received via the wireless communication system in a wireless fashion and stored in a data storage area, the image data is retrieved from the data storage area and displayed on the display, a remote control signal input via the input device is transferred to the personal computer via the wireless communication system in a wireless fashion, and the personal computer is controlled in accordance with the remote control signal; a PC remote downloading function, wherein the communication device sends a data transferring instruction signal to a 1st computer via the wireless communication system in a wireless fashion, wherein the data transferring instruction signal indicates an instruction to the 1st computer to transfer a specific data stored therein to a 2nd computer; an audiovisual playback function, wherein an audiovisual data storage area stores a plurality of audiovisual data, an audiovisual data is selected from the audiovisual data storage area, the audiovisual playback function replays the audiovisual data if a replaying command is input via the input device, the audiovisual playback function pauses to replay the audiovisual data if a replay pausing command is input via the input device, the audiovisual playback function resumes to replay the audiovisual data if a replay resuming command is input via the input device, the audiovisual playback function terminates to replay the audiovisual data if a replay terminating command is input via the input device, the audiovisual playback function fast-forwards to replay the audiovisual data if a replay fast-forwarding command is input via the input device, and the audiovisual playback function fast-rewinds to replay the audiovisual data if a replay fast-rewinding command is input via the input device; an audio playback function which enables the communication device to playback audio data selected by the user of the communication device; a ticket purchasing function which enables the communication device to purchase tickets in a wireless fashion; a remote data erasing function, wherein a data storage area stores a plurality of data, the remote data erasing function deletes a portion or all data stored in the data storage area in accordance with a data erasing command received from another computer via the wireless communication system in a wireless fashion, the data erasing command identifies the data to be erased selected by the user; a business card function which retrieves a 1st business card data indicating the name, title, phone number, email address, and office address of the user of the communication device from the data storage area and sends via the wireless communication system in a wireless fashion and receives a 2nd business card data indicating the name, title, phone number, email address, and office address of the user of another device via the wireless communication system in a wireless fashion and stores the 2nd business card data in the data storage area; a game vibrating function which activates a vibrator of the communication device when a 1st game object contacts a 2nd game object displayed on the display; a part-timer finding function which enables the user of the communication device to find a part-time job in a specified manner by utilizing the communication device; a parking lot finding function which enables the communication device to display the closest parking lot with vacant spaces on the display with the best route thereto; an on demand TV function which enables the communication device to display TV program on the display in accordance with the user's demand; an inter-communicating TV function which enables the communication device to send answer data to host computing system at which the answer data from a plurality of communication devices including the communication device are counted and the counting data is produced; a display controlling function which enables the communication device to control the brightness and/or the contrast of the display per file opened or software program executed; a multiple party communicating function which enables the user of the communication device to voice communicate with more than one person via the communication device; a display brightness controlling function which controls the brightness of the display in accordance with the brightness detected by a photometer of the surrounding area of the user of the communication device; a multiple party pin-pointing function which enables the communication device to display the current locations of a plurality of devices in artificial structure; a digital camera function, wherein a photo quality identifying command is input via the input device, when a photo taking command is input via the input device, a photo data retrieved via a camera is stored in a photo data storage area with the quality indicated by the photo quality identifying command; a phone number linking function which displays a phone number link and dials a phone number indicated by the phone number link when the phone number link is selected; a multiple window displaying function which displays a plurality of windows simultaneously on the display; a mouse pointer displaying function which displays on the display a mouse pointer which is capable to be manipulated by the user of the communication device; a house item pin-pointing function which enables the user of the communication device to find the location of the house items for which the user is looking in a house, wherein the house items are the tangible objects placed in a house which are movable by human being; a membership administrating function in which host computing system allows only the users of the communication device who have paid the monthly fee to access host computing system to implement a certain function; a keyword search timer recording function which enables to timer record TV programs which meet a certain criteria set by the user of the communication device; a weather forecast displaying function which displays on the display the weather forecast of the current location of the communication device; a multiple language displaying function, wherein a selected language is selected from a plurality of languages, and the selected language is utilized to operate the communication device; and a caller's information displaying function which displays personal information regarding caller on the display when the communication device receives a phone call.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. For the avoidance of doubt, the applicant has no intent to surrender any equivalent of any element included in the claims by any amendment of the claims unless expressly and unambiguously stated otherwise in the amendment. Further, for the avoidance of doubt, the number of the prior art introduced herein (and/or in IDS) may be of a large one, however, applicant has no intent to hide the more relevant prior art in the less relevant ones.

The invention claimed is:

1. A communication device comprising:
   a microphone;
   a speaker;
   an input device;
   a display;
   an antenna;
   a voice communicating implementer, wherein voice communication is implemented with another device in a wireless fashion;
   a caller's information displaying implementer, wherein upon receiving a phone call, a caller's information which indicates the phone number and/or name of the caller is displayed;
   an icon software implementer, wherein the software program indicated by an icon selected by the user is executed; and
   a multiple language mode implementer, wherein the language mode selected by the user is implemented, wherein said language mode selected is one of a plurality of language modes including a first language mode and a second language mode;
   wherein when said first language mode is selected by the user, a first command which is the command for the user to manipulate said communication device in a first manner and a second command which is the command for the user to manipulate said communication device in a second manner are displayed by utilizing a first language data;
   wherein when said second language mode is selected by the user, said first command which is the command for the user to manipulate said communication device in said first manner and said second command which is the command for the user to manipulate said communication device in said second manner are displayed by utilizing a second language data;
   wherein when said communication device is powered off under said first language mode and powered on thereafter, said first command and said second command after said communication device is powered on are automatically displayed by utilizing said first language data; and
   wherein when said communication device is powered off under said second language mode and powered on thereafter, said first command and said second command after said communication device is powered on are automatically displayed by utilizing said second language data.

2. The communication device of claim 1, wherein said communication device is a handheld voice communication device.

3. The communication device of claim 1, wherein said communication device is a handheld audiovisual communication device.

4. The communication device of claim 1, wherein said voice communication and one of said first language mode and said second language mode selected by the user are implemented simultaneously.

5. The communication device of claim 1, wherein either said first language or said second language is English.

6. The communication device of claim 1, wherein either said first language or said second language is Spanish.

7. A system comprising:
   a communication device comprising a microphone, a speaker, an input device, a display, and an antenna;
   a voice communicating implementer, wherein voice communication is implemented with another device in a wireless fashion;
   a caller's information displaying implementer, wherein upon receiving a phone call, a caller's information which indicates the phone number and/or name of the caller is displayed;
   an icon software implementer, wherein the software program indicated by an icon selected by the user is executed; and
   a multiple language mode implementer, wherein the language mode selected by the user is implemented, wherein said language mode selected is one of a plurality of language modes including a first language mode and a second language mode;
   wherein when said first language mode is selected by the user, a first command which is the command for the user to manipulate said communication device in a first manner and a second command which is the command for the user to manipulate said communication device in a second manner are displayed by utilizing a first language data;
   wherein when said second language mode is selected by the user, said first command which is the command for the user to manipulate said communication device in said first manner and said second command which is the command for the user to manipulate said communication device in said second manner are displayed by utilizing a second language data;
   wherein when said communication device is powered off under said first language mode and powered on thereafter, said first command and said second command after said communication device is powered on are automatically displayed by utilizing said first language data; and
   wherein when said communication device is powered off under said second language mode and powered on thereafter, said first command and said second command after said communication device is powered on are automatically displayed by utilizing said second language data.

8. The system of claim 7, wherein said communication device is a handheld voice communication device.

9. The system of claim 7, wherein said communication device is a handheld audiovisual communication device.

10. The system of claim 7, wherein said voice communication and one of said first language mode and said second language mode selected by the user are implemented simultaneously.

11. The system of claim 7, wherein either said first language or said second language is English.

12. The system of claim 7, wherein either said first language or said second language is Spanish.

13. A method for a communication device comprising a microphone, a speaker, an input device, a display, and an antenna, said method comprising:

- a voice communicating implementing step, wherein voice communication is implemented with another device in a wireless fashion;
- a caller's information displaying implementing step, wherein upon receiving a phone call,
- a caller's information which indicates the phone number and/or name of the caller is displayed;
- an icon software implementing step, wherein the software program indicated by an icon selected by the user is executed; and
- a multiple language mode implementing step, wherein the language mode selected by the user is implemented, wherein said language mode selected is one of a plurality of language modes including a first language mode and a second language mode;
- wherein when said first language mode is selected by the user, a first command which is the command for the user to manipulate said communication device in a first manner and a second command which is the command for the user to manipulate said communication device in a second manner are displayed by utilizing a first language data;
- wherein when said second language mode is selected by the user, said first command which is the command for the user to manipulate said communication device in said first manner and said second command which is the command for the user to manipulate said communication device in said second manner are displayed by utilizing a second language data;
- wherein when said communication device is powered off under said first language mode and powered on thereafter, said first command and said second command after said communication device is powered on are automatically displayed by utilizing said first language data; and
- wherein when said communication device is powered off under said second language mode and powered on thereafter, said first command and said second command after said communication device is powered on are automatically displayed by utilizing said second language data.

14. The method of claim 13, wherein said communication device is a handheld voice communication device.

15. The method of claim 13, wherein said communication device is a handheld audiovisual communication device.

16. The method of claim 13, wherein said voice communication and one of said first language mode and said second language mode selected by the user are implemented simultaneously.

17. The method of claim 13, wherein either said first language or said second language is English.

18. The method of claim 13, wherein either said first language or said second language is Spanish.

* * * * *